United States Patent
Sakairi et al.

(10) Patent No.: US 12,298,619 B2
(45) Date of Patent: May 13, 2025

(54) LIQUID CRYSTAL DISPLAY ELEMENT, DISPLAY DEVICE, ELECTRONIC DEVICE, DRIVE SUBSTRATE, AND METHOD FOR MANUFACTURING DRIVE SUBSTRATE

(71) Applicants: SONY SEMICONDUCTOR SOLUTIONS CORPORATION, Kanagawa (JP); SONY GROUP CORPORATION, Tokyo (JP)

(72) Inventors: Takashi Sakairi, Kanagawa (JP); Tomoaki Honda, Tokyo (JP)

(73) Assignees: SONY GROUP CORPORATION, Tokyo (JP); SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 18/251,581

(22) PCT Filed: Nov. 2, 2021

(86) PCT No.: PCT/JP2021/040327
§ 371 (c)(1),
(2) Date: Dec. 4, 2023

(87) PCT Pub. No.: WO2022/102466
PCT Pub. Date: May 19, 2022

(65) Prior Publication Data
US 2024/0118571 A1    Apr. 11, 2024

(30) Foreign Application Priority Data
Nov. 13, 2020    (JP) .................... 2020-189223

(51) Int. Cl.
*G02F 1/1335*    (2006.01)

(52) U.S. Cl.
CPC .. *G02F 1/133553* (2013.01); *G02F 1/133507* (2021.01)

(58) Field of Classification Search
None
See application file for complete search history.

(56) References Cited

U.S. PATENT DOCUMENTS

| | | |
|---|---|---|
| 2010/0309151 A1 | 12/2010 | Cheng et al. |
| 2013/0021540 A1* | 1/2013 | Ito .................. G02F 1/1335 349/5 |
| 2017/0293059 A1 | 10/2017 | Nielson et al. |

FOREIGN PATENT DOCUMENTS

| | | |
|---|---|---|
| JP | 2001-215517 A | 8/2001 |
| JP | 2003-107482 A | 4/2003 |

(Continued)

OTHER PUBLICATIONS

International Search Report and Written Opinion of PCT Application No. PCT/JP2021/040327, issued on Dec. 28, 2021, 10 pages of ISRWO.

*Primary Examiner* — Richard H Kim
(74) *Attorney, Agent, or Firm* — CHIP LAW GROUP

(57) ABSTRACT

Provided is a liquid crystal display element capable of reducing the decrease in light utilization efficiency caused by the increase in definition.
A liquid crystal display element includes: a drive substrate having pixel electrodes having light-reflective properties and arranged in a matrix; a counter substrate arranged opposite to the drive substrate; and a liquid crystal material layer sandwiched between the drive substrate and the counter substrate, in which the pixel electrodes are arranged on a display surface side of the drive substrate in a state of being separated from each other with a slit portion interposed therebetween, an entire surface including surfaces on the pixel electrodes is covered with a first dielectric film formed (Continued)

on the pixel electrodes and a second dielectric film formed in the slit portion, and the second dielectric film has a hollow portion extending along the slit portion.

14 Claims, 35 Drawing Sheets

(56) References Cited

FOREIGN PATENT DOCUMENTS

| | | |
|---|---|---|
| JP | 2010-044138 A | 2/2010 |
| JP | 2013-025071 A | 2/2013 |
| KR | 10-2006-0130302 A | 12/2006 |

* cited by examiner

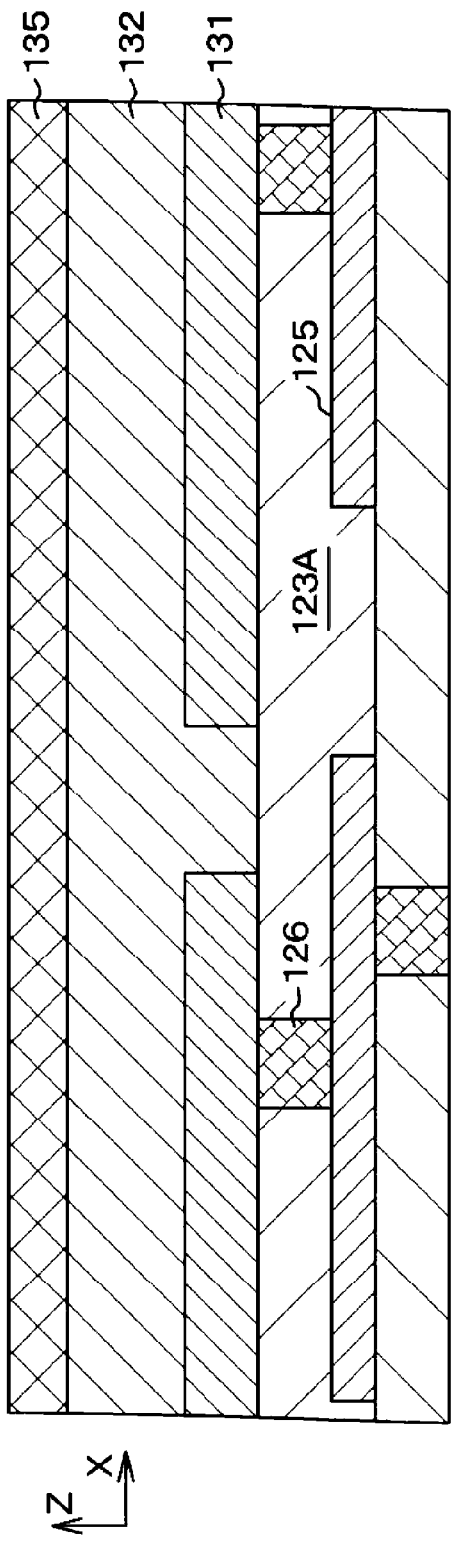
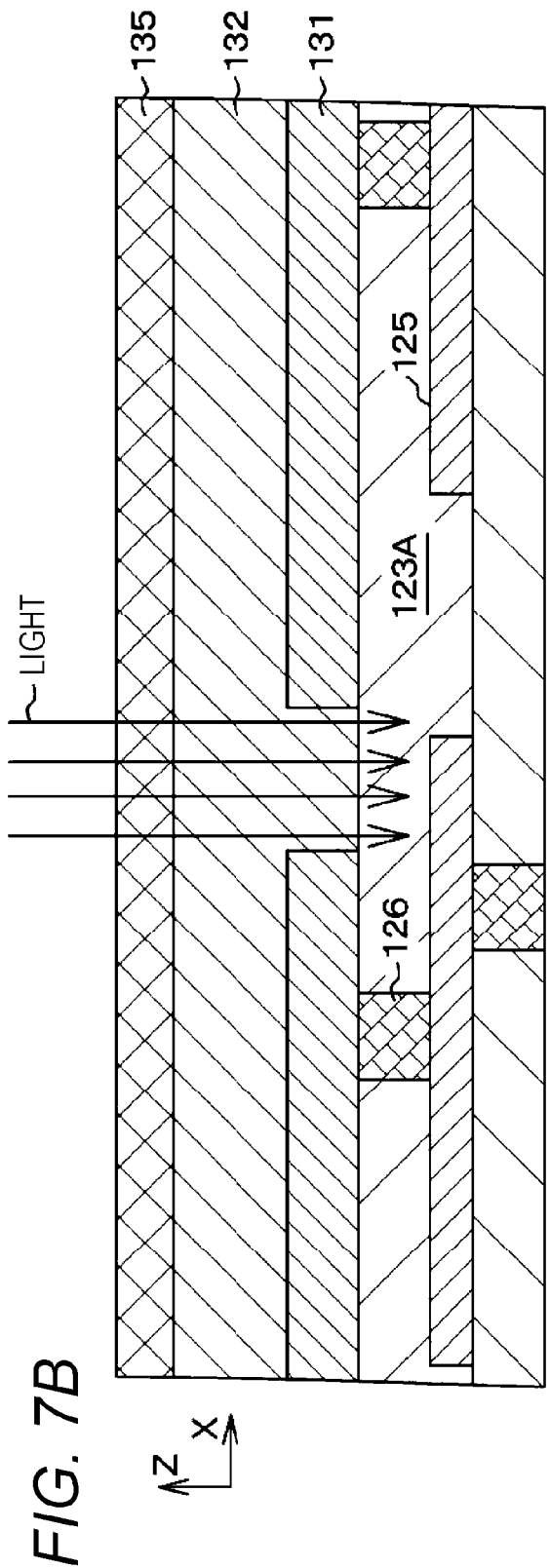

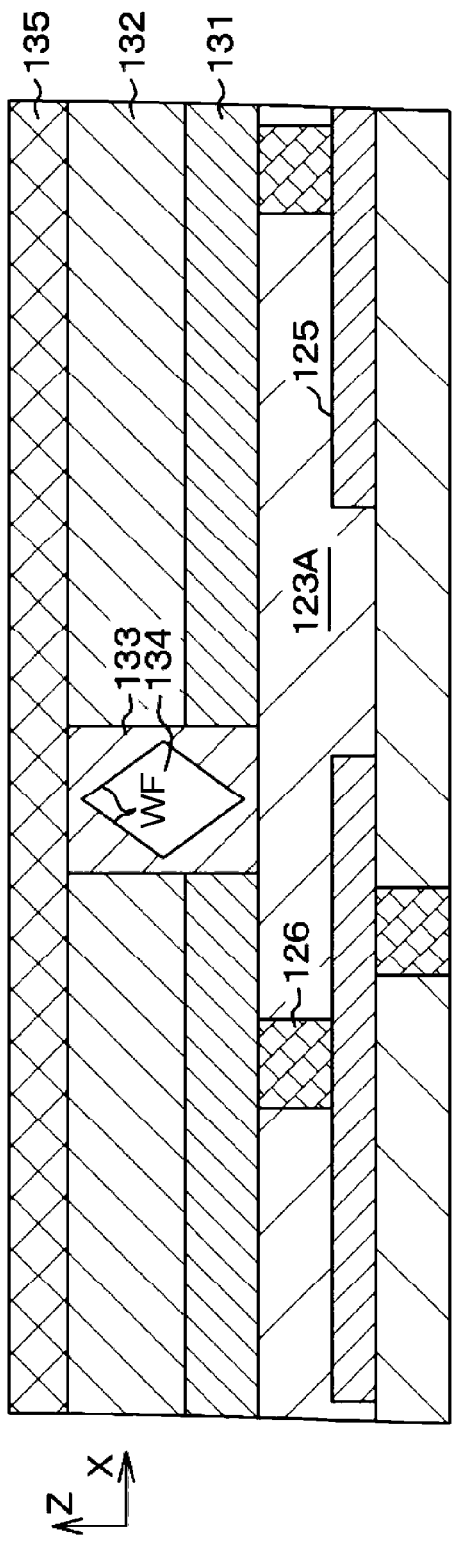
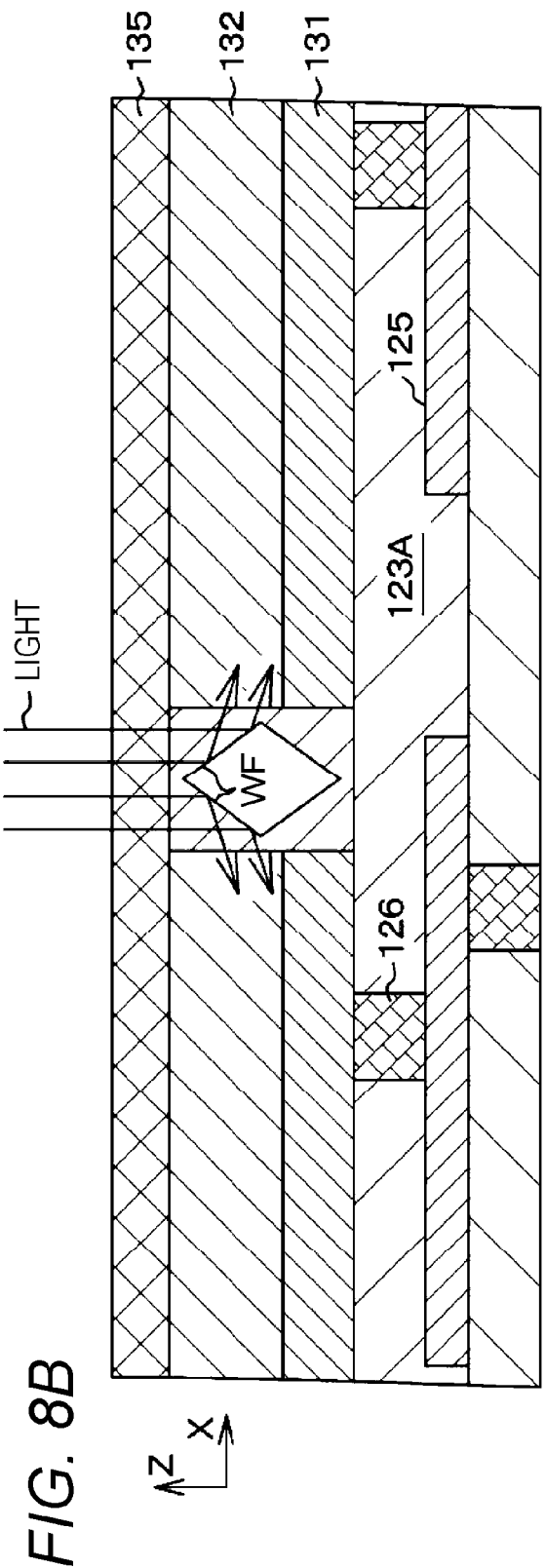
FIG. 8A
FIG. 8B

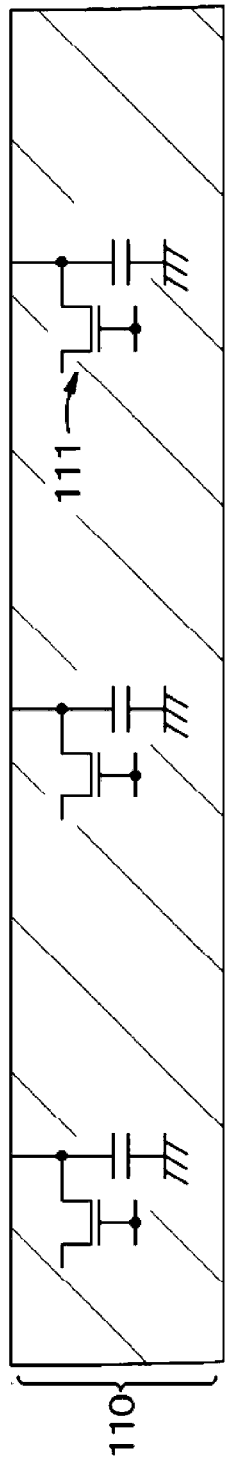
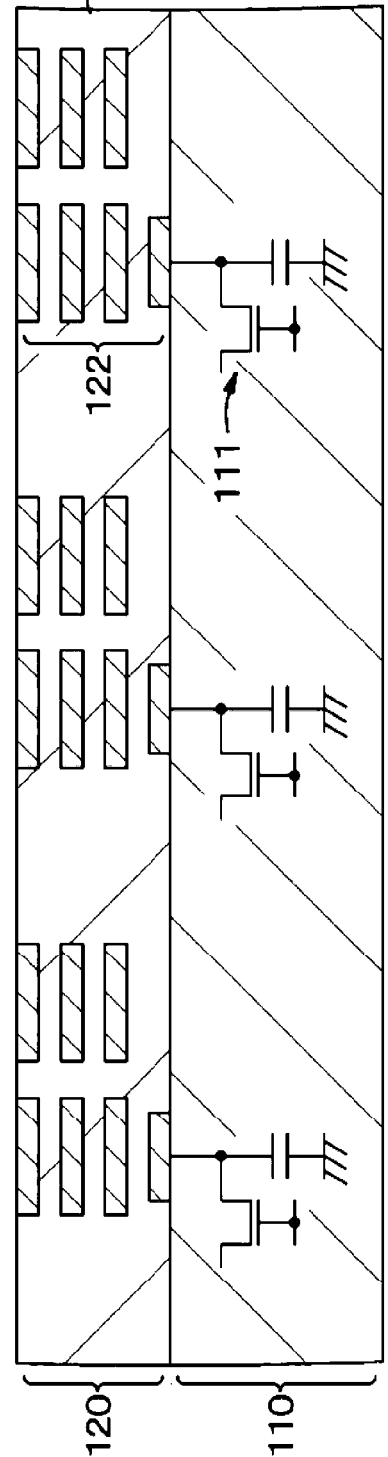
FIG. 9A
FIG. 9B

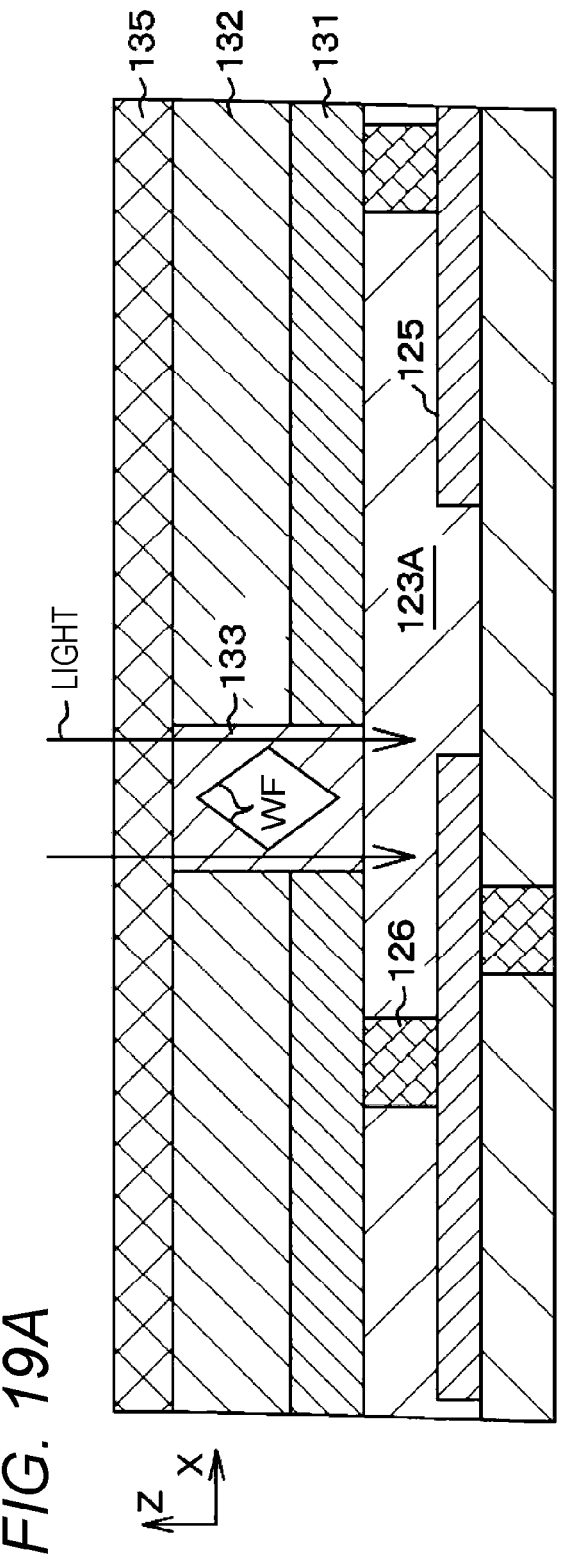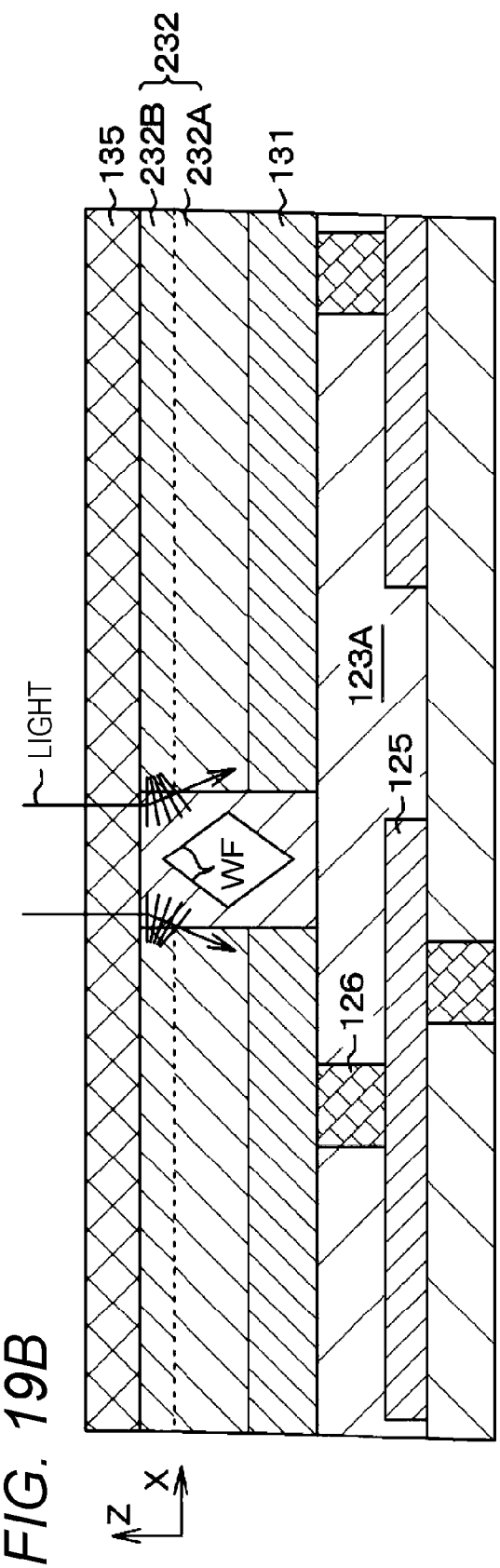

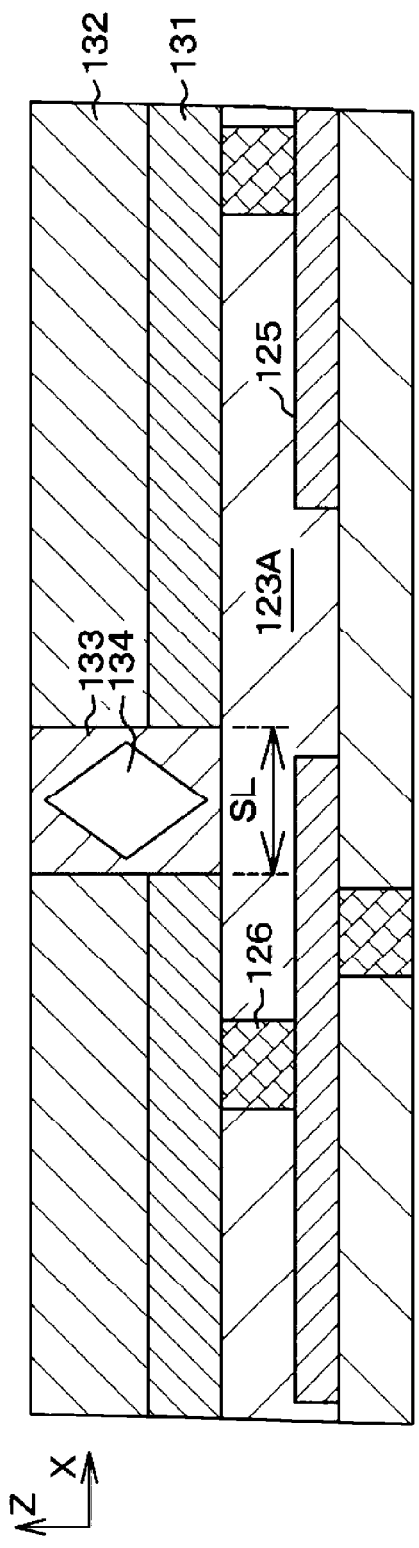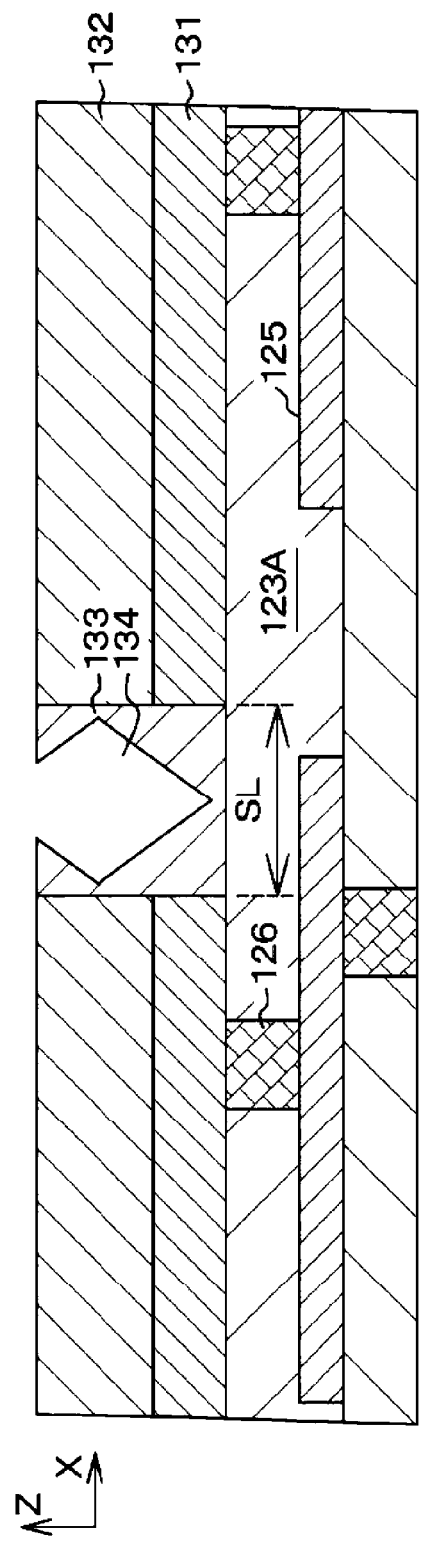

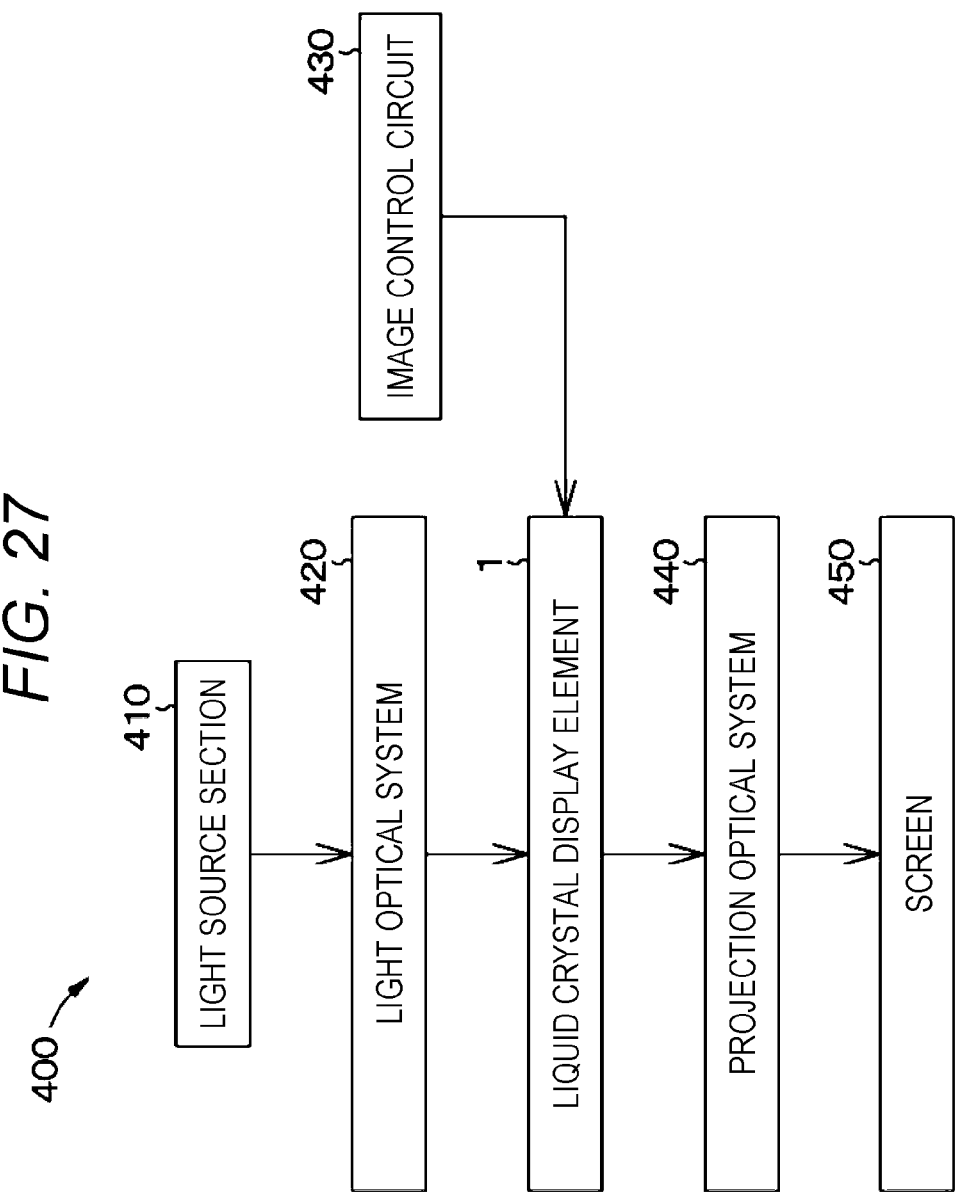

LIQUID CRYSTAL DISPLAY ELEMENT, DISPLAY DEVICE, ELECTRONIC DEVICE, DRIVE SUBSTRATE, AND METHOD FOR MANUFACTURING DRIVE SUBSTRATE

CROSS REFERENCE TO RELATED APPLICATIONS

This application is a U.S. National Phase of International Patent Application No. PCT/JP2021/040327 filed on Nov. 2, 2021, which claims priority benefit of Japanese Patent Application No. JP 2020-189223 filed in the Japan Patent Office on Nov. 13, 2020. Each of the above-referenced applications is hereby incorporated herein by reference in its entirety.

TECHNICAL FIELD

The present disclosure relates to a liquid crystal display element, a display device, an electronic device, a drive substrate, and a method for manufacturing the drive substrate.

BACKGROUND ART

In a liquid crystal display element in which pixels including liquid crystal cells are two-dimensionally arranged in a matrix, an image is displayed by operating the pixels as optical shutters (light valves). As a display device using a liquid crystal display element, direct view type display devices and projection type (projector type) display devices have been put into practical use. In recent years, not only direct view type display devices but also projection type display devices have been required to have high definition and high image quality due to expansion of applications such as large conference rooms and entertainment, and so-called active matrix type liquid crystal display elements have been widely used.

A reflective liquid crystal display element such as liquid crystal on silicon (LCOS) or high temperature poly-silicon (HTPS) displays an image by controlling an on or off state of light reflection by using polarization by liquid crystal for light incident on the liquid crystal display element (see, for example, Patent Document 1). A reflective liquid crystal display element includes a light-reflective pixel electrode such as a pixel electrode constituted by a material that reflects light or a pixel electrode in which a light reflective film is laminated. In the reflective liquid crystal display element, the circuit wirings and the like are disposed below light-reflective pixel electrodes. Therefore, the reflective liquid crystal display element has an advantage that the aperture ratio can be increased as compared with a transmissive liquid crystal display element.

Pixel voltages are independently applied to the light-reflective pixel electrodes. Therefore, the pixel electrodes are disposed separately from adjacent pixel electrodes, and basically, light incident on the separated portion does not participate in image display. In order to increase the luminance of the displayed image, it is preferable to reduce the area occupied between the pixel electrodes.

CITATION LIST

Patent Document

Patent Document 1: Japanese Patent Application Laid-Open No. 2003-107482

SUMMARY OF THE INVENTION

Problems to be Solved by the Invention

As the definition of the liquid crystal display element is increased, the size of the pixel electrode is reduced. On the other hand, due to restrictions such as patterning, there is no choice but to leave a certain distance between the pixel electrodes. Qualitatively, as the definition is increased, the ratio of the area occupied between the pixel electrodes increases, and the utilization efficiency of the light incident on the liquid crystal display element decreases.

Therefore, an object of the present disclosure is to provide a liquid crystal display element, a display device and an electronic device including the liquid crystal display element, a drive substrate used for the liquid crystal display element and the like, and a method for manufacturing the drive substrate, which can reduce the decrease in light utilization efficiency caused by the increase in definition.

Solutions to Problems

A liquid crystal display element according to the present disclosure for achieving the object described above is a liquid crystal display element including: a drive substrate having pixel electrodes having light-reflective properties and arranged in a matrix; a counter substrate arranged opposite to the drive substrate; and a liquid crystal material layer sandwiched between the drive substrate and the counter substrate, in which the pixel electrodes are arranged on a display surface side of the drive substrate in a state of being separated from each other with a slit portion interposed therebetween, an entire surface including surfaces on the pixel electrodes is covered with a first dielectric film formed on the pixel electrodes and a second dielectric film formed in the slit portion, and the second dielectric film has a hollow portion extending along the slit portion.

A display device according to the present disclosure for achieving the object described above is a display device including: a liquid crystal display element; and a light source section that irradiates the liquid crystal display element with light, in which the liquid crystal display element includes: a drive substrate having pixel electrodes having light-reflective properties and arranged in a matrix; a counter substrate arranged opposite to the drive substrate; and a liquid crystal material layer sandwiched between the drive substrate and the counter substrate, the pixel electrodes are arranged on a display surface side of the drive substrate in a state of being separated from each other with a slit portion interposed therebetween, an entire surface including surfaces on the pixel electrodes is covered with a first dielectric film formed on the pixel electrodes and a second dielectric film formed in the slit portion, and the second dielectric film has a hollow portion extending along the slit portion.

An electronic device according to the present disclosure for achieving the object described above is an electronic device including a display device, the display device including: a liquid crystal display element; and a light source section that irradiates the liquid crystal display element with light, in which the liquid crystal display element includes: a drive substrate having pixel electrodes having light-reflective properties and arranged in a matrix; a counter substrate arranged opposite to the drive substrate; and a liquid crystal material layer sandwiched between the drive substrate and the counter substrate, the pixel electrodes are arranged on a display surface side of the drive substrate in a state of being separated from each other with a slit portion interposed therebetween, an entire surface including surfaces on the pixel electrodes is covered with a first dielectric film formed on the pixel electrodes and a second dielectric film formed in the slit portion, and the second dielectric film has a hollow portion extending along the slit portion.

A drive substrate according to the present disclosure for achieving the object described above is a drive substrate including pixel electrodes having light-reflective properties and arranged in a matrix, in which the pixel electrodes are arranged on a display surface side of the drive substrate in a state of being separated from each other with a slit portion interposed therebetween, an entire surface including surfaces on the pixel electrodes is covered with a first dielectric film formed on the pixel electrodes and a second dielectric film formed in the slit portion, and the second dielectric film has a hollow portion extending along the slit portion.

A method for manufacturing a drive substrate according to the present disclosure for achieving the object described above is a method for manufacturing a drive substrate having pixel electrodes having light-reflective properties and arranged in a matrix, the method including: a step of forming a conductive material layer constituting the pixel electrodes on a display surface side of the drive substrate; a step of forming a dielectric film constituting a first dielectric film on the conductive material layer; a step of patterning the first dielectric film and the conductive material layer to form a slit portion that separates the pixel electrodes; a step of forming a dielectric material layer having a hollow portion extending along the slit portion on an entire surface including an inside of the slit portion by conformal film formation; and a step of forming a second dielectric film formed in the slit portion by performing flattening processing on the dielectric material layer.

BRIEF DESCRIPTION OF DRAWINGS

FIG. 7A is a schematic cross-sectional view for explaining a cross-sectional shape of a portion between adjacent pixel electrodes in a liquid crystal display element according to a reference example. FIG. 7B is a schematic cross-sectional view for explaining a state of light incident on the portion between adjacent pixel electrodes.

FIG. 8A is a schematic cross-sectional view for explaining a cross-sectional shape of a portion between adjacent pixel electrodes in the liquid crystal display element according to the first embodiment. FIG. 8B is a schematic cross-sectional view for explaining a state of light incident on the portion between adjacent pixel electrodes.

FIGS. 9A and 9B are schematic partial cross-sectional views of a substrate and the like for explaining the method for manufacturing the liquid crystal display element according to the first embodiment.

FIG. 19A is a schematic cross-sectional view for explaining a state of light incident on the vicinity of the pixel electrode end in the liquid crystal display element according to the first embodiment. FIG. 19B is a schematic cross-sectional view for explaining a state of light incident on the vicinity of the pixel electrode end in the liquid crystal display element according to the second embodiment.

FIG. 22A is a schematic cross-sectional view for explaining a cross-sectional shape of a portion between adjacent pixel electrodes, and illustrates a case where a distance between the adjacent pixel electrodes is appropriate. FIG. 22B is a schematic cross-sectional view for explaining a cross-sectional shape of a portion between adjacent pixel electrodes, and illustrates a case where a distance between the adjacent pixel electrodes is excessive.

FIG. 27 is a conceptual diagram of a projection type display device.

FIG. 28A illustrates a front view thereof and FIG. 28B illustrates a rear view thereof.

MODE FOR CARRYING OUT THE INVENTION

Figure 1:
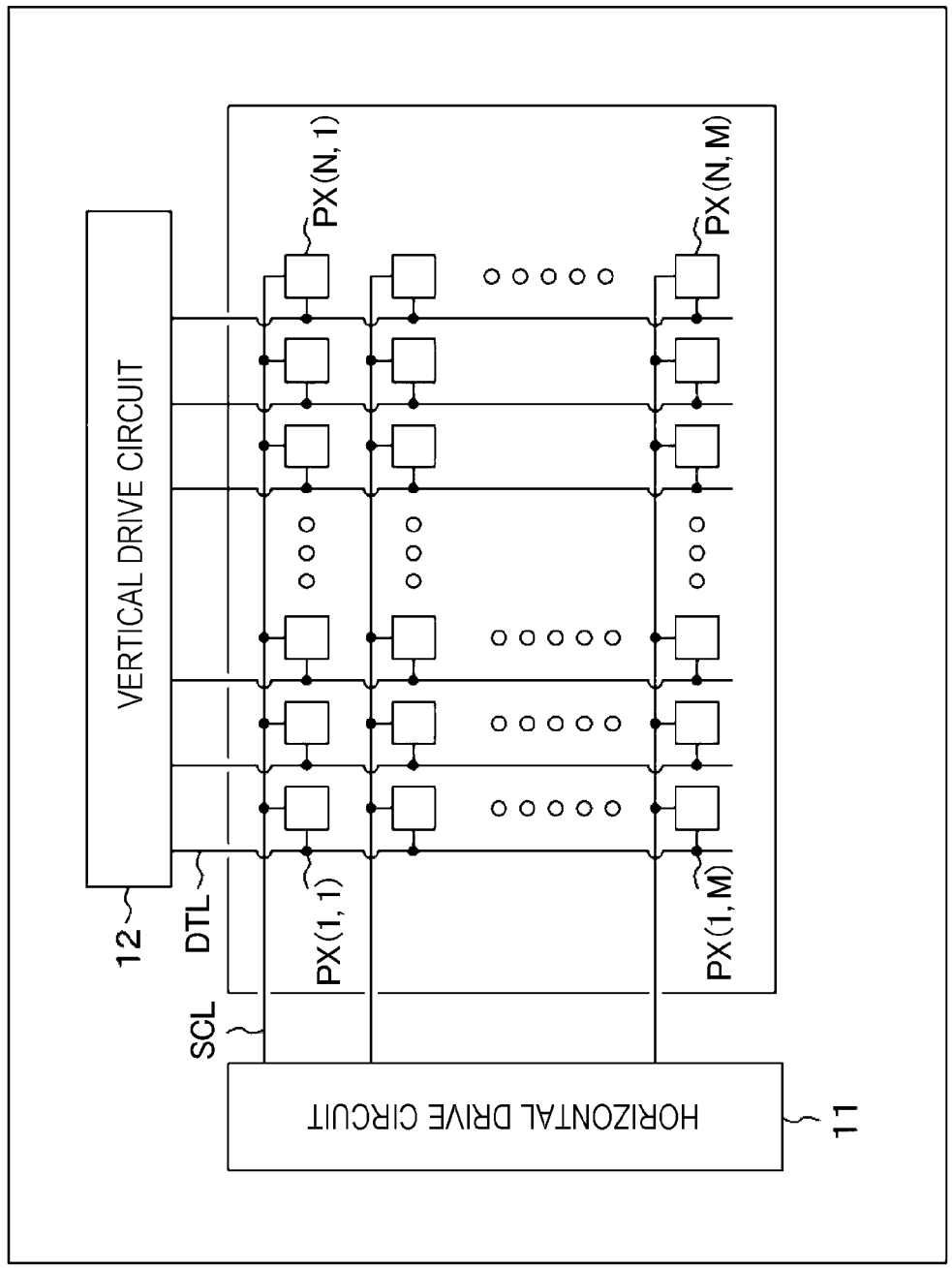
FIG. 1 is a schematic diagram of a liquid crystal display element according to a first embodiment.

Hereinafter, the present disclosure will be described on the basis of embodiments with reference to the drawings. The present disclosure is not limited to the embodiments, and various numerical values and materials in the embodiments are examples. In the following description, the same reference numerals will be used for the same elements or elements having the same functions, and redundant description will be omitted. Note that the description will be given in the following order.

1. General Description of Liquid Crystal Display Element, Display Device, Electronic Device, Drive substrate, and Method for Manufacturing Drive Substrate, According to Present Disclosure
2. First Embodiment
3. Second Embodiment and Modifications
4. Arrangement Example of Pixel Electrode and the Like
5. Description of Display Device and Electronic Device
6. Application Example 1
7. Application Example 2
8. Others

[General Description of Liquid Crystal Display Element, Display Device, Electronic Device, Drive substrate, and Method for Manufacturing Drive Substrate, According to Present Disclosure] In the following description, the liquid crystal display element according to the present disclosure, the liquid crystal display element used in the display device according to the present disclosure, and the liquid crystal display element used in the electronic device according to the present disclosure may be simply referred to as "the liquid crystal display element of the present disclosure". Furthermore, a drive substrate according to the present disclosure and a drive substrate obtained by the method for manufacturing a drive substrate according to the present disclosure, and a drive substrate used in the liquid crystal display element of the present disclosure may be simply referred to as a "drive substrate of the present disclosure". Furthermore, the liquid crystal display element according to the present disclosure, the display device and the electronic device according to the present disclosure, and the drive substrate and the method for manufacturing the drive substrate according to the present disclosure may be simply referred to as "the present disclosure".

As described above, the liquid crystal display element of the present disclosure includes a drive substrate having light-reflective pixel electrodes arranged in a matrix, a counter substrate disposed opposite to the drive substrate, and a liquid crystal material layer sandwiched between the drive substrate and the counter substrate.

Then, in the drive substrate of the present disclosure, the pixel electrodes are arranged on the display surface side of the drive substrate in a state of being separated from each other with a slit portion interposed therebetween, the entire surface including surfaces on the pixel electrodes is covered with a first dielectric film formed on the pixel electrodes and a second dielectric film formed in the slit portion, and the second dielectric film has a hollow portion extending along the slit portion.

Of the light incident on the second dielectric film, the light satisfying the total reflection condition at the interface with the hollow portion is reflected, and its direction changes. Of the light, light directed to the pixel electrode side contributes to the display of the image, so that the utilization efficiency of the light incident on the liquid crystal display element is improved.

In the present disclosure, the hollow portion may be configured to have a wall surface expanding toward the drive substrate side.

In the present disclosure including the preferable configuration described above, at least a part of the light incident on the second dielectric film is desirably reflected by the wall surface of the hollow portion and directed toward the pixel electrode side.

In the present disclosure including the various preferable configurations described above, the first dielectric film and the second dielectric film can be constituted by the same material. From the viewpoint of ease of the process, the first dielectric film and the second dielectric film are preferably constituted by silicon oxide.

Alternatively, the second dielectric film may include a material having a higher refractive index than that of the material constituting the first dielectric film. The higher the refractive index, the larger the critical angle. Therefore, this configuration has an advantage that the degree of freedom of the shape of the hollow portion increases.

In this case, the first dielectric film may be constituted by silicon oxide, and the second dielectric film may be constituted by any one of the group including silicon nitride, tantalum oxide, titanium oxide, and niobium oxide. From the viewpoint of ease of the process, the second dielectric film is preferably constituted by silicon nitride.

Alternatively, in the present disclosure including the above-described various preferable configurations, the first dielectric film may include a lower layer portion on the pixel electrode side and an upper layer portion laminated on the lower layer portion, and the upper layer portion may include a material having a refractive index higher than that of a material constituting the lower layer portion. From the viewpoint of ease of the process, it is preferable that the lower layer portion is constituted by silicon oxide and the upper layer portion is constituted by silicon nitride.

According to this configuration, the traveling direction of the light incident on the second dielectric film in the vicinity of the slit portion is directed to the pixel electrode side due to the influence of the upper layer portion of the first dielectric film. As a result, light that enters the second dielectric film but does not enter the hollow portion also contributes to image display. Therefore, the utilization efficiency of light incident on the liquid crystal display element is further improved.

In the present disclosure including the above-described various preferable configurations, the first dielectric film and the second dielectric film can be covered with a cap layer. By providing the cap layer, an upper portion of the formed void is filled, so that an effect of improving reliability can be obtained. The cap layer is preferably constituted by silicon nitride or tantalum oxide.

A method for manufacturing a drive substrate according to the present disclosure for manufacturing a drive substrate including the above-described various preferable configurations includes: a step of forming a conductive material layer constituting the pixel electrodes on a display surface side of the drive substrate; a step of forming a dielectric film constituting a first dielectric film on the conductive material layer; a step of patterning the first dielectric film and the conductive material layer to form a slit portion that separates the pixel electrodes; a step of forming a dielectric material layer having a hollow portion extending along the slit portion on an entire surface including an inside of the slit portion by conformal film formation; and a step of forming a second dielectric film formed in the slit portion by performing flattening processing on the dielectric material layer.

The dielectric film, the conductive material layer, the dielectric material layer, and the like can be formed by, for example, a combination of a well-known film forming method such as a physical vapor deposition method (PVD method) exemplified by a vacuum vapor deposition method or a sputtering method or various chemical vapor deposition methods (CVD method) and a well-known patterning method such as an etching method or a lift-off method. Furthermore, the flattening processing applied to the dielectric material layer can be performed by a method such as a chemical/mechanical polishing method (CMP method).

As the support substrate constituting the drive substrate, a substrate constituted by a transparent material such as glass or a substrate constituted by a semiconductor material such as silicon can be used. In a case where a glass substrate or the like is used, the transistor that supplies a voltage to the pixel electrode can be configured by forming a semiconductor material layer or the like on the glass substrate and processing the semiconductor material layer or the like. In a case where a substrate constituted by a semiconductor material such as silicon is used, for example, a transistor or the like can be appropriately formed in a well provided in the substrate.

In the liquid crystal display element according to the present disclosure, the configuration of the transistor used for switching is not particularly limited. A p-channel field effect transistor or an n-channel field effect transistor may be used.

A wiring layer including various wirings and electrodes is formed on the drive substrate, and these can be configured by laminating a plurality of material layers on the entire surface of a support substrate including a transistor and the like. The wirings, the electrodes, and the like included in the wiring layer are separated by the insulating layer. The vias for electrically connecting the wiring layer and each pixel electrode can be formed, for example, by providing openings in the insulating layer of the surface layer of the wiring layer, then forming a film of tungsten (W) or the like on the entire surface, and then performing flattening processing.

The metal material layer and the insulating layer constituting the wiring layer can be formed using a material appropriately selected from known inorganic materials and organic materials, and can be formed by, for example, a combination of a well-known film forming method such as a physical vapor deposition method (PVD method) exemplified by a vacuum vapor deposition method or a sputtering method or various chemical vapor deposition methods (CVD method) and a well-known patterning method such as an etching method or a lift-off method. The insulating layer constituting the wiring layer can be obtained by the well-known film forming method described above.

The light-reflective pixel electrode can be formed using aluminum (Al), an aluminum alloy such as Al—Cu or Al—Si, or a metal material such as silver (Ag). The pixel electrode can be obtained, for example, by forming a metal material on the entire surface of the wiring layer on which the via is formed by a well-known film forming method and then applying a well-known patterning method. Note that, in some cases, a light-reflective pixel electrode can be configured by a combination of an electrode constituted by a transparent conductive material and a reflective layer.

In the present disclosure, a substrate constituted by a transparent material such as glass can be used as the counter substrate disposed opposite to the drive substrate. The counter electrode provided on the counter substrate can be formed using a transparent conductive material such as indium tin oxide (ITO) or indium zinc oxide (IZO). The counter electrode functions as a common electrode for each pixel of the liquid crystal display element.

As the alignment film that gives pre-tilt to the liquid crystal molecules, an alignment film obtained by rubbing a film constituted by an organic material or an alignment film constituted by an inorganic material can be used. In a liquid crystal display element used for an application in which strong light is emitted from a light source section, it is preferable to use an alignment film constituted by an inorganic material having excellent light resistance. The alignment film constituted by an inorganic material can be formed by depositing an inorganic material such as silicon oxide on the substrate from an oblique direction.

The operation mode of the liquid crystal display element is not particularly limited. It may be configured to be driven in a so-called TN mode, or may be configured to be driven in a VA mode or an IPS mode. Furthermore, the liquid crystal display element may be normally black or normally white. Furthermore, the liquid crystal display element may be configured to display a monochrome image or a color image. For example, by providing a color filter covered with an overcoat layer constituted by an acrylic resin or an epoxy resin on the inner surface of the substrate, a liquid crystal display element for color display can be obtained.

Some image display resolutions such as (1920, 1035), (720, 480), and (1280, 960) in addition to VGA (640, 480), S-VGA (800, 600), XGA (1024, 768), APRC (1152, 900), S-XGA (1280, 1024), U-XGA (1600, 1200), HD-TV (1920, 1080), and Q-XGA (2048, 1536) can be exemplified as the value of the pixels of the liquid crystal display element, but the value is not limited thereto.

Furthermore, as a display device including the liquid crystal display element of the present disclosure, a direct view type or projection type display device can be exemplified. Examples of the light source section used in the display device include various lamps such as a xenon lamp, and a semiconductor light emitting element such as a light emitting diode. Furthermore, as the electronic device including the liquid crystal display element of the present disclosure, various electronic devices having an image display function can be exemplified.

Various conditions in the present specification are satisfied not only in a case where they are strictly satisfied but also in a case where they are substantially satisfied. With respect to satisfaction of the condition, existence of various variations caused by design or manufacturing of the display device or the like is allowed. Furthermore, the drawings used in the following description are schematic. For example, FIG. 3 described later illustrates a cross-sectional structure of the liquid crystal display element, but does not illustrate a ratio of a width, a height, a thickness, or the like.

[First Embodiment] A first embodiment relates to a liquid crystal display element, a display device, an electronic device, a drive substrate, and a method for manufacturing the drive substrate according to the present disclosure.

FIG. 1 is a schematic diagram of a liquid crystal display element according to a first embodiment. The liquid crystal display element 1 is an active matrix type liquid crystal display element. The liquid crystal display element 1 includes various circuits such as pixels PX arranged in a matrix, and a horizontal drive circuit 11 and a vertical drive circuit 12 for driving the pixels PX. Reference numeral SCL denotes a scanning line for scanning the pixels PX, and reference numeral DTL denotes a signal line for supplying various voltages to the pixels PX.

For example, a total of N×M pixels PX including N pixels PX in the horizontal direction (X direction in the drawing) and M pixels PX in the vertical direction (Y direction in the drawing) are arranged in a matrix. Hereinafter, the pixel PX located in the m-th row (where m=1, 2 . . . , M) and the n-th column (where n=1, 2 . . . , N) may be referred to as a (n, m)-th pixel PX. Each element constituting the (n, m)-th pixel PX may also be referred to as a (n, m)-th element.

The liquid crystal display element 1 is a liquid crystal display element in which various circuits such as the horizontal drive circuit 11 and the vertical drive circuit 12 are integrated. Note that, in the example illustrated in the drawing, each of the horizontal drive circuit 11 and the vertical drive circuit 12 is disposed on one end side of the liquid crystal display element 1, but this is merely an example.

Figure 2A:
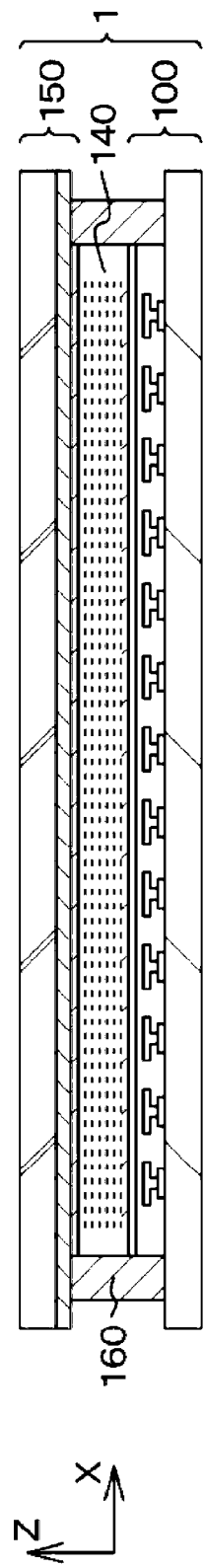
FIG. 2A is a schematic cross-sectional view for explaining a basic configuration of the liquid crystal display element.
Figure 2B:
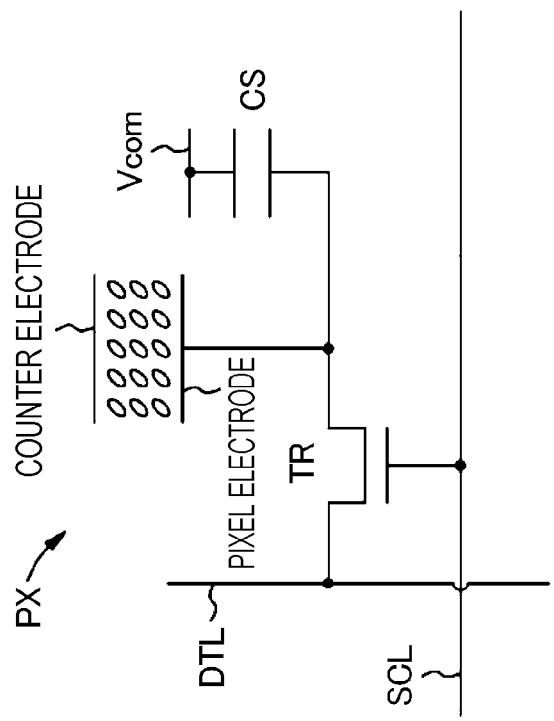
FIG. 2B is a schematic circuit diagram for explaining pixels in the liquid crystal display element.

FIG. 2A is a schematic cross-sectional view for explaining a basic configuration of the liquid crystal display element. FIG. 2B is a schematic circuit diagram for explaining pixels in the liquid crystal display element.

As illustrated in FIG. 2A, the liquid crystal display element 1 includes a drive substrate 100, a counter substrate 150 disposed opposite to the drive substrate 100, and a liquid crystal material layer 140 sandwiched between the drive substrate 100 and the counter substrate 150. The drive substrate 100 and the counter substrate 150 are sealed by a seal portion 160. The seal portion 160 has an annular shape surrounding the liquid crystal material layer 140.

The drive substrate 100 includes light-reflective pixel electrodes arranged in a matrix, a wiring layer including various electrodes and wirings, a transistor as a switching element that supplies a voltage to the pixel electrodes, and the like. The counter substrate 150 includes, for example, a rectangular substrate constituted by transparent glass, a counter electrode provided on a surface of the substrate on the liquid crystal material layer 140 side, an alignment film provided on the counter electrode, and the like. Note that, for convenience of illustration, the drive substrate 100 and the counter substrate 150 in FIG. 2A are illustrated in a simplified manner.

As illustrated in FIG. 2B, a liquid crystal cell constituting a pixel PX includes a pixel electrode provided on the drive substrate 100, and a liquid crystal material layer 140 and a counter electrode in a portion corresponding to the pixel electrode. In order to prevent deterioration of the liquid crystal material layer 140, the common potential Vcom of positive polarity or negative polarity is alternately applied to the counter electrode when the liquid crystal display element 1 is driven. Note that each element of the pixel PX excluding the liquid crystal material layer and the counter electrode is formed on the drive substrate 100 illustrated in FIG. 2A.

As is clear from the connection relationship in FIG. 2B, the pixel voltage supplied from the signal line DTL is applied to the pixel electrode via the transistor TR brought into a conductive state by the scanning signal of the scanning line SCL. Since the pixel electrode and one electrode of the capacitance structure CS are conductive, the pixel voltage is also applied to one electrode of the capacitance structure CS. Note that the common potential Vcom is applied to the other electrode of the capacitance structure CS. In this configuration, even after the transistor TR is brought into a non-conductive state, the voltage of the pixel electrode is held by the capacitance component of the liquid crystal cell and the capacitance structure CS.

As will be described in detail with reference to FIGS. 3, 4, 5, 6, 7A, 7B, 8A, 8B, 9A, 9B, 10, 11, 12, 13, 14, 15, and 16, in the liquid crystal display element 1, the pixel electrodes are arranged on the display surface side of the drive substrate in a state of being separated from each other with the slit portion interposed therebetween. The entire surface including surfaces on the pixel electrodes is covered with a first dielectric film formed on the pixel electrodes and a second dielectric film formed in the slit portion. Then, the second dielectric film has a hollow portion extending along the slit portion. As will be described later, light incident on the slit portion is reflected by the wall surface of the hollow portion and contributes to display of an image. As a result, light utilization efficiency can be enhanced.

Figure 3:
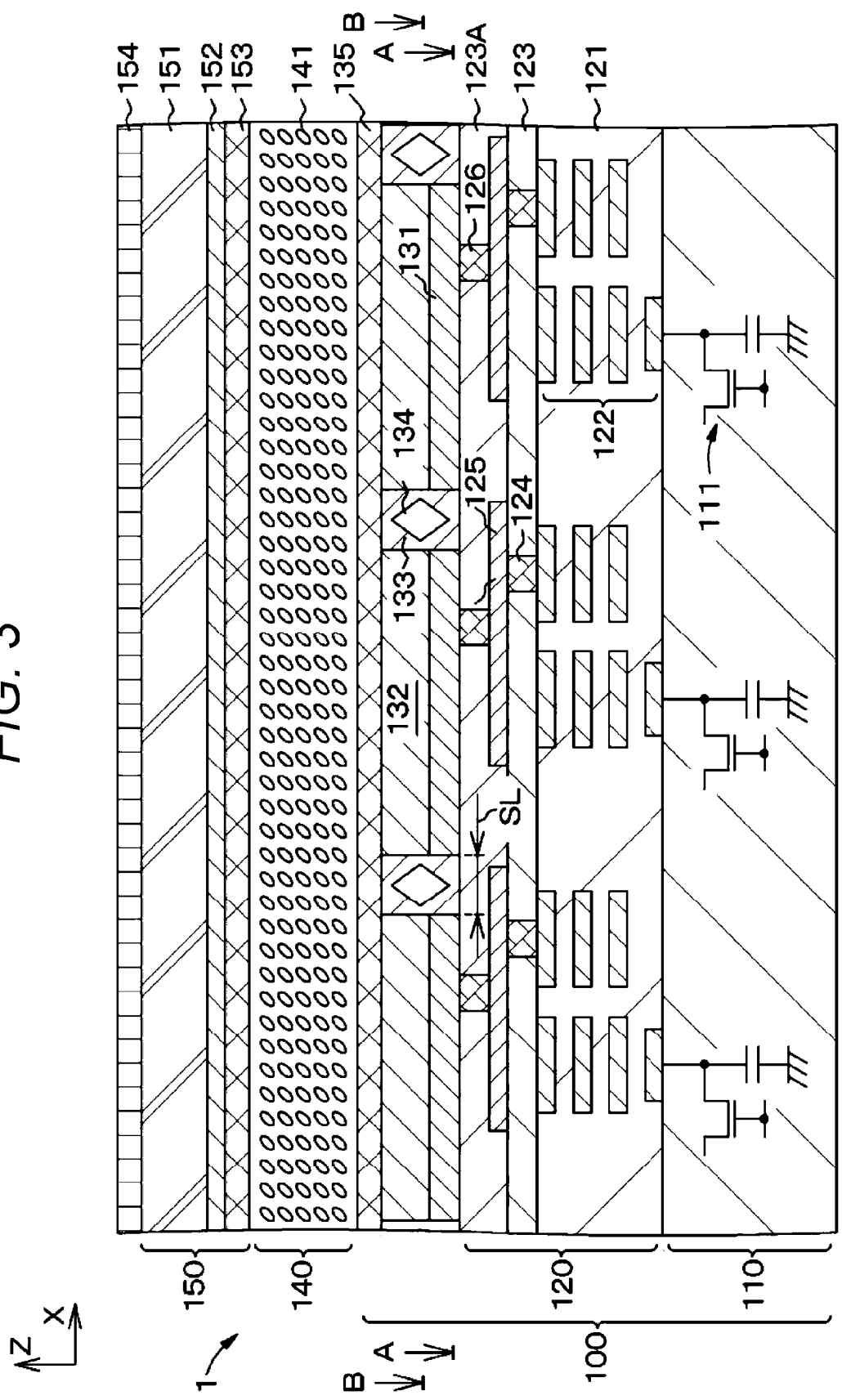
FIG. 3 is a schematic partial cross-sectional view of a substrate and the like for explaining a structure of the liquid crystal display element.

FIG. 3 is a schematic partial cross-sectional view of a substrate and the like for explaining a structure of the liquid crystal display element.

As described above, the liquid crystal display element 1 includes the drive substrate 100 and the counter substrate 150, and the liquid crystal material layer 140 sandwiched between the drive substrate 100 and the counter substrate 150. Reference numeral 141 schematically denotes liquid crystal molecules.

First, the drive substrate 100 will be described. The drive substrate 100 includes a support substrate 110 constituted by, for example, silicon, a wiring layer 120 including various wirings and the like, and pixel electrodes 131 formed on the wiring layer 120. Note that each pixel electrode 131 is configured by laminating an Al—Cu film on a titanium film as a barrier metal, but is illustrated as one layer in the drawing.

A transistor 111 corresponding to the transistor TR illustrated in FIG. 2B is formed on the support substrate 110. Although not illustrated in FIG. 3, one source/drain region of the transistor 111 is connected to the data line DTL as illustrated in FIG. 2B.

The pixel electrodes 131 are arranged on the display surface side (the surface on the +Z direction side in FIG. 3)

of the drive substrate 100 in a state of being separated from each other with the slit portion SL interposed therebetween. The entire surface including surfaces on the pixel electrodes 131 is covered with the first dielectric film 132 formed on the pixel electrodes 131 and the second dielectric film 133 formed in the slit portion SL. An alignment film 135 is laminated on the entire surface including surfaces on the first dielectric film 132 and the second dielectric film 133.

Figure 5:
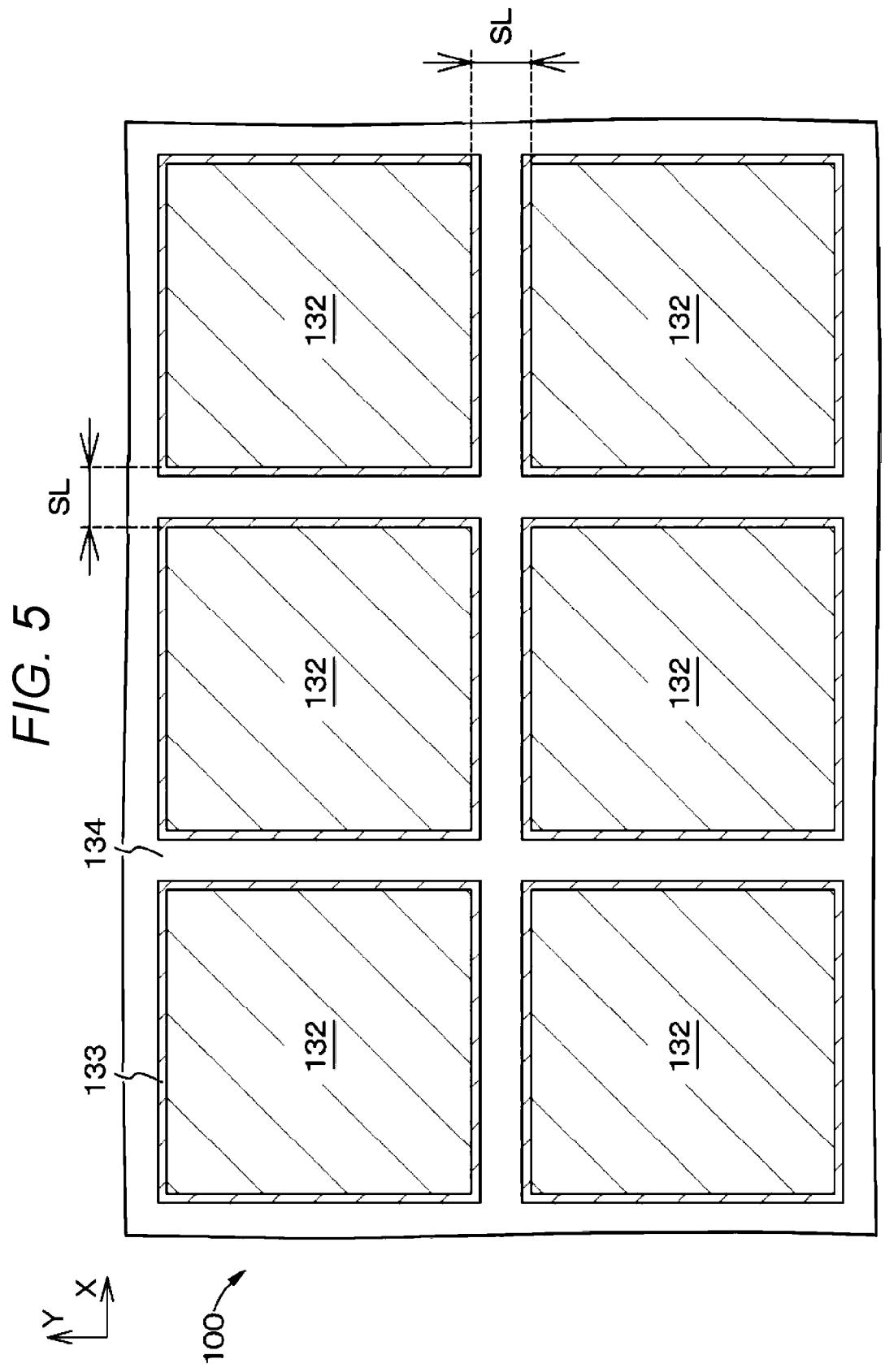
FIG. 5 is a schematic cross-sectional view of the liquid crystal display element taken along line B-B in FIG. 3.

The first dielectric film 132 and the second dielectric film 133 are constituted by the same material. More specifically, the first dielectric film 132 and the second dielectric film 133 are constituted by silicon oxide. As illustrated in FIG. 5 to be described later, the second dielectric film 133 has a hollow portion 134 extending along the slit portion SL.

In the wiring layer 120, reference numeral 122 denotes wirings also serving as light shielding. These constitute wirings on the lower layer side of the wiring layer 120. Note that the wirings 122 include wirings extending in the X direction and wirings extending in the Y direction, but only cross sections extending in the X direction are schematically illustrated in FIG. 3. Reference numeral 121 denotes an insulating layer for separating the wirings from the wirings. Note that the insulating layer 121 is formed by laminating a plurality of interlayer insulating layers, but is illustrated in a simplified manner for convenience of illustration.

Next, the upper layer side of the wiring layer 120 will be described. An interlayer insulating layer 123 is formed on the wirings 122, and first relay electrodes 125 are formed thereon. The first relay electrodes 125 and the wirings of the wirings 122 are electrically connected by vias 124 provided in the interlayer insulating layer 123. An interlayer insulating layer 123A is formed on the entire surface including surfaces on the first relay electrodes 125.

The light-reflective pixel electrodes 131 are formed on the wiring layer 120. More specifically, the pixel electrodes 131 are arranged in a matrix on the interlayer insulating layer 123A which is a surface layer of the wiring layer 120. Vias 126 are formed in the interlayer insulating layer 123A. The surface of the interlayer insulating layer 123A is subjected to flattening processing, and the cross sections of the vias 126 are exposed to the surface of the interlayer insulating layer 123A. The pixel electrodes 131 are formed on the surface of the wiring layer 120 subjected to the flattening processing, and is electrically connected to the wiring layer 120 via the vias 126. More specifically, the pixel electrodes 131 are connected to the other source/drain region of the transistor 111 via the vias 126, the first relay electrode 125, the vias 124, and the wirings 122.

A planar arrangement relationship of the pixel electrodes 131, the first dielectric film 132, the second dielectric film 133 formed in the slit portion SL, and the hollow portion 134 will be described with reference to FIGS. 4 and 5, and a cross-sectional structure of the hollow portion 134 will be described with reference to FIG. 6.

Figure 4:
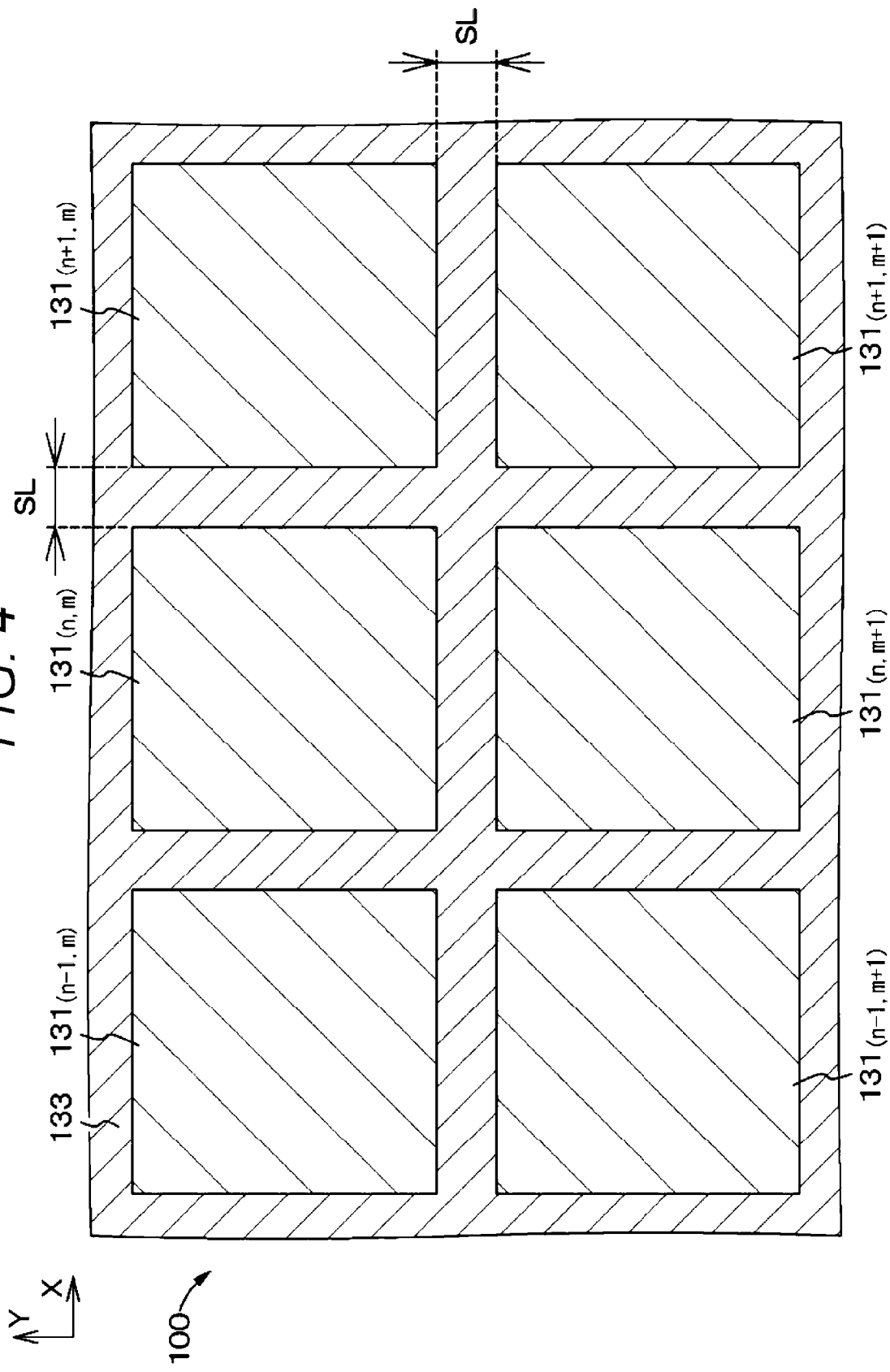
FIG. 4 is a schematic cross-sectional view of the liquid crystal display element taken along line A-A in FIG. 3.

FIG. 4 is a schematic cross-sectional view of the liquid crystal display element taken along line A-A in FIG. 3.

Furthermore, FIG. 5 is a schematic cross-sectional view of the liquid crystal display element taken along line B-B in FIG. 3. FIG. 6 is a schematic cross-sectional view for explaining a cross-sectional shape of a portion between adjacent pixel electrodes.

As illustrated in FIG. 4, the pixel electrodes 131 are arranged on the display surface side of the drive substrate 100 in a state of being separated from each other with the slit portion SL interposed therebetween. Note that, for convenience of illustration, the arrangement relationship of the pixel electrodes 131 regarding the (n−1, m)-th to (n+1, m)-th pixels PX and the (n−1, m+1)-th to (n+1, m+1)-th pixels PX is illustrated. In the portion indicated by A-A in FIG. 3, the slit portion SL is filled with the second dielectric film 133.

Furthermore, as illustrated in FIG. 5, in the portion indicated by B-B in FIG. 4, the first dielectric film 132 is disposed on the pixel electrodes 131, and the hollow portion 134 of the second dielectric film 133 is formed in the slit portion SL. The hollow portion 134 is formed to extend along the slit portion SL.

Figure 6:
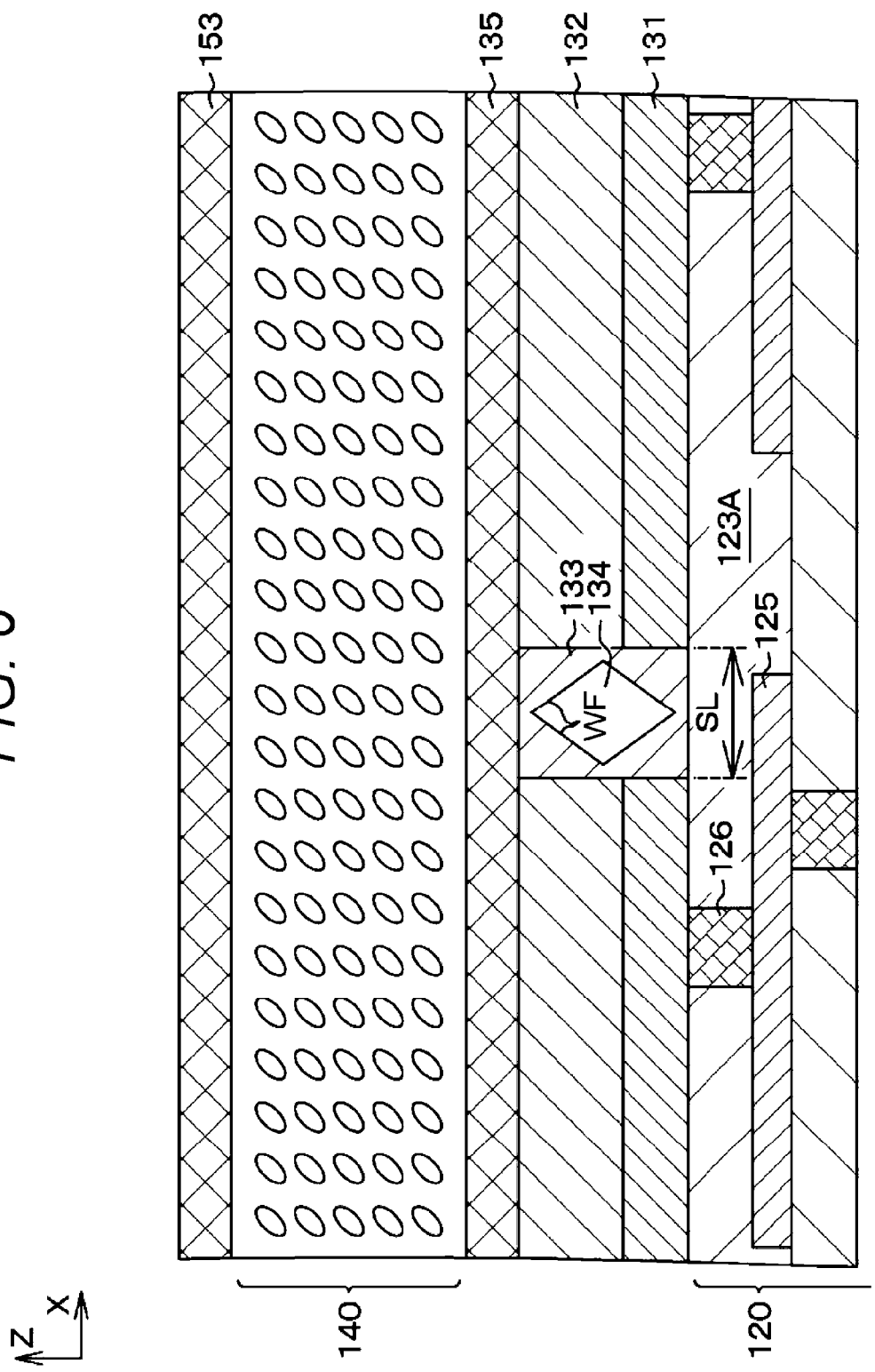
FIG. 6 is a schematic cross-sectional view for explaining a cross-sectional shape of a portion between adjacent pixel electrodes.
Figure 10:
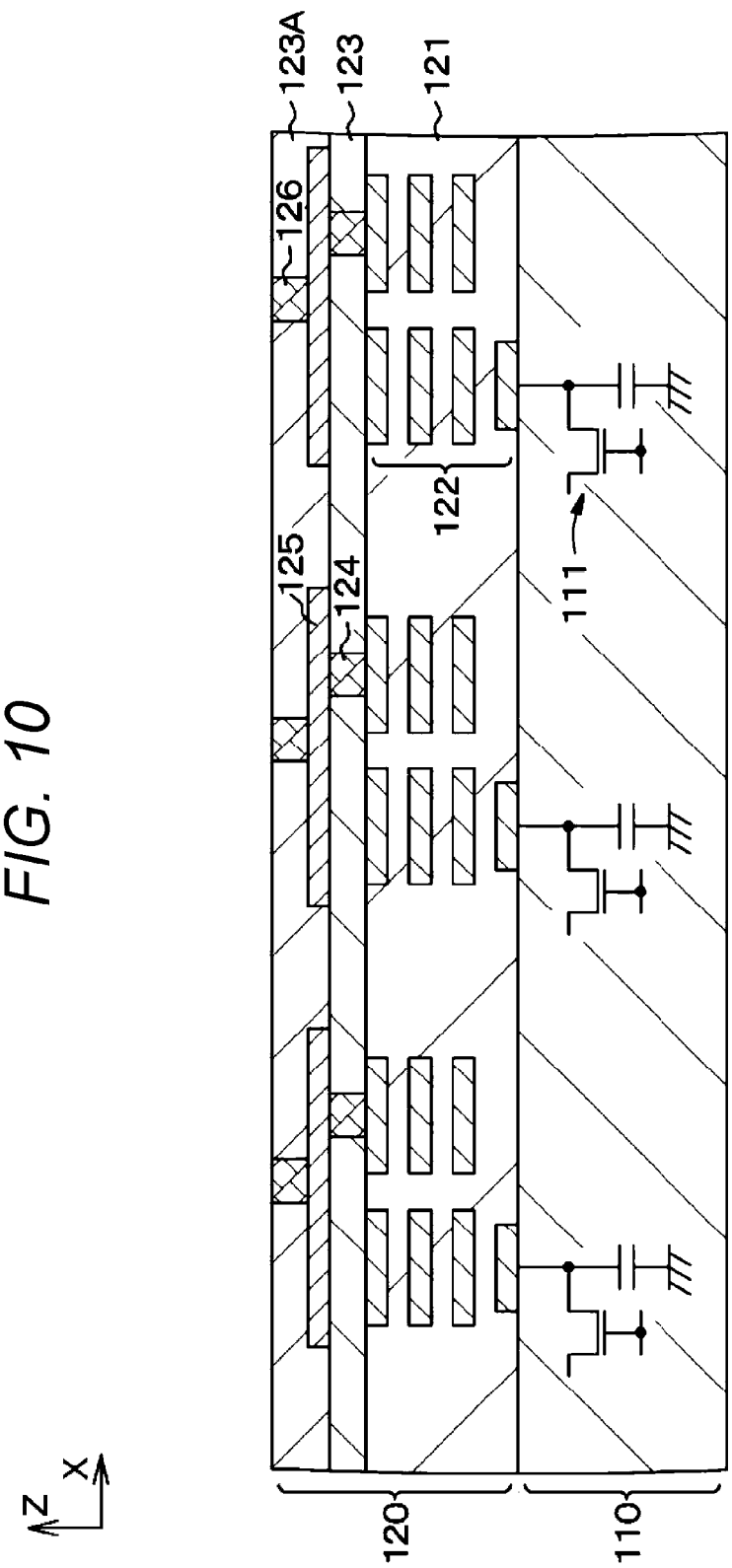
FIG. 10 is a schematic partial cross-sectional view of a substrate and the like for explaining the method for manufacturing the liquid crystal display element according to the first embodiment, following FIG. 9B.

As illustrated in FIG. 6, the hollow portion 134 of the second dielectric film 133 has a wall surface WF expanding toward the drive substrate 100 side. Then, at least a part of the light incident on the second dielectric film 133 is reflected by the wall surface WF of the hollow portion 134 toward the pixel electrode 131 side.

Note that, in FIG. 6, the wall surface WF of the hollow portion 134 is represented as a plane, but this is merely an example. In practice, the cross-sectional shape of the hollow portion 134 can take various shapes depending on the film formation conditions of the second dielectric film 133. The wall surface WF may be a curved surface having a constant curvature or a curved surface whose curvature gradually changes. Furthermore, in FIG. 6, the cross section of the hollow portion 134 is represented as a rhombus, but may be a triangle having the wall surface WF as two sides.

Here, in order to facilitate understanding of the present disclosure, the function of the hollow portion 134 of the liquid crystal display element 1 will be described in comparison with the liquid crystal display element according to the reference example.

FIG. 7A is a schematic cross-sectional view for explaining a cross-sectional shape of a portion between adjacent pixel electrodes in a liquid crystal display element according to a reference example. FIG. 7B is a schematic cross-sectional view for explaining a state of light incident on the portion between adjacent pixel electrodes.

In the liquid crystal display element according to the reference example, as illustrated in FIG. 7A, the pixel electrodes 131 and the slit portion SL are entirely covered with the first dielectric film 132. In this case, the light incident on the slit portion SL passes through the slit portion SL as it is and travels toward the lower layer as illustrated in FIG. 7B. Therefore, these lights do not contribute to the display of the image.

FIG. 8A is a schematic cross-sectional view for explaining a cross-sectional shape of a portion between adjacent pixel electrodes in the liquid crystal display element according to the first embodiment. FIG. 8B is a schematic cross-sectional view for explaining a state of light incident on the portion between adjacent pixel electrodes.

In the liquid crystal display element 1, as illustrated in FIG. 8A, the second dielectric film 133 is disposed on the slit portion SL, and the hollow portion 134 is formed therein. The hollow portion 134 has the wall surface WF expanding toward the drive substrate side. Therefore, as illustrated in FIG. 8B, at least a part of the light incident on the second dielectric film 133 is reflected by the wall surface WF of the hollow portion 134 and directed toward the pixel electrode 131 side. As a result, the light incident on the slit portion SL also contributes to the display of the image, so that the light utilization efficiency can be enhanced. From the viewpoint of total reflection of light, when the second dielectric film 133 is constituted by silicon oxide, the wall surface WF preferably has an angle of 47 degrees or less with respect to the Z direction.

Note that, in some cases, it is also conceivable that the second dielectric film 133 is constituted by a material having a higher refractive index than that of the material constituting the first dielectric film 132. For example, it is conceivable that the first dielectric film 132 is constituted by silicon oxide, and the second dielectric film 133 is constituted by any one of the group including silicon nitride, tantalum oxide, titanium oxide, and niobium oxide.

From the viewpoint of total reflection of light, when the second dielectric film 133 is constituted by silicon nitride, the wall surface WF preferably has an angle of 59 degrees or less with respect to the Z direction. Furthermore, when the second dielectric film 133 is constituted by tantalum oxide, the wall surface WF preferably has an angle of 63 degrees or less with respect to the Z direction.

Next, the counter substrate 150 will be described. As illustrated in FIG. 3, the counter substrate 150 disposed opposite to the drive substrate 100 includes a rectangular base material 151 constituted by, for example, quartz glass, a counter electrode 152 provided on a surface on the liquid crystal material layer 140 side, and an alignment film 153 provided on the counter electrode 152, and further includes a polarizer 154 disposed on the base material 151. The configuration of the polarizer 154 is not particularly limited, and may be an absorption type polarizer or a wire grid polarizer. In a case where heat resistance is required, the polarizer 154 is preferably a wire grid polarizer.

The liquid crystal material layer 140 is sandwiched between the alignment film 135 of the drive substrate 100 and the alignment film 153 of the counter substrate 150. The alignment state of the liquid crystal molecules 141 at the time of no electric field is defined by the alignment films 135 and 153. The liquid crystal display element 1 is, for example, a vertical alignment (VA) type liquid crystal display element.

The structure of the liquid crystal display element 1 has been described in detail above. Note that the relay electrodes and the like described in the wiring layer 120 can take various shapes depending on the configuration of the liquid crystal display element. Furthermore, the lamination relationship illustrated in FIG. 3 is merely an example, and a preferable configuration is only required to be appropriately obtained according to the configuration of the liquid crystal display element.

Next, a method for manufacturing the liquid crystal display element 1 including a method for manufacturing the drive substrate 100 will be described. The method for manufacturing the liquid crystal display element 1 includes: a step of forming a conductive material layer constituting the pixel electrodes 131 on a display surface side of the drive substrate 100; a step of forming a dielectric film constituting a first dielectric film 132 on the conductive material layer; a step of patterning the dielectric film and the conductive material layer to form a slit portion SL that separates the pixel electrodes 131; a step of forming a dielectric material layer having a hollow portion 134 extending along the slit portion SL on an entire surface including an inside of the slit portion SL by conformal film formation; and a step of forming a second dielectric film 133 formed in the slit portion SL by performing flattening processing on the dielectric material layer.

FIGS. 9A, 9B, 10, 11, 12, 13, 14, 15, and 16 are various drawings for explaining a method for manufacturing the liquid crystal display element 1. Hereinafter, a method for manufacturing the liquid crystal display element 1 will be described in detail.

[Step-100] (See FIGS. 9A, 9B, and 10) The support substrate 110 on which the transistors 111 are formed is prepared (see FIG. 9A), and a lower layer portion of the wiring layer 120 is formed thereon by a well-known film forming method or patterning method (see FIG. 9B). The wirings, the electrodes, and the like constituting the wirings 122 can be constituted by, for example, a metal material such as tungsten (W) or Al—Cu. It similarly applies to other wirings and electrodes described later. The insulating layer 121 can be formed using, for example, silicon oxide. It similarly applies to other insulating layers and the like.

Next, after the interlayer insulating layer 123 is formed on the wirings 122 (more specifically, on the insulating layer 121), the vias 124 penetrating the interlayer insulating layer 123 are formed. Thereafter, a conductive film constituted by a metal material is formed on the interlayer insulating layer 123, and patterning is performed by a well-known patterning method to form the first relay electrodes 125. Next, the interlayer insulating layer 123A is formed on the entire surface including surfaces on the first relay electrodes 125, and then the vias 126 penetrating the interlayer insulating layer 123A are formed. (See FIG. 10). Through the above steps, the wiring layer 120 can be formed on the support substrate 110.

Figure 11:
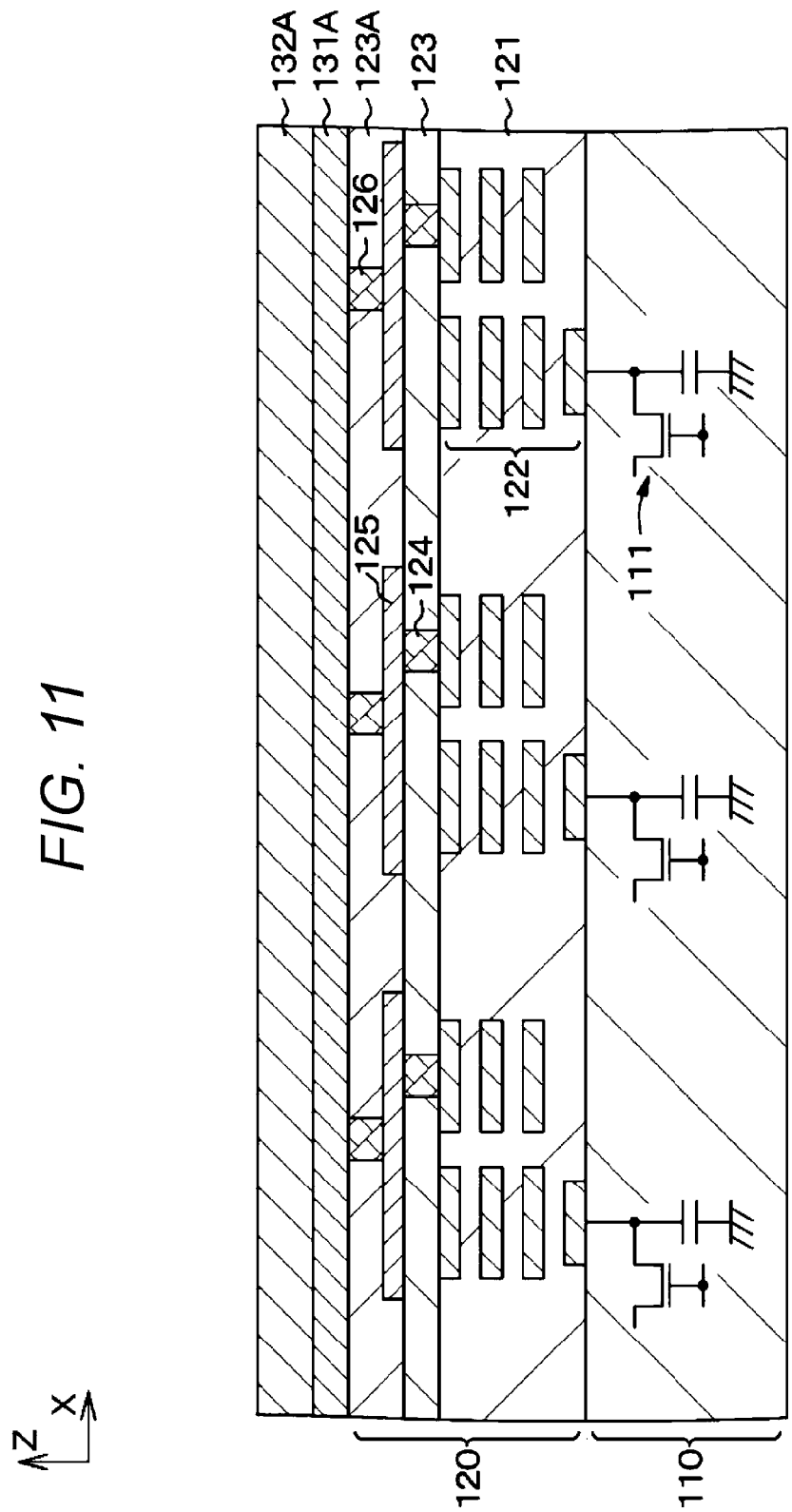
FIG. 11 is a schematic partial cross-sectional view of a substrate and the like for explaining the method for manufacturing the liquid crystal display element according to the first embodiment, following FIG. 10.
Figure 12:
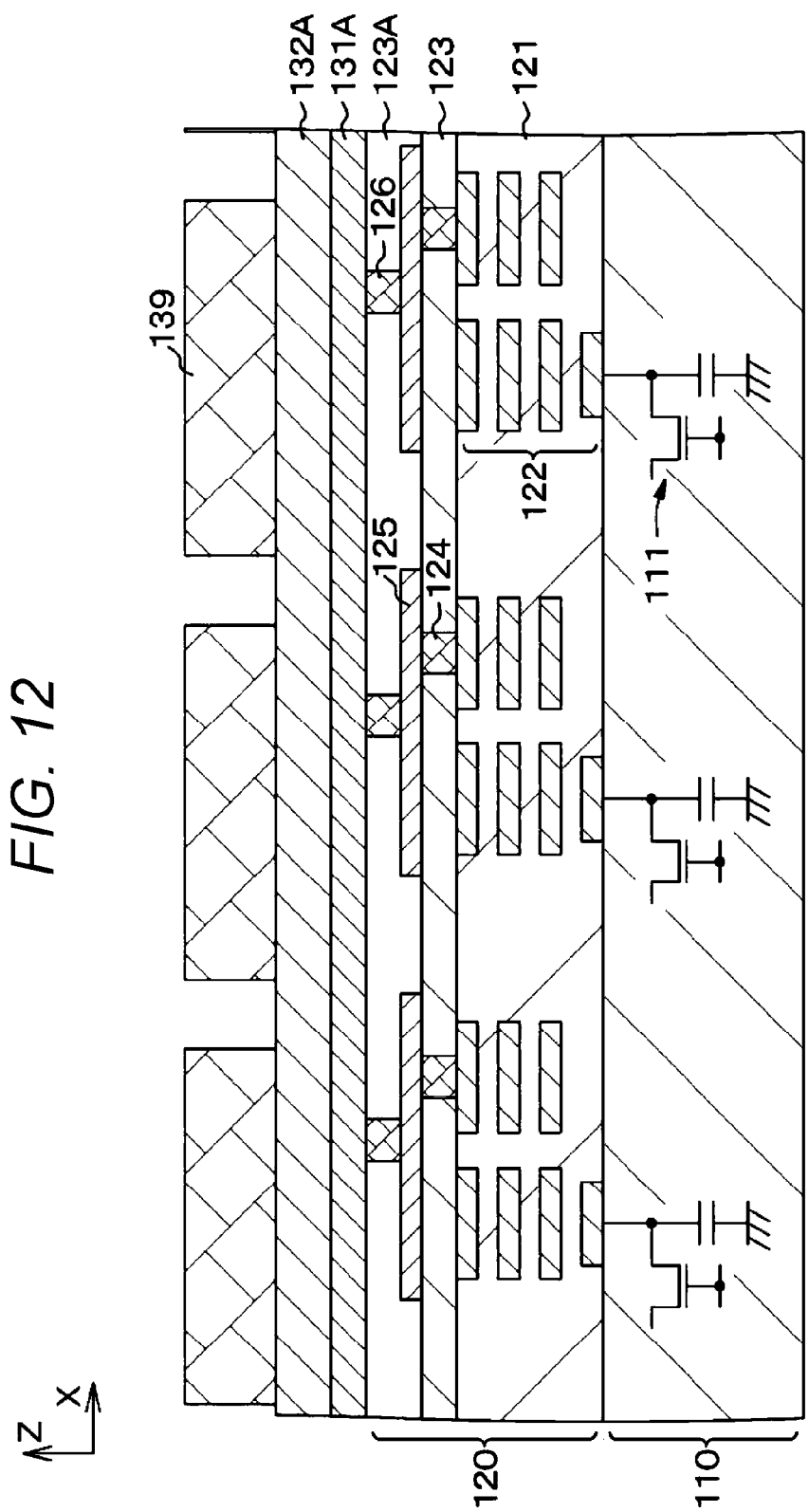
FIG. 12 is a schematic partial cross-sectional view of a substrate and the like for explaining the method for manufacturing the liquid crystal display element according to the first embodiment, following FIG. 11.
Figure 13:
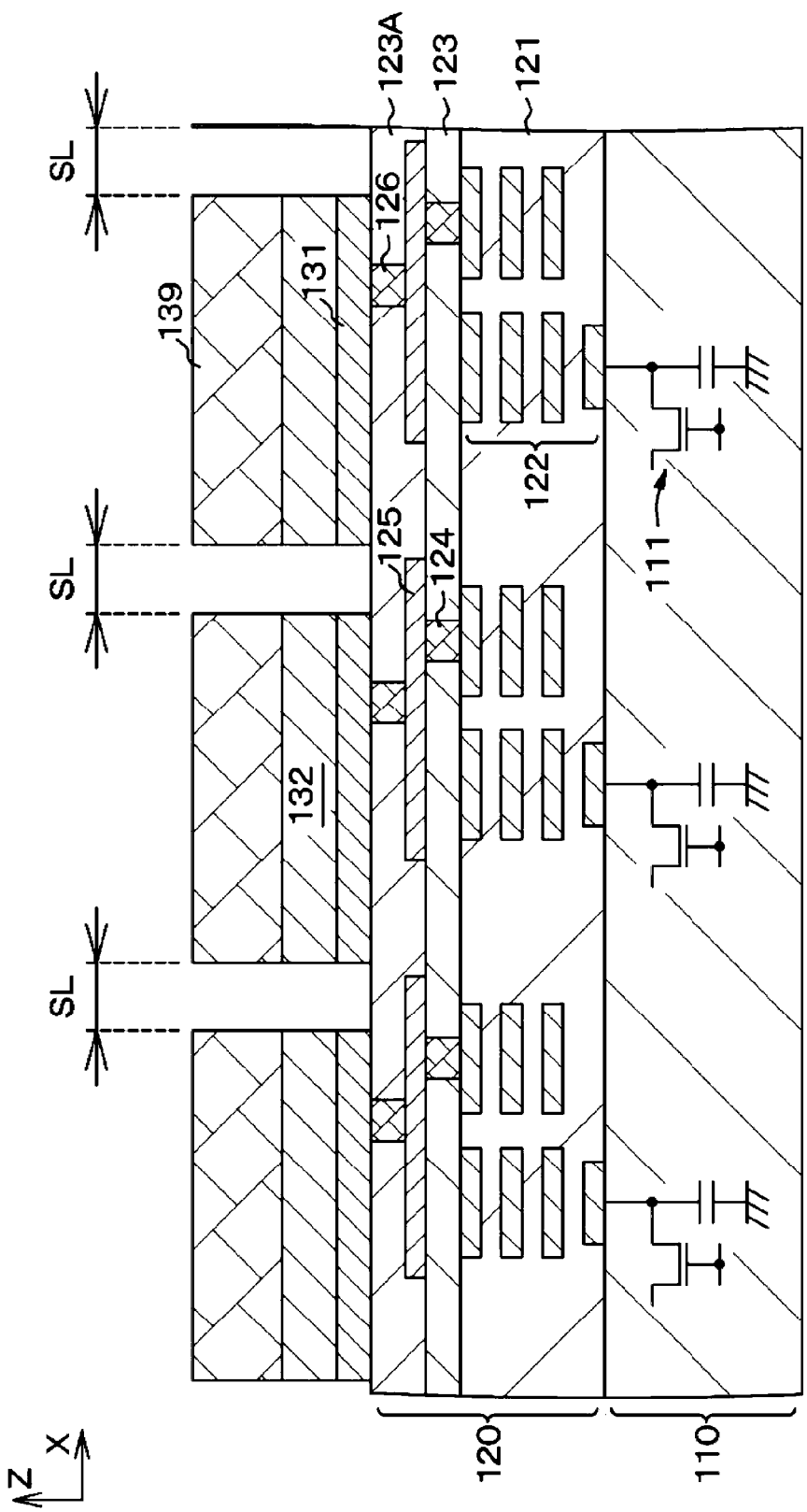
FIG. 13 is a schematic partial cross-sectional view of a substrate and the like for explaining the method for manufacturing the liquid crystal display element according to the first embodiment, following FIG. 12.
Figure 14:
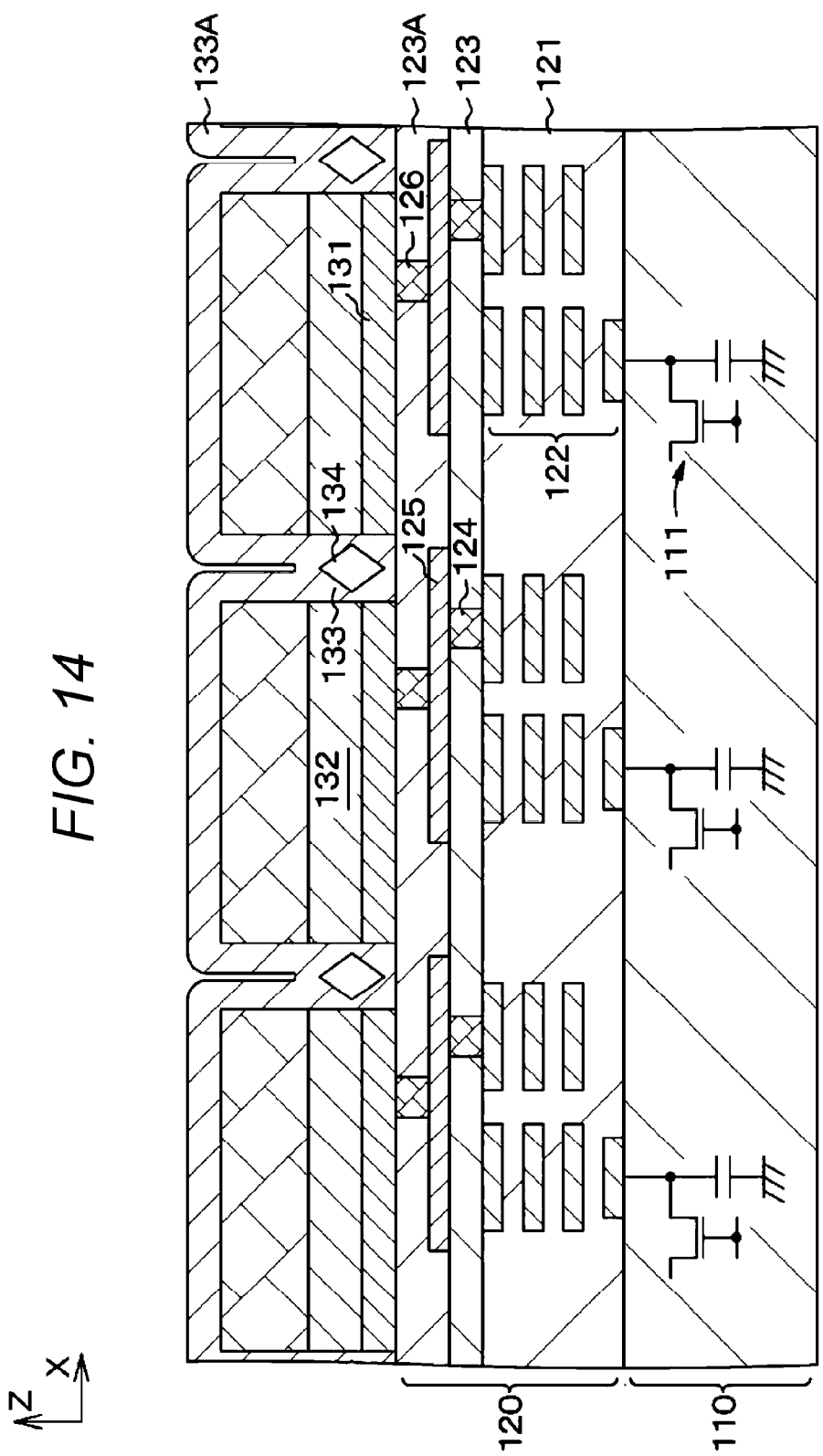
FIG. 14 is a schematic partial cross-sectional view of a substrate and the like for explaining the method for manufacturing the liquid crystal display element according to the first embodiment, following FIG. 13.

[Step-110] (See FIGS. 11, 12, 13, 14, and 15) Thereafter, a step of forming a conductive material layer 131A for constituting the pixel electrode 131 on the display surface side (that is, the front surface side of the wiring layer 120) of the drive substrate 100 and a step of forming a dielectric film 132A for constituting the first dielectric film 132 on the conductive material layer 131A are performed (see FIG. 11).

Next, the dielectric film 132A and the conductive material layer 131A are patterned to form the slit portion SL that separates the pixel electrodes 131. First, a mask 139 having an opening corresponding to the slit portion SL is formed on the dielectric film 132A (see FIG. 12), and thereafter dry etching processing is performed to form the slit portion SL that separates the dielectric film 132A and the conductive material layer 131A (see FIG. 13). As a result, the pixel electrodes 131 and the first dielectric film 132 formed thereon can be obtained.

Next, the dielectric material layer 133A having the hollow portion 134 extending along the slit portion SL is formed on the entire surface including the inside of the slit portion SL by conformal film formation. By performing the conformal film formation, the hollow portion 134 is formed along the slit portion SL (see FIG. 14). Thereafter, the second dielectric film 133 formed in the slit portion SL can be formed by applying flattening processing to the dielectric material layer 133A (see FIG. 15). Subsequently, the alignment film 135 is formed by being laminated on the entire surface (see FIG. 16). The drive substrate 100 can be obtained by the above steps.

[Step-120] (See FIG. 3) Next, a counter substrate 150 including a rectangular base material 151 constituted by, for example, quartz glass, a counter electrode 152 provided on one surface of the base material 151, and an alignment film 153 provided on the counter electrode 152 is prepared. Then, the drive substrate 100 and the counter substrate 150 are opposed to each other with the liquid crystal material layer 140 interposed therebetween, and the periphery is sealed. Thereafter, the polarizer 154 is disposed on the other surface of the base material 151, whereby the liquid crystal display element 1 can be obtained.

[Second Embodiment and Modifications] A second embodiment also relates to a liquid crystal display element, a display device, an electronic device, a drive substrate, and a method for manufacturing the drive substrate according to the present disclosure.

Figure 17:
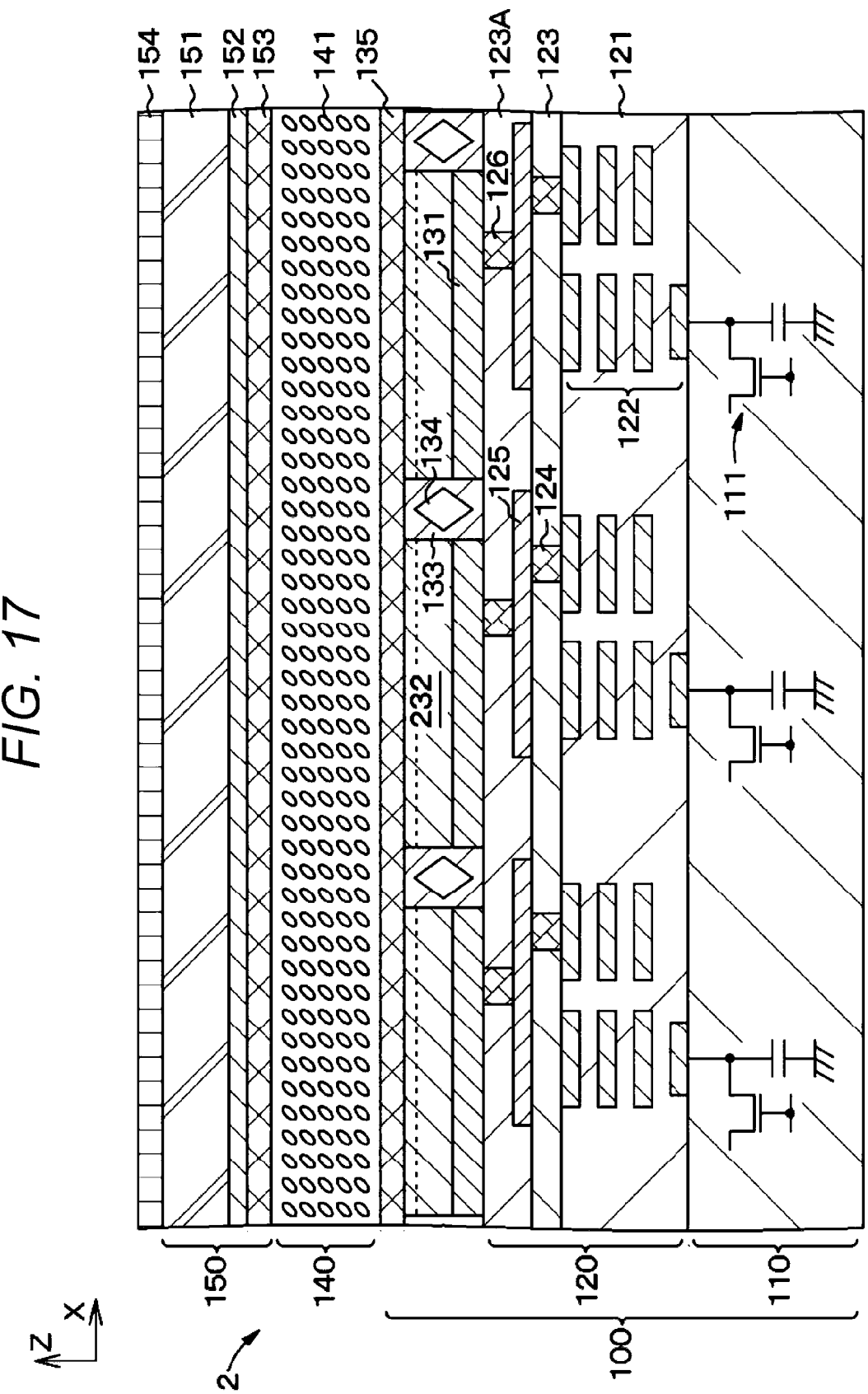
FIG. 17 is a schematic partial cross-sectional view of a substrate and the like for explaining a structure of a liquid crystal display element according to a second embodiment.

FIG. 17 is a schematic partial cross-sectional view of a substrate and the like for explaining the structure of the liquid crystal display element according to the second embodiment, and is a view corresponding to FIG. 3 referred to in the first embodiment. A schematic plan view for explaining the liquid crystal display element according to the second embodiment is only required to be obtained by replacing the liquid crystal display element 1 with the liquid crystal display element 2 in FIG. 1.

In the liquid crystal display element 1 according to the first embodiment, the first dielectric film 132 includes a single layer of silicon oxide. On the other hand, in the liquid crystal display element 2 according to the second embodiment, a first dielectric film 232 includes a lower layer portion on the pixel electrode 131 side and an upper layer portion laminated on the lower layer portion. Then, the upper layer portion is constituted by a material having a refractive index higher than that of the material constituting the lower layer portion.

Figure 18:
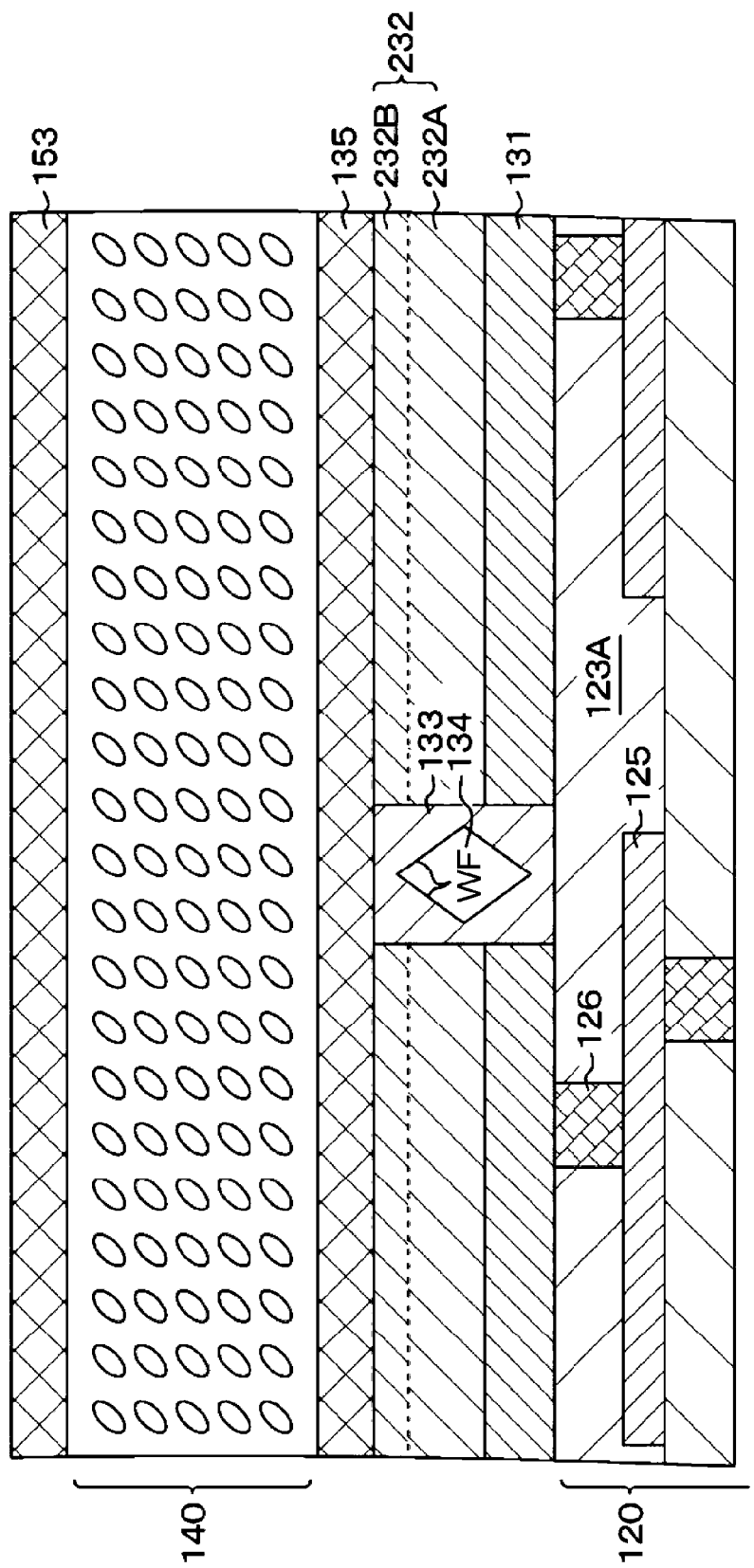
FIG. 18 is a schematic cross-sectional view for explaining a cross-sectional shape of a portion between adjacent pixel electrodes.

FIG. 18 is a schematic cross-sectional view for explaining a cross-sectional shape of a portion between adjacent pixel electrodes.

In the liquid crystal display element 2, the first dielectric film 232 on the pixel electrodes 131 is configured by laminating a lower layer portion 232A and an upper layer portion 232B. For example, the lower layer portion 232A is constituted by silicon oxide, and the upper layer portion 232B is constituted by silicon nitride.

FIG. 19A is a schematic cross-sectional view for explaining a state of light incident on the vicinity of the pixel electrode end in the liquid crystal display element according to the first embodiment. FIG. 19B is a schematic cross-sectional view for explaining a state of light incident on the vicinity of the pixel electrode end in the liquid crystal display element according to the second embodiment.

As illustrated in FIG. 19A, in the liquid crystal display element 1 according to the first embodiment, light incident on the second dielectric film 133 but not reaching the hollow wall WF passes through the second dielectric film 133 as it is. This light does not contribute to the display of the image.

On the other hand, in the liquid crystal display element 2 of the second embodiment, the traveling direction of the light incident on the second dielectric film 133 but not reaching the hollow wall WF also changes. That is, since the speed of light incident on the vicinity of the boundary between the first dielectric film 132 and the second dielectric film 133 is relatively low in the upper layer portion 232B, the traveling direction is directed toward the pixel electrode 131 side. Therefore, the light incident on the second dielectric film 133 but not reaching the hollow wall WF also contributes to the display of the image, so that the light utilization efficiency can be further increased.

The method for manufacturing the liquid crystal display element 2 of the second embodiment is similar to the manufacturing method described in the first embodiment except that the dielectric film 132A has the laminated structure of the lower layer portion 232A and the upper layer portion 232B in FIG. 11 of [Step-110] described in the first embodiment. Note that a sacrificial film constituted by silicon oxide may be disposed on the upper layer portion 232B before forming the mask 139. By providing the taper in the sacrificial layer at the time of the dry etching processing, the width of the gap portion SL can be processed to be narrower.

Next, a first modification of the second embodiment will be described.

Figure 20:
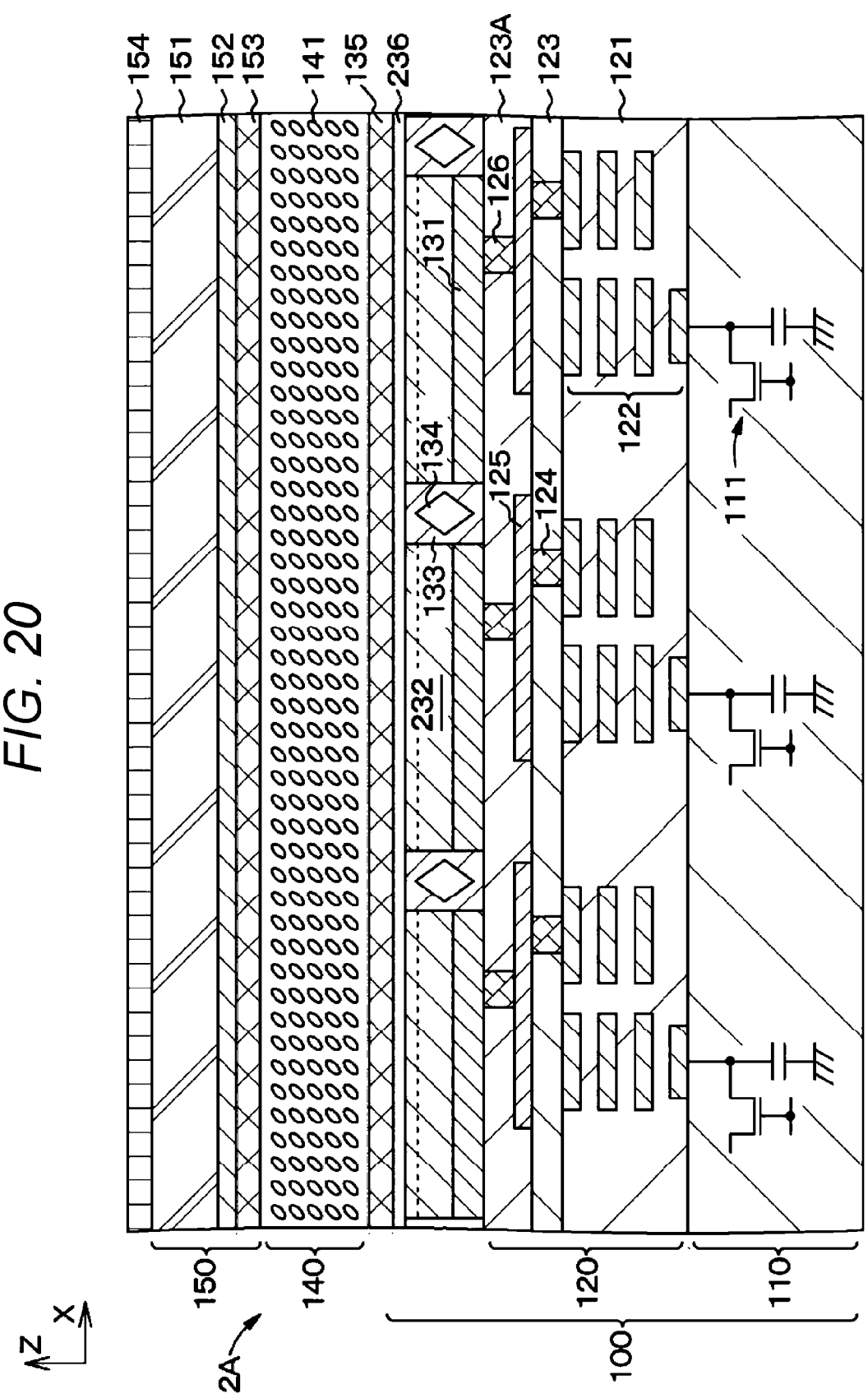
FIG. 20 is a schematic partial cross-sectional view of a substrate and the like for explaining a structure of a liquid crystal display element according to a first modification of the second embodiment.

FIG. 20 is a schematic partial cross-sectional view of a substrate and the like for explaining a structure of a liquid crystal display element according to a first modification of the second embodiment, and is a view corresponding to FIG. 3 referred to in the first embodiment. A schematic plan view for explaining the liquid crystal display element according to the first modification is only required to be obtained by replacing the liquid crystal display element 1 with the liquid crystal display element 2A in FIG. 1.

Figure 21:
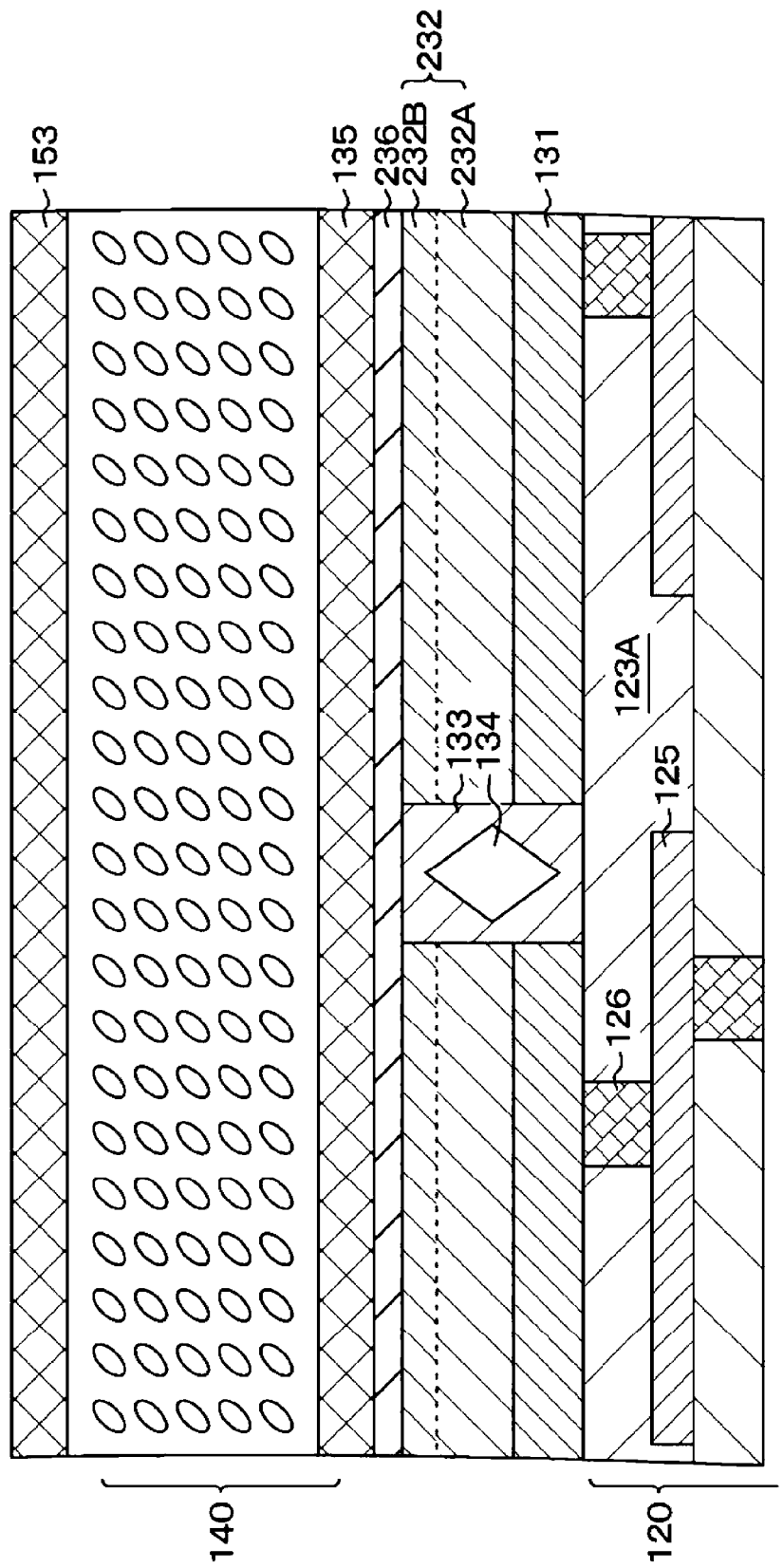
FIG. 21 is a schematic cross-sectional view for explaining a cross-sectional shape of a portion between adjacent pixel electrodes.

FIG. 21 is a schematic cross-sectional view for explaining a cross-sectional shape of a portion between adjacent pixel electrodes. In the liquid crystal display element 2A, the first dielectric film 232 and the second dielectric film 133 are covered with a cap layer 236. The cap layer 236 is constituted by silicon nitride or tantalum oxide. By providing the cap layer, an upper portion of the formed void is filled, so that an effect of improving reliability can be obtained.

Figure 15:
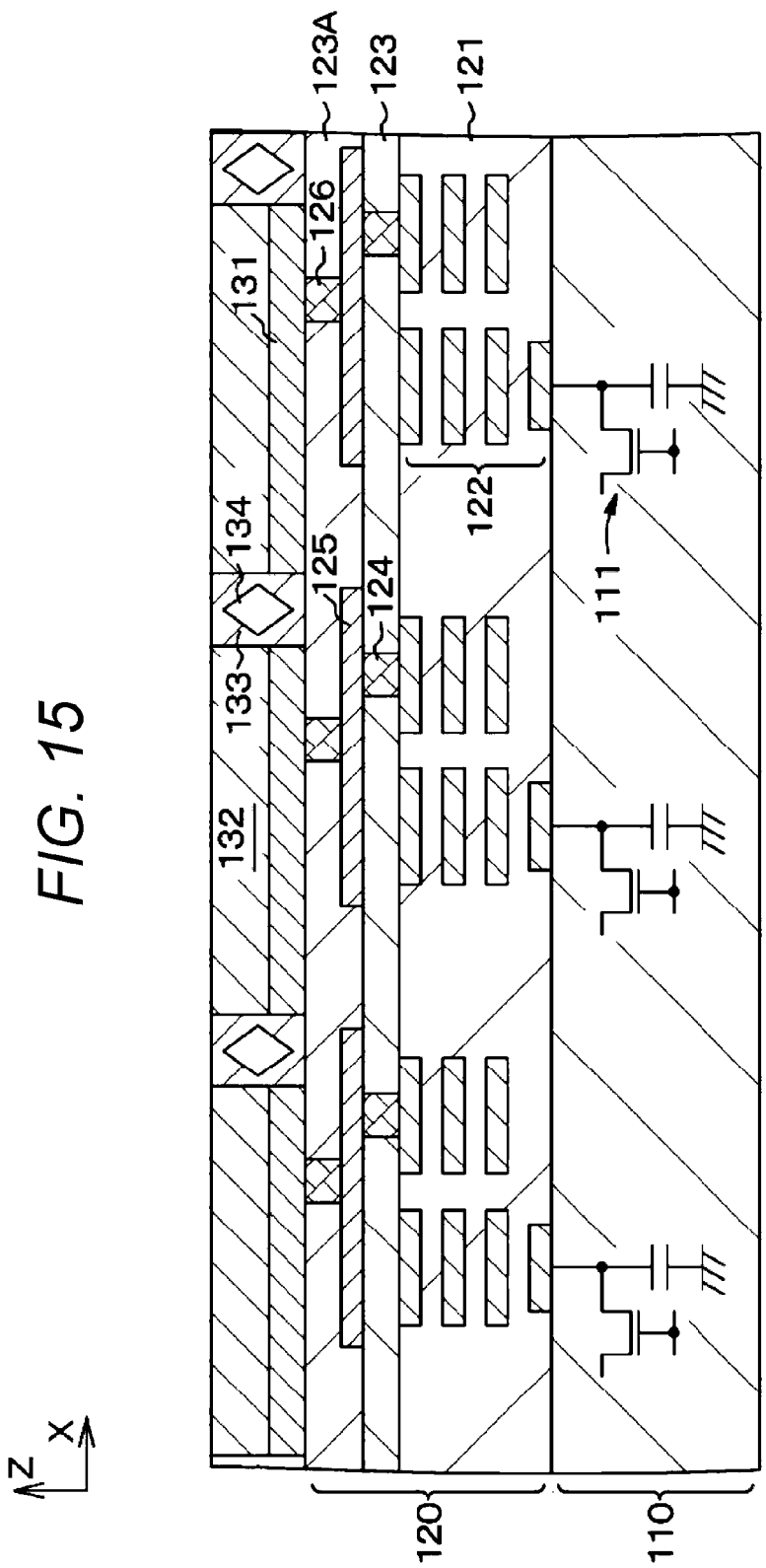
FIG. 15 is a schematic partial cross-sectional view of a substrate and the like for explaining the method for manufacturing the liquid crystal display element according to the first embodiment, following FIG. 14.
Figure 16:
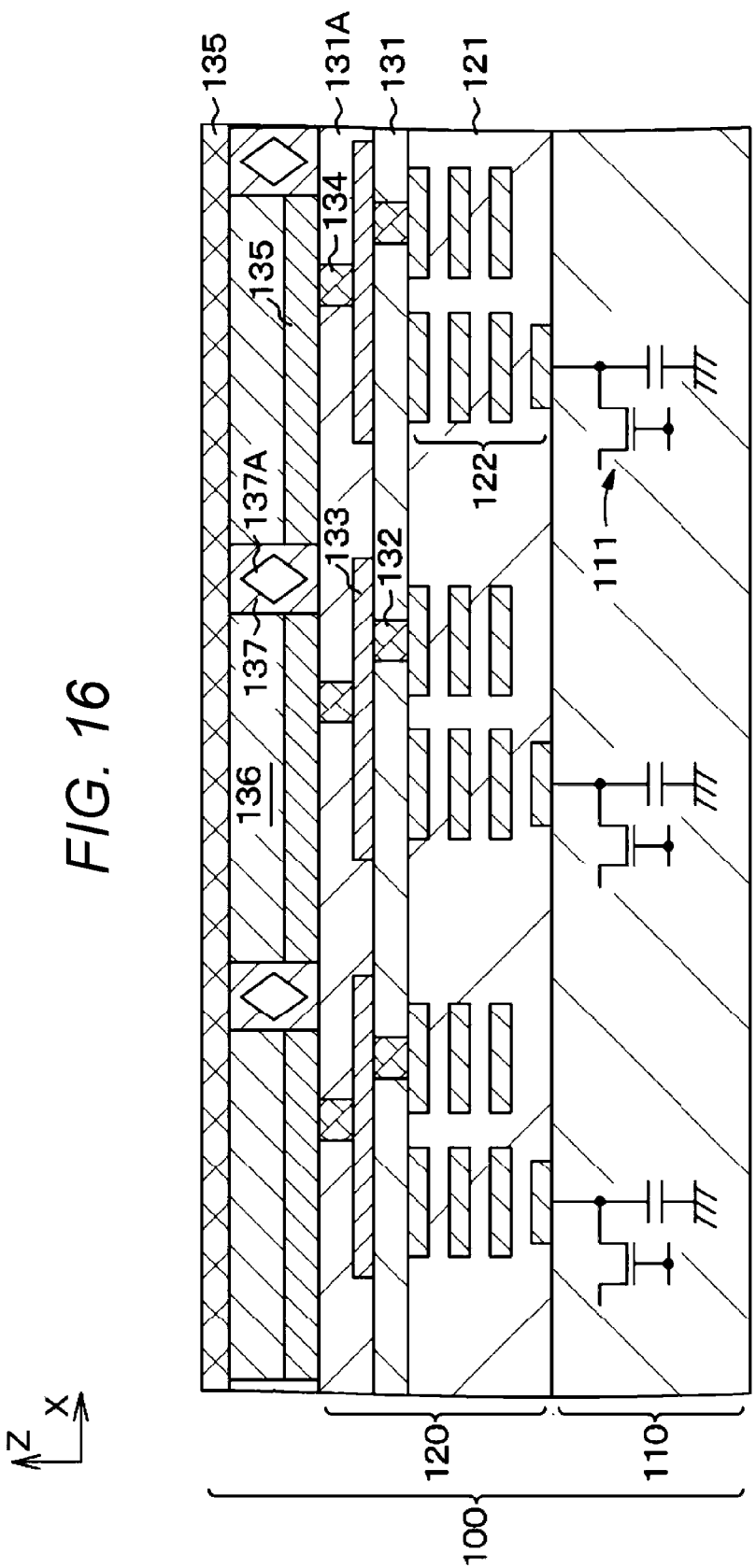
FIG. 16 is a schematic partial cross-sectional view of a substrate and the like for explaining the method for manufacturing the liquid crystal display element according to the first embodiment, following FIG. 15.

The method for manufacturing the liquid crystal display element 2A is similar to the manufacturing method described in the first embodiment except that in FIG. 11 of [Step-110] described in the first embodiment, the dielectric film 132A has a laminated structure of the lower layer portion 232A and the upper layer portion 232B, and the cap layer 236 is formed after the flattening processing illustrated in FIG. 15 is performed. Note that a sacrificial film constituted by silicon oxide may be disposed on the upper layer portion 232B before forming the mask 139. By performing the dry etching processing in a state where the sacrificial film is disposed, the width of the gap portion SL can be processed to be narrower. Note that a cap layer may be provided in the liquid crystal display element 1 according to the first embodiment.

[Arrangement Example of Pixel Electrodes] In each of the above-described embodiments, it has been described that the pixel electrodes 131 are arranged in a grid pattern, but this is merely an example. From the viewpoint of forming the hollow portion 134 of the second dielectric film 133, the pixel electrodes can take various arrangements.

FIG. 22A is a schematic cross-sectional view for explaining a cross-sectional shape of a portion between adjacent pixel electrodes, and illustrates a case where a distance between the adjacent pixel electrodes is appropriate. FIG. 22B is a schematic cross-sectional view for explaining a cross-sectional shape of a portion between adjacent pixel electrodes, and illustrates a case where a distance between the adjacent pixel electrodes is excessive.

When the width of the slit portion SL is appropriate, the hollow portion 134 is formed inside in the film forming process of the second dielectric film 133 (see FIG. 22A). However, if the width of the slit portion SL is too wide, the hollow portion 134 does not fit in the second dielectric film 133 (see FIG. 22B). Therefore, it is preferable to suppress the fluctuation of the width of the slit portion SL (more specifically, a distance between adjacent electrodes facing each other) as much as possible.

Figure 23:
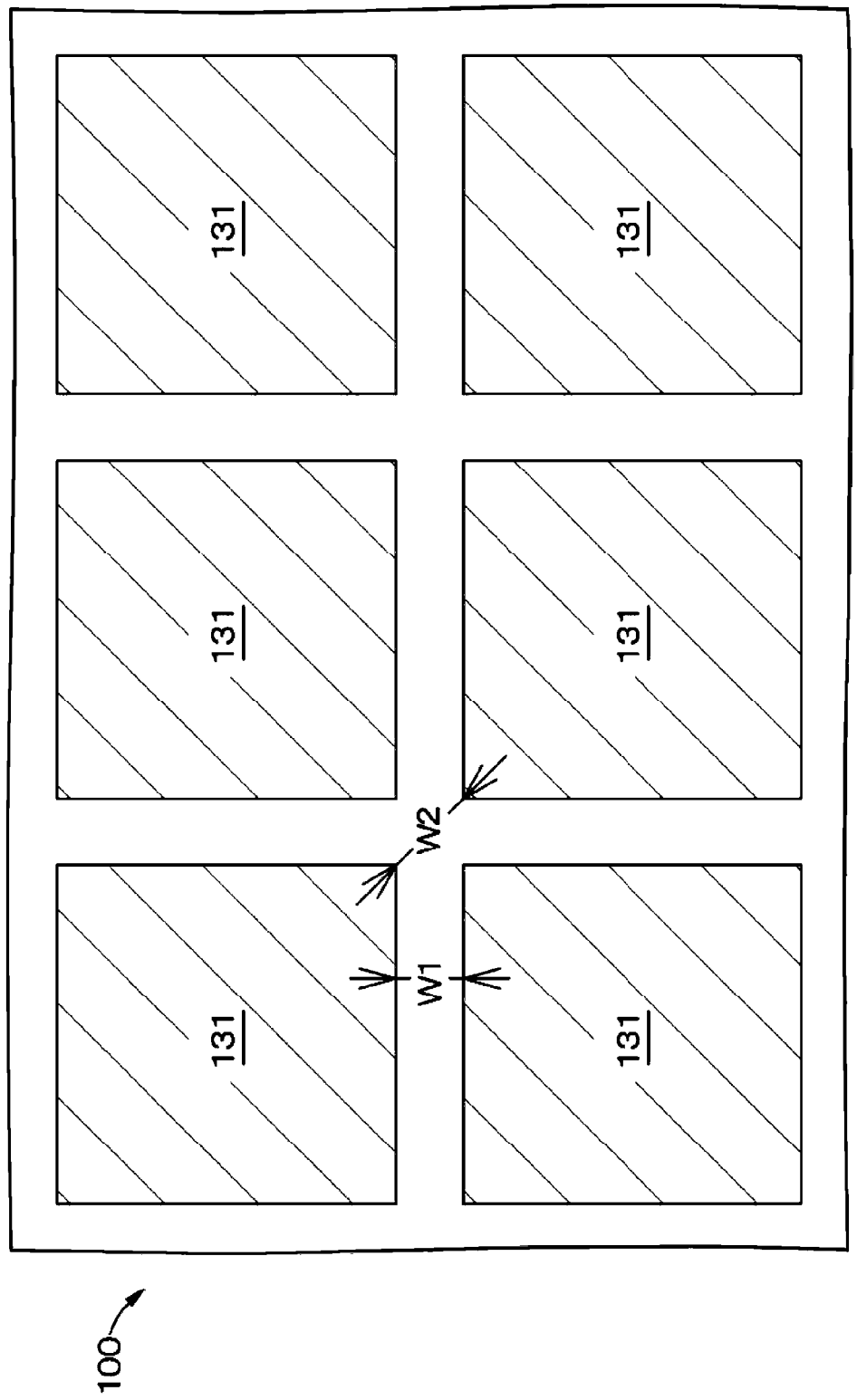
FIG. 23 is a schematic plan view for explaining a distance between adjacent pixel electrodes.
Figure 24:
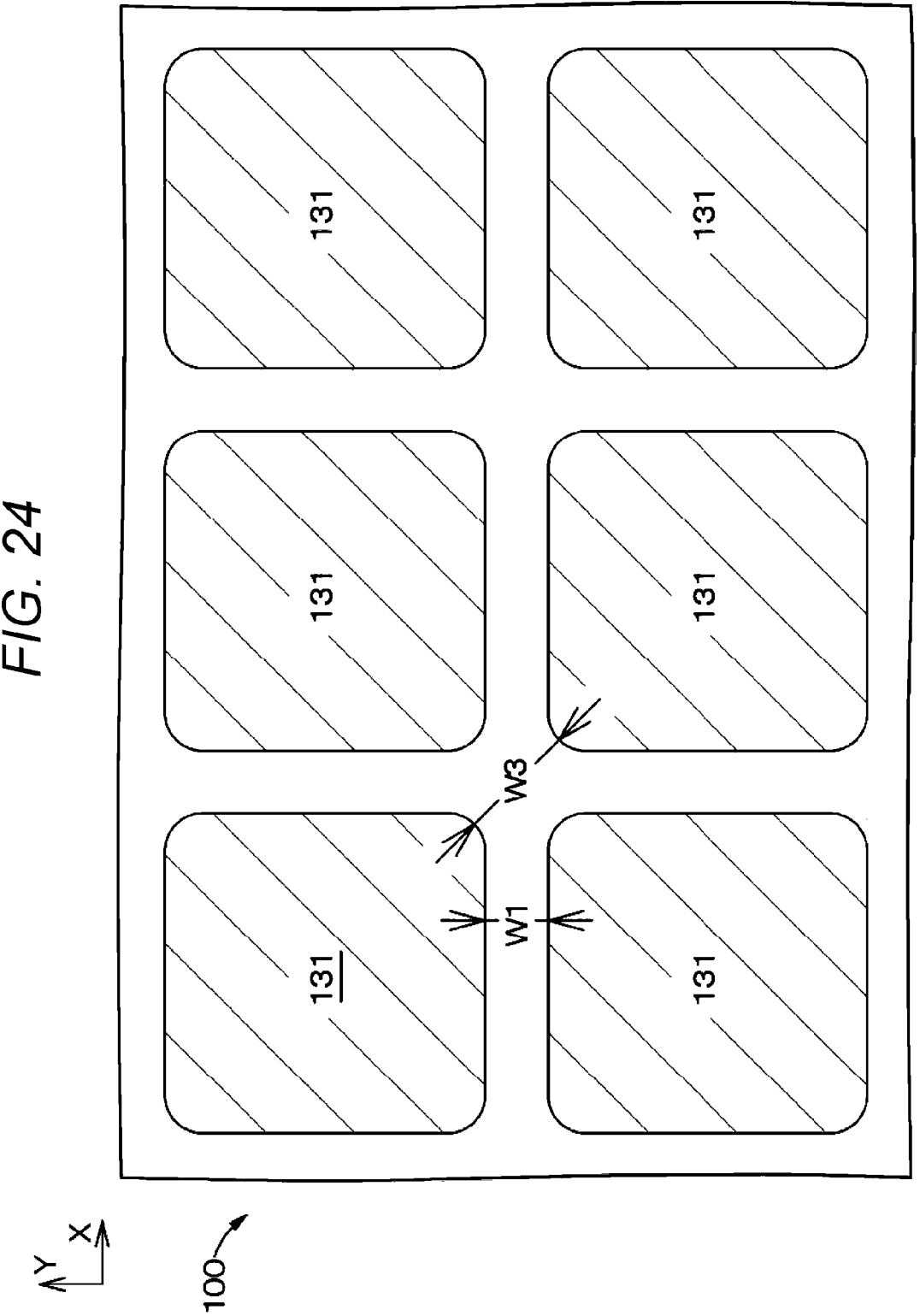
FIG. 24 is a schematic plan view for explaining a distance between adjacent pixel electrodes, following FIG. 23.

FIG. 23 is a schematic plan view for explaining a distance between adjacent pixel electrodes. FIG. 24 is a schematic plan view for explaining a distance between adjacent pixel electrodes, following FIG. 23.

When pixel electrodes 131 are disposed as illustrated in FIG. 23, a side portion of a pixel electrode 131 faces an adjacent pixel electrode 131 at a distance W1. However, corner portions of pixel electrodes 131 face each other at a distance W2. Here, the distance W1<the distance W2 holds.

Furthermore, in an actual process, corner portions of the pixel electrodes 131 tend to be rounded. As illustrated in FIG. 24, corner portions of pixel electrodes 131 face each other at a distance W3. Here, the distance W1<the distance W2<the distance W3 holds. Therefore, if pixel electrodes 131 are arranged in a grid pattern, a distance between adjacent pixel electrodes at corner portions of pixel electrodes 131 tends to be excessive.

Therefore, it is conceivable to arrange the pixel electrodes 131 such that the corners of the pixel electrodes 131 do not face each other.

Figure 25:
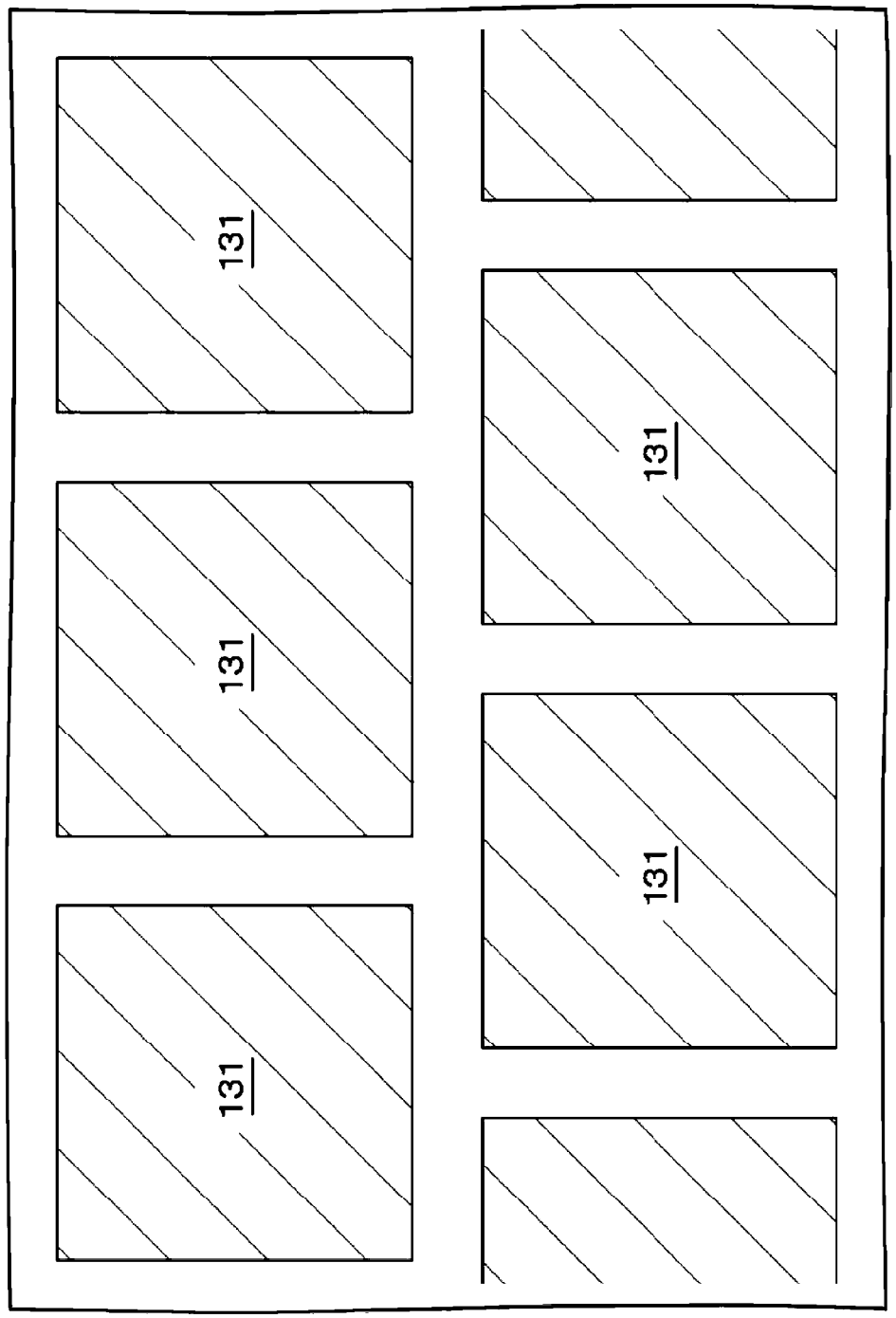
FIG. 25 is a schematic plan view for explaining an arrangement example of pixel electrodes in which enlargement of a distance in a diagonal direction of the pixel electrodes is suppressed.

FIG. 25 is a schematic plan view for explaining an arrangement example of the pixel electrodes in which enlargement of the distance in the diagonal direction of the pixel electrodes is suppressed. In the example illustrated in FIG. 25, the pixel electrodes 131 are arranged in a delta shape. As a result, a fluctuation in the distance between the adjacent pixel electrodes can be suppressed.

Alternatively, island-shaped protrusions may be arranged at portions where the corners of the pixel electrodes 131 face each other.

Figure 26:
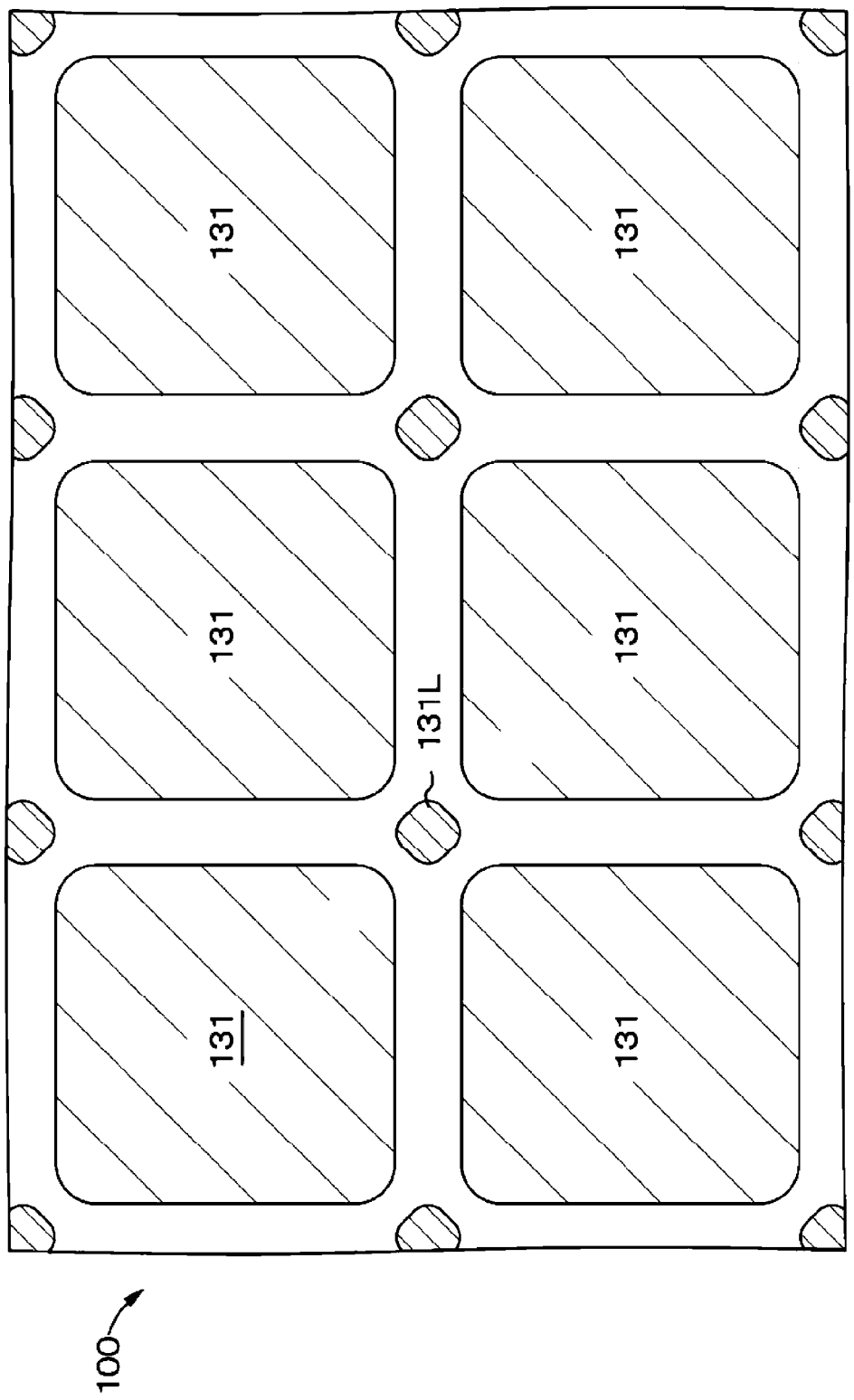
FIG. 26 is a schematic plan view for explaining an arrangement example in which enlargement of the distance in the diagonal direction of the pixel electrodes is suppressed by arranging island-shaped regions in the same layer as the pixel electrodes between the pixel electrodes.

FIG. 26 is a schematic plan view for explaining an arrangement example in which enlargement of the distance in the diagonal direction of the pixel electrodes is suppressed by arranging island-shaped regions in the same layer as the pixel electrodes between the pixel electrodes.

In this configuration, the island-shaped protrusions 131L are configured using a conductive material layer of the same layer as the pixel electrodes 131. As a result, it is possible to suppress the spread of the slit at the corner portions of the pixel electrodes 131.

[Description of Display Device and Electronic Device]
The liquid crystal display element according to the present disclosure described above can be used as a display section of an electronic device in any field that displays a video signal input to the electronic device or a video signal generated in the electronic device as an image or a video. As an example, it can be used as a display section of, for example, a television set, a digital still camera, a notebook personal computer, a mobile terminal device such as a mobile telephone, a video camera, a head mounted display, or the like.

The liquid crystal display element of the present disclosure also includes a liquid crystal display element having a module shape with a sealed configuration. Note that the display module may be provided with a circuit section for inputting and outputting signals and the like from the outside to the pixel array section, a flexible printed circuit (FPC), and the like. Hereinafter, a projection type display device is exemplified as a specific example of a display device using the liquid crystal display element of the present disclosure, and a digital still camera and a head mounted display are exemplified as an electronic device including the display device using the liquid crystal display element of the present disclosure. However, the specific example exemplified here is merely an example, and the present invention is not limited thereto.

(Specific Example 1) FIG. 27 is a conceptual diagram of a projection type display device using the liquid crystal display element of the present disclosure. The display device 400 includes a liquid crystal display element 1 and a light source section 410 that irradiates the liquid crystal display element 1 with light. More specifically, the display device 400 includes the light source section 410, a light optical system 420, a liquid crystal display element 1, an image control circuit 430 that drives the liquid crystal display element 1, a projection optical system 440, a screen 450, and the like. The light source section 410 can include, for example, various lamps such as a xenon lamp, and a semiconductor light emitting element such as a light emitting diode. The light optical system 420 is used to guide light from the light source section 410 to the liquid crystal display element 1, and includes optical elements such as a prism and a dichroic mirror. The liquid crystal display element 1 acts as a light valve, and an image is projected on the screen 450 through the projection optical system 440.

Figure 28A:
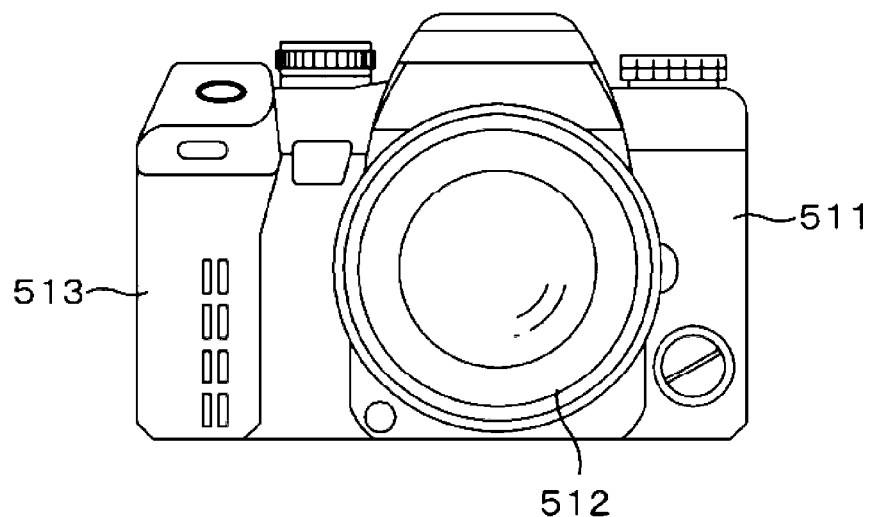
FIGS. 28A and 28B are external views of a lens interchangeable single lens reflex type digital still camera.
Figure 28B:
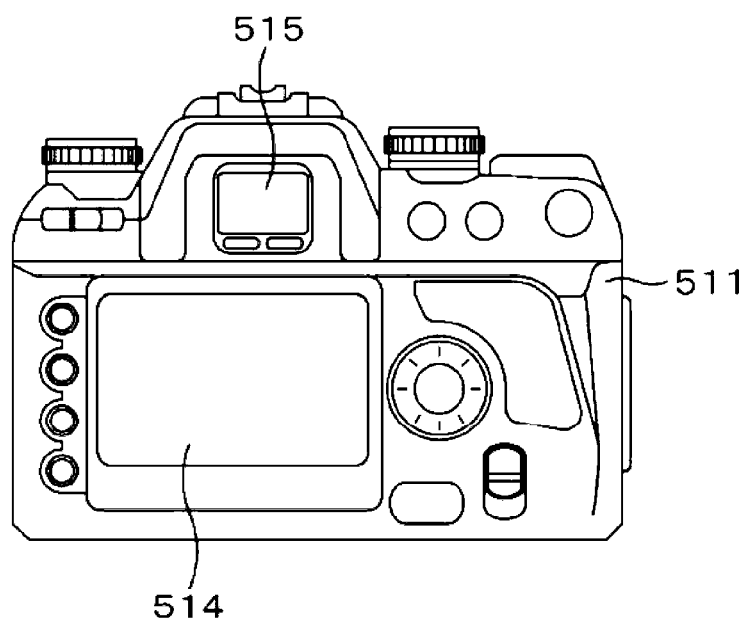

(Specific Example 2) FIGS. 28A and 28B are external views of a lens interchangeable single lens reflex type digital still camera, and FIG. 28A illustrates a front view thereof and FIG. 28B illustrates a rear view thereof. The lens interchangeable single lens reflex type digital still camera includes, for example, an interchangeable imaging lens unit (interchangeable lens) 512 on the front right side of a camera main body portion (camera body) 511, and a grip portion 513 to be held by a photographer on the front left side.

Then, a monitor 514 is provided substantially at the center of the back surface of the camera main body portion 511. A viewfinder (eyepiece window) 515 is provided above the monitor 514. By looking into the viewfinder 515, the photographer can visually recognize the optical image of the subject guided from the imaging lens unit 512 and determine the composition.

In the lens interchangeable single lens reflex type digital still camera having the configuration described above, the display device of the present disclosure can be used as the viewfinder 515. That is, the lens interchangeable single lens reflex type digital still camera according to the present example is manufactured by using the display device of the present disclosure as the viewfinder 515.

Figure 29:
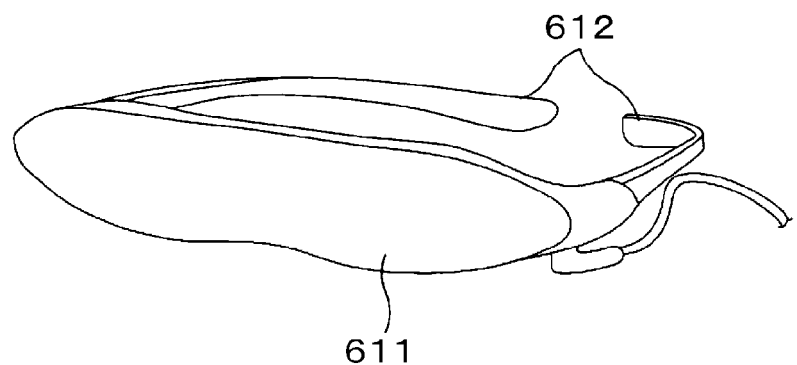
FIG. 29 is an external view of a head mounted display.

(Specific Example 3) FIG. 29 is an external view of a head mounted display. The head mounted display includes, for example, ear hooking portions 612 to be worn on the head of the user on both sides of the eyeglass-shaped display section 611. In the head mounted display, the display device of the present disclosure can be used as the display section 611. That is, the head mounted display according to the present example is manufactured by using the display device of the present disclosure as the display section 611.

Figure 30:
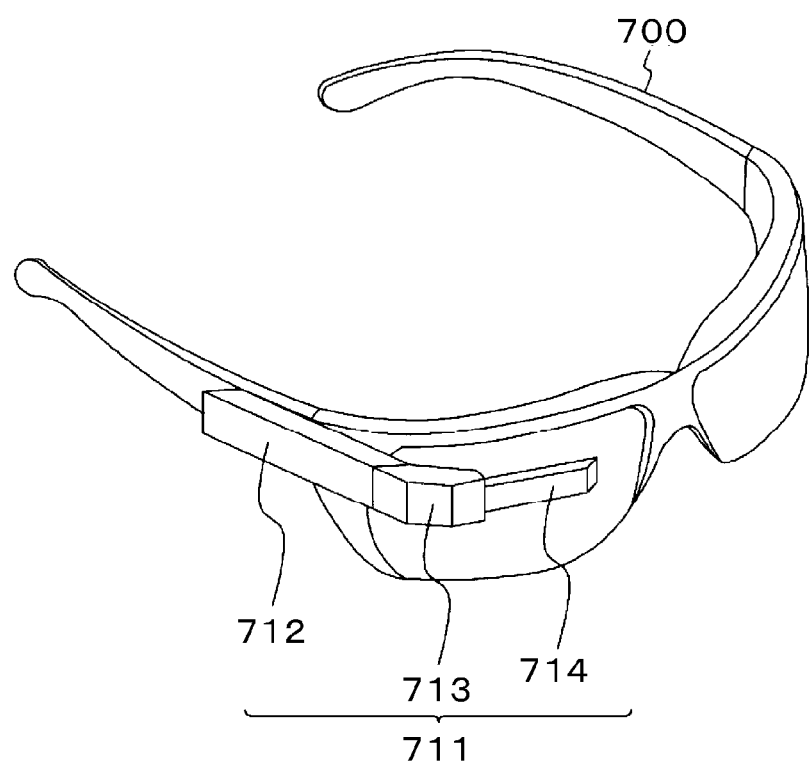
FIG. 30 is an external view of a see-through head mounted display.

(Specific Example 4) FIG. 30 is an external view of a see-through head mounted display. The see-through head mounted display 711 includes a main body portion 712, an arm 713, and a lens barrel 714.

The main body portion 712 is connected to the arm 713 and the glasses 700. Specifically, an end portion of the main body portion 712 in the long side direction is coupled to the arm 713, and one side of the side surface of the main body portion 712 is coupled to the glasses 700 via a connecting member. Note that the main body portion 712 may be directly mounted on the head of the human body.

The main body portion 712 incorporates a control substrate for controlling the operation of the see-through head mounted display 711 and a display section. The arm 713 connects the main body portion 712 and the lens barrel 714 and supports the lens barrel 714. Specifically, the arm 713 is coupled to the end portion of the main body portion 712 and the end portion of the lens barrel 714, and fixes the lens barrel 714. Furthermore, the arm 713 incorporates a signal line for communicating data related to an image provided from the main body portion 712 to the lens barrel 714.

The lens barrel 714 projects image light provided from the main body portion 712 via the arm 713 toward the eyes of the user wearing the see-through head mounted display 711 through the eyepiece. In the see-through head mounted display 711, the display device of the present disclosure can be used for the display section of the main body portion 712.

[Application Example 1] The technology according to the present disclosure can be applied to various products. For example, the technology according to the present disclosure may be implemented as a device mounted on any type of mobile body such as an automobile, an electric vehicle, a hybrid electric vehicle, a motorcycle, a bicycle, a personal mobility, an airplane, a drone, a ship, a robot, a construction machine, an agricultural machine (tractor), and the like.

Figure 31:
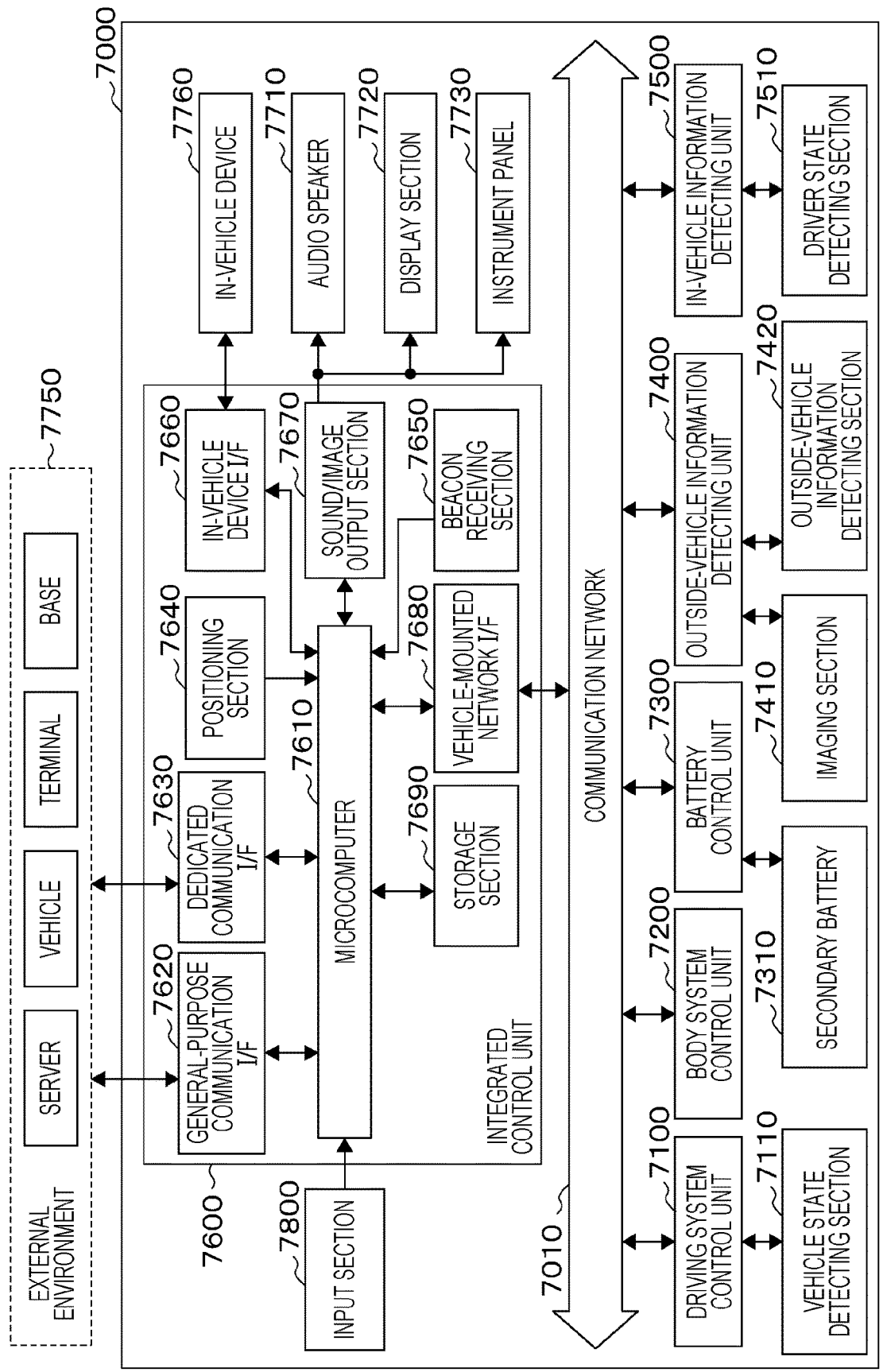
FIG. 31 is a block diagram depicting an example of schematic configuration of a vehicle control system.

FIG. 31 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 31, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. In FIG. 31, as a functional configuration of the integrated control unit 7600, a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690 are depicted. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 32:
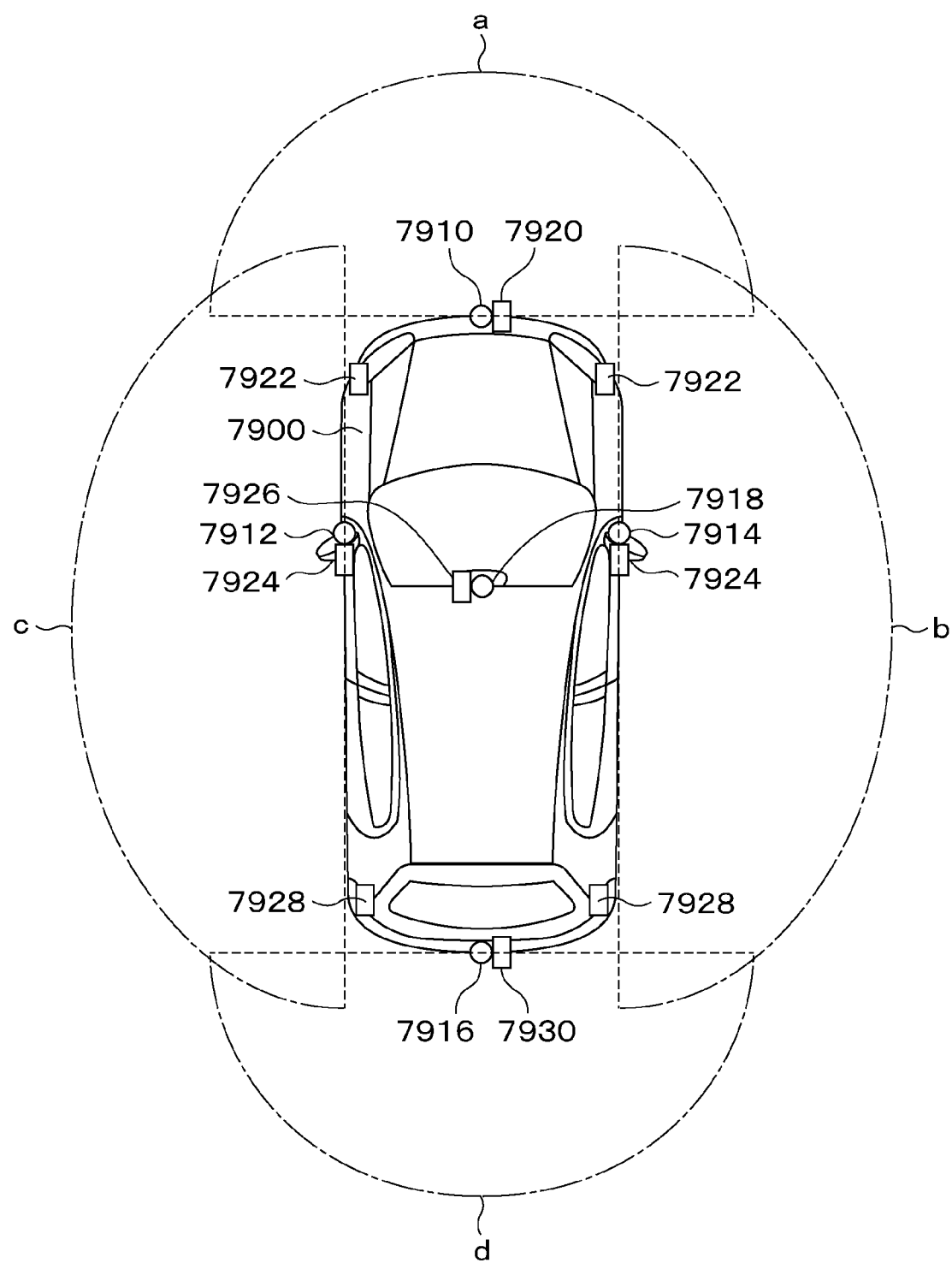
FIG. 32 is a diagram of assistance in explaining an example of installation positions of an outside-vehicle information detecting section and an imaging section.

Here, FIG. 32 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Note that FIG. 32 depicts an example of imaging ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 31, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system of mobile communications (GSM) (registered trademark), WiMAX, long term evolution (LTE), LTE-advanced (LTE-A), or the like, or another wireless communication protocol such as wireless LAN (also referred to as Wi-Fi (registered trademark)) or Bluetooth (registered trademark) or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wire less access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicleto Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless universal serial bus (WUSB). In addition, the in-vehicle device I/F 7660 may establish wired connection such as universal serial bus (USB), high-definition multimedia interface (HDMI) (registered trademark), mobile high-definition link (MHL), or the like via a connection terminal (and, if necessary, a cable) not depicted. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automated driving, which makes the vehicle to travel automatedly without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 31, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 31 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

The technology according to the present disclosure can be applied to, for example, a display section of an output device capable of visually or aurally providing notification of information among the above-described configurations.

[Application Example 2] The technology according to the present disclosure can be applied to various products. For example, the technology according to the present disclosure may be applied to an operating room system.

Figure 33:
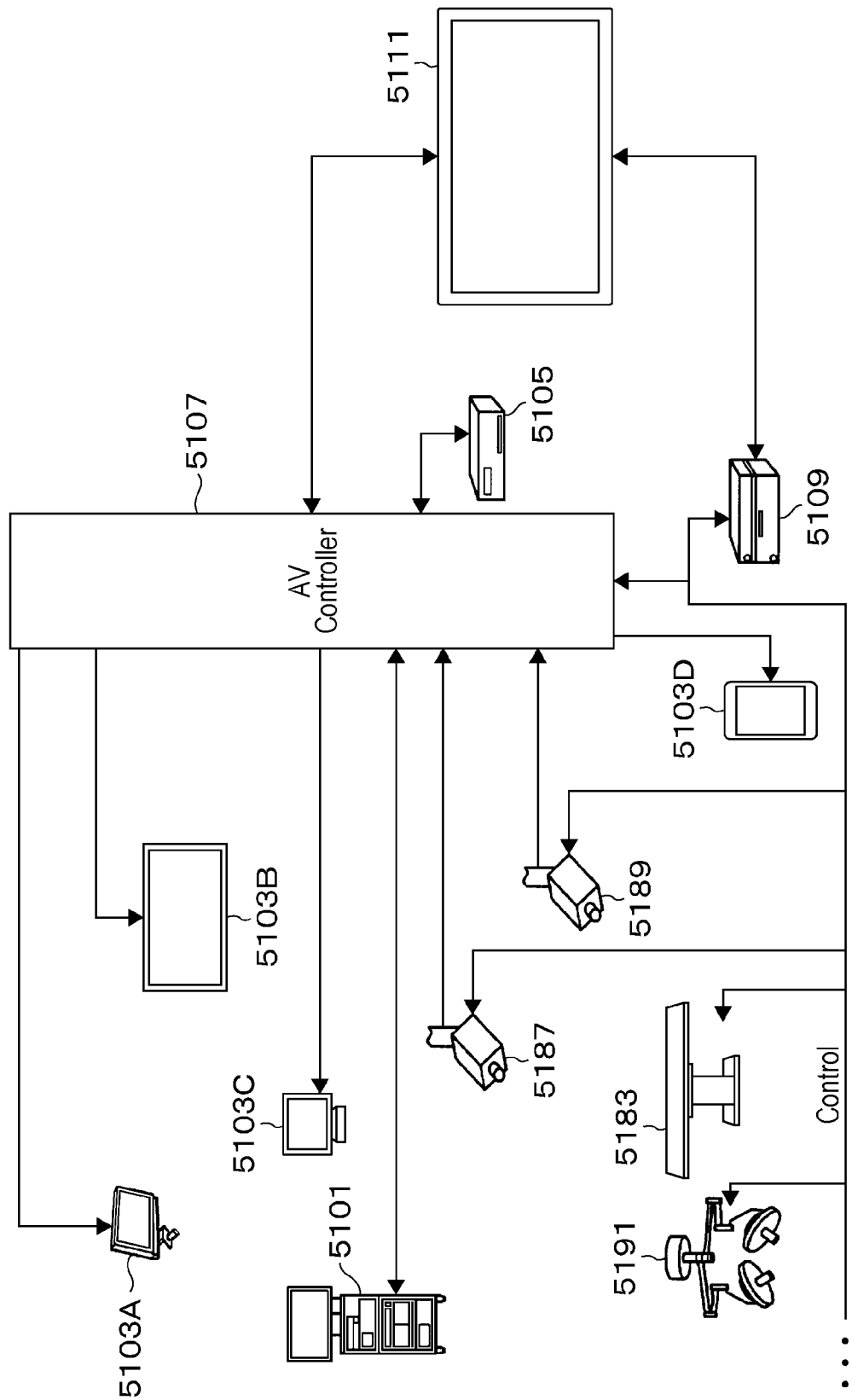
FIG. 33 is a diagram schematically illustrating an overall configuration of an operating room system.

FIG. 33 is a diagram schematically illustrating an overall configuration of an operating room system 5100 to which the technology according to the present disclosure is applicable. Referring to FIG. 33, the operating room system 5100 is configured by connecting a group of devices installed in an operating room to be able to cooperate with each other via an audiovisual controller (AV controller) 5107 and an operating room control device 5109.

Various devices can be installed in the operating room. FIG. 33 illustrates, as examples, a group of various devices 5101 for endoscopic surgery, a ceiling camera 5187 that is provided on the ceiling of the operating room and captures an area near the hands of an operator, an operating field camera 5189 that is provided on the ceiling of the operating room and captures an overall situation in the operating room, a plurality of display devices 5103A to 5103D, a recorder 5105, a patient bed 5183, and a light 5191.

Here, among these devices, the group of devices 5101 belongs to an endoscopic surgery system 5113 to be described later, and includes an endoscope, a display device that displays an image captured by the endoscope, and the like. Each device belonging to the endoscopic surgery system 5113 is also referred to as a medical device. The display devices 5103A to 5103D, the recorder 5105, the patient bed 5183, and the light 5191 are, for example, devices equipped in the operating room separately from the endoscopic surgery system 5113. Each device not belonging to the endoscopic surgery system 5113 is also referred to as a non-medical device. The audiovisual controller 5107 and/or the operating room control device 5109 control the operations of the medical devices and the non-medical devices in cooperation with each other.

The audiovisual controller 5107 integrally controls processing related to image display in the medical device and the non-medical device. Specifically, the group of devices 5101, the ceiling camera 5187, and the operating field camera 5189 among the devices included in the operating room system 5100 can each be a device having a function to transmit (hereinafter, also called a transmission source device) information to be displayed (hereinafter, also called display information) during the operation. The display devices 5103A to 5103D can each be a device to output the display information (hereinafter, also called an output destination device). Furthermore, the recorder 5105 may be a device corresponding to both the transmission source device and the output destination device. The audiovisual controller 5107 has a function to control operations of the transmission source devices and the output destination devices so as to acquire the display information from the transmission source devices and transmit the display information to the output destination devices to cause the output destination devices to display or record the display information. The display information refers to, for example, various images captured during the operation and various types of information on the operation (for example, body information and past examination results of a patient and information about a surgical procedure).

Specifically, information about an image of a surgical region in a body cavity of the patient captured by the endoscope can be transmitted as the display information from the group of devices 5101 to the audiovisual controller 5107. Information about an image of the area near the hands of the operator captured by the ceiling camera 5187 can be transmitted as the display information from the ceiling camera 5187. Information about an image representing the overall situation in the operating room captured by the operating field camera 5189 can be transmitted as the display information from the operating field camera 5189. When another device having an imaging function is present in the operating room system 5100, the audiovisual controller 5107 may also acquire information about an image captured by the other device as the display information from the other device.

Alternatively, for example, in the recorder 5105, information about these images captured in the past is recorded by the audiovisual controller 5107. The audiovisual controller 5107 can acquire information about the images captured in the past from the recorder 5105 as the display information. Note that various types of information regarding surgery may also be recorded in the recorder 5105 in advance.

The audiovisual controller 5107 displays the acquired display information (that is, the images captured during the surgery and the various types of information regarding the surgery) on at least one of the display devices 5103A to 5103D serving as the output destination devices. In the illustrated example, the display device 5103A is a display device installed on the ceiling of the operating room, being hung therefrom; the display device 5103B is a display device installed on a wall surface of the operating room; the display device 5103C is a display device installed on a desk in the operating room; and the display device 5103D is a mobile device (such as a tablet personal computer (PC)) having a display function.

Furthermore, although not illustrated in FIG. 33, the operating room system 5100 may include a device outside the operating room. The device outside the operating room can be a server connected to a network built in and outside a hospital, a PC used by a medical staff, or a projector installed in a meeting room of the hospital. When such an external device is present outside the hospital, the audiovisual controller 5107 can also display the display information on a display device of another hospital via, for example, a teleconference system for telemedicine.

The operating room control device 5109 integrally controls processing other than processing related to image display in the non-medical devices. For example, the operating room control device 5109 controls driving of the patient bed 5183, the ceiling camera 5187, the operating field camera 5189, and the light 5191.

The operating room system 5100 is provided with a central operation panel 5111, and the user can give an instruction on image display to the audiovisual controller 5107 or give an instruction on the operation of the non-medical devices to the operating room control device 5109 via the central operation panel 5111. The central operation panel 5111 is configured by providing a touchscreen on a display surface of a display device.

Figure 34:
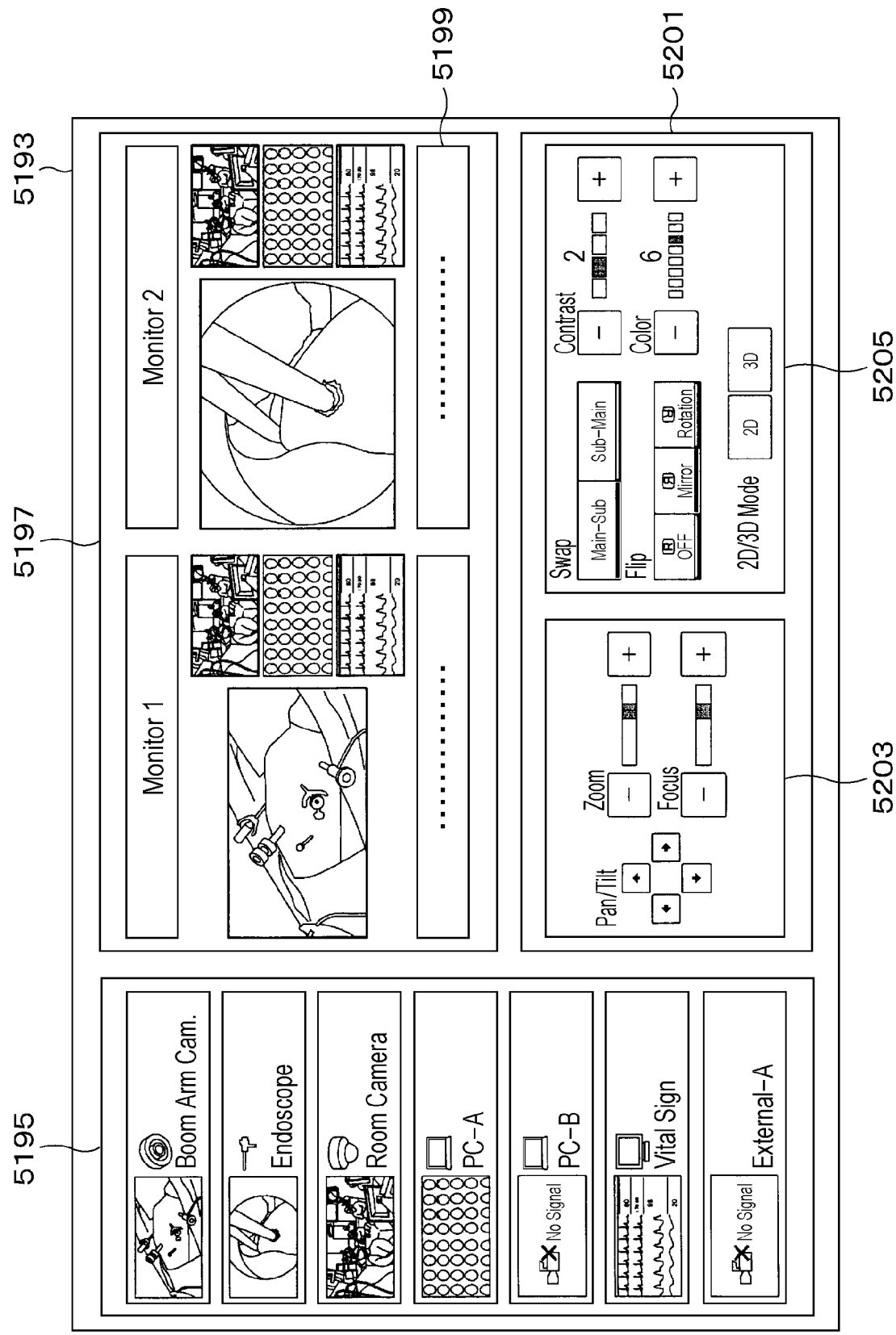
FIG. 34 is a diagram illustrating a display example of an operation screen on a central operation panel.

FIG. 34 is a diagram illustrating a display example of an operation screen on the central operation panel 5111. FIG. 34 illustrates, as an example, an operation screen corresponding to a case where two display devices are provided as output destination devices in the operating room system 5100. Referring to FIG. 34, an operation screen 5193 is provided with a transmission source selection region 5195, a preview region 5197, and a control region 5201.

In the transmission source selection region 5195, transmission source devices provided in the operating room system 5100 and thumbnail screens representing display information of the transmission source device are displayed in association with each other. The user can select the display information to be displayed on the display device from any of the transmission source devices displayed in the transmission source selection region 5195.

In the preview region 5197, previews of screens displayed on two display devices (Monitor 1 and Monitor 2) which are output destination devices are displayed. In the illustrated example, four images are PinP-displayed on one display device. The four images correspond to the display information transmitted from the transmission source device selected in the transmission source selection region 5195. One of the four images is displayed relatively large as a main image, and the remaining three images are displayed relatively small as sub-images. The user can switch the main image and the sub-images by appropriately selecting a region in which the four images are displayed. Furthermore, a status display region 5199 is provided below the region in which the four images are displayed, and a status regarding the surgery (for example, elapsed time of surgery, physical information of the patient, and the like) can be appropriately displayed in the region.

The control region 5201 is provided with a transmission source operation region 5203 in which graphical user interface (GUI) components for performing an operation on the transmission source devices are displayed, and an output destination operation region 5205 in which GUI components for performing an operation on the output destination devices are displayed. In the illustrated example, in the transmission source operation region 5203, GUI components for performing various operations (pan, tilt, and zoom) on a camera in a transmission source device having an imaging function are provided. The user can operate the operation of the camera in the transmission source device by appropriately selecting these GUI components. Note that, although illustration is omitted, in a case where the transmission source device selected in the transmission source selection region 5195 is a recorder (that is, in a case where an image recorded in the recorder in the past is displayed in the preview region 5197), GUI components for performing operations such as reproduction, stop of reproduction, rewind, and fast forward of the image can be provided in the transmission source operation region 5203.

Furthermore, in the output destination operation region 5205, GUI components for performing various operations (swap, flip, color adjustment, contrast adjustment, switching between 2D display and 3D display) with respect to display on the display device which is the output destination device are provided. The user can operate the display on the display device by appropriately selecting these GUI components.

Note that the operation screen displayed on the central operation panel 5111 is not limited to the illustrated example, and the user may be able to perform operation input to each device that can be controlled by the audiovisual controller 5107 and the operating room control device 5109 provided in the operating room system 5100 via the central operation panel 5111.

Figure 35:
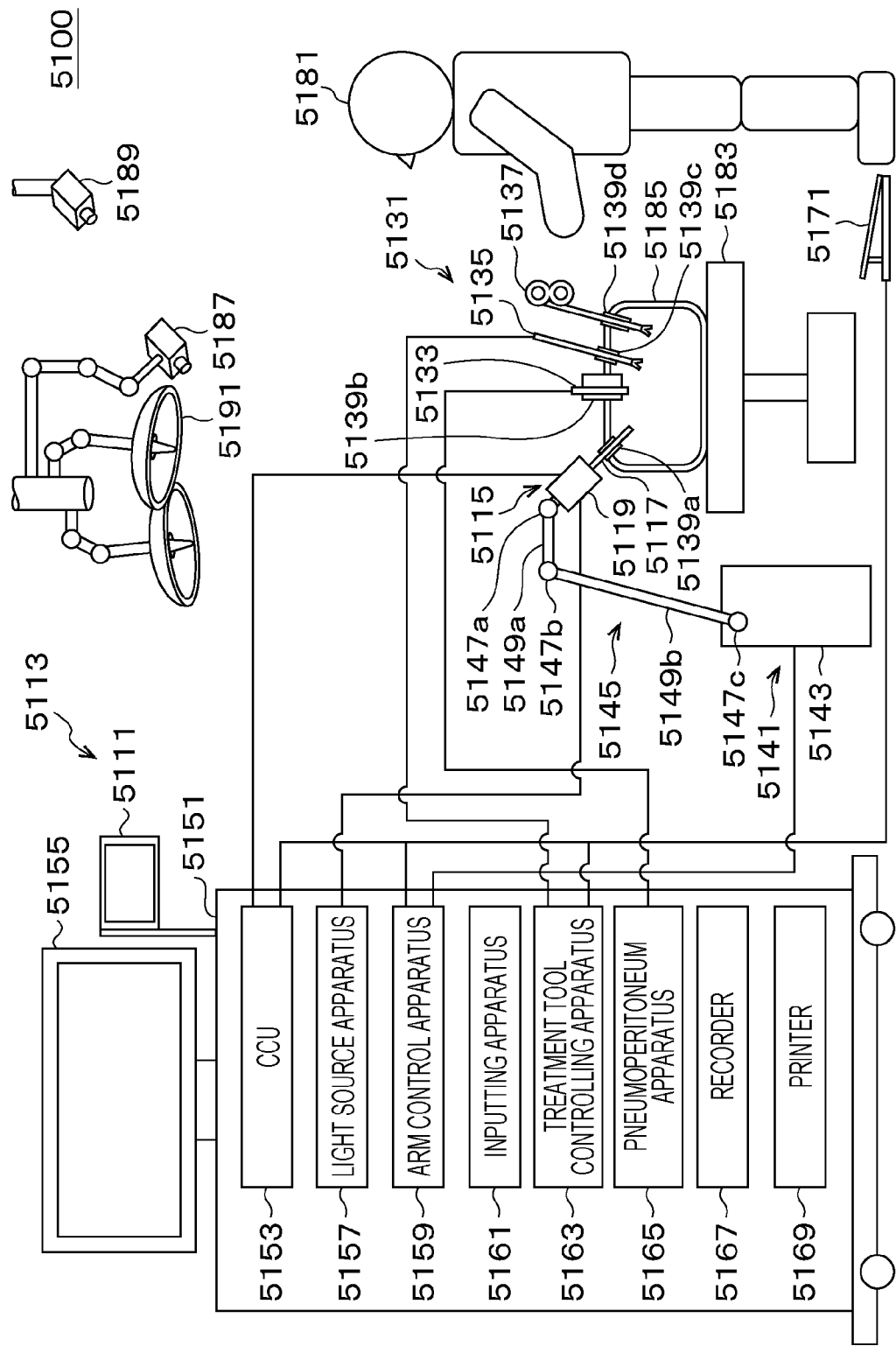
FIG. 35 is a diagram illustrating an example of a state of surgery to which the operating room system is applied.

FIG. 35 is a diagram illustrating an example of a state of surgery to which the operating room system described above is applied. The ceiling camera 5187 and the operating field camera 5189 are provided on the ceiling of the operating room, and can capture an area near the hands of an operator (surgeon) 5181 who performs treatment on an affected part of a patient 5185 on the patient bed 5183 and the entire operating room. The ceiling camera 5187 and the operating field camera 5189 can be provided with a magnification adjustment function, a focal length adjustment function, an imaging direction adjustment function, and the like. The light 5191 is provided on the ceiling of the operating room and illuminates at least the area near the hands of the operator 5181. The light 5191 may be capable of appropriately adjusting the irradiation light amount, the wavelength (color) of the irradiation light, the irradiation direction of the light, and the like.

As illustrated in FIG. 33, the endoscopic surgery system 5113, the patient bed 5183, the ceiling camera 5187, the operating field camera 5189, and the light 5191 are connected to be able to cooperate with each other via the audiovisual controller 5107 and the operating room control device 5109 (not illustrated in FIG. 35). The central operation panel 5111 is provided in the operating room, and as described above, the user can appropriately operate these devices existing in the operating room via the central operation panel 5111.

Hereinafter, a configuration of the endoscopic surgery system 5113 will be described in detail. As depicted, the endoscopic surgery system 5113 includes an endoscope 5115, other surgical tools 5131, a supporting arm apparatus 5141 that supports the endoscope 5115 thereon, and a cart 5151 on which various apparatus for endoscopic surgery are mounted.

In endoscopic surgery, instead of cutting and opening the abdominal wall, a plurality of cylindrical puncture instruments called trocars 5139a to 5139d is punctured into the abdominal wall. Then, a lens barrel 5117 of the endoscope 5115 and the other surgical tools 5131 are inserted into the body cavity of the patient 5185 from the trocars 5139a to 5139d. In the illustrated example, as the other surgical tools 5131, a pneumoperitoneum tube 5133, an energy device 5135, and forceps 5137 are inserted into the body cavity of the patient 5185. Furthermore, the energy device 5135 is a treatment tool that performs incision and detachment of tissue, sealing of a blood vessel, or the like by high-frequency current or ultrasonic vibration. However, the illustrated surgical tools 5131 are merely an example, and various surgical tools generally used in endoscopic surgery, such as tweezers and a retractor, for example, may be used as the surgical tools 5131.

An image of the surgical region in the body cavity of the patient 5185 captured by the endoscope 5115 is displayed on the display apparatus 5155. While viewing the image of the surgical region displayed on the display apparatus 5155 in real time, the operator 5181 performs treatment such as, for example, resection of an affected part using the energy device 5135 and the forceps 5137. Note that, although not illustrated, the pneumoperitoneum tube 5133, the energy device 5135, and the forceps 5137 are supported by the operator 5181, an assistant, or the like during surgery.

(Supporting Arm Apparatus) The supporting arm apparatus 5141 includes an arm portion 5145 extending from a base portion 5143. In the illustrated example, the arm portion 5145 includes joint portions 5147a, 5147b, and 5147c and links 5149a and 5149b, and is driven under the control of an arm control apparatus 5159. The endoscope 5115 is supported by the arm portion 5145, and its position and posture are controlled. Therefore, stable fixation of the position of the endoscope 5115 can be realized.

(Endoscope) The endoscope 5115 includes a lens barrel 5117 having a region of a predetermined length from a distal end thereof is inserted into a body cavity of the patient 5185, and a camera head 5119 connected to a proximal end of the lens barrel 5117. In the example depicted, the endoscope 5115 is depicted which includes as a rigid endoscope having the lens barrel 5117 of the hard type. However, the endoscope 5115 may otherwise be included as a flexible endoscope having the lens barrel 5117 of the flexible type.

The lens barrel 5117 has, at a distal end thereof, an opening in which an objective lens is fitted. A light source apparatus 5157 is connected to the endoscope 5115 such that light generated by the light source apparatus 5157 is introduced to a distal end of the lens barrel 5117 by a light guide extending in the inside of the lens barrel 5117 and is irradiated toward an observation target in a body cavity of the patient 5185 through the objective lens. It is to be noted that the endoscope 5115 may be a forward-viewing endoscope or may be an oblique-viewing endoscope or a side-viewing endoscope.

An optical system and an image pickup element are provided in the inside of the camera head 5119 such that reflected light (observation light) from the observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a camera control unit (CCU) 5153. Note that the camera head 5119 has a function of adjusting the magnification and the focal length by appropriately driving the optical system.

Note that, for example, in order to cope with stereoscopic viewing (3D display) or the like, a plurality of image pickup elements may be provided in the camera head 5119. In this case, a plurality of relay optical systems is provided inside the lens barrel 5117 in order to guide the observation light to each of the plurality of image pickup elements.

The CCU 5153 (various apparatuses mounted on the cart) includes a central processing unit (CPU), a graphics processing unit (GPU) or the like and integrally controls operation of the endoscope 5115 and a display apparatus 5155. Specifically, the CCU 5153 performs, on the image signal received from the camera head 5119, various image processes for displaying an image based on the image signal, such as, for example, a development process (demosaic process). The CCU 5153 provides the image signal subjected to the image processes to the display apparatus 5155. Furthermore, the audiovisual controller 5107 illustrated in FIG. 33 is connected to the CCU 5153. The CCU 5153 also provides the image signal subjected to the image processes to the audiovisual controller 5107. Furthermore, the CCU 5153 transmits a control signal to the camera head 5119 and controls driving thereof. The control signal can include information regarding image pickup conditions such as magnification and focal length. The information regarding the image pickup conditions may be input via an inputting apparatus 5161 or may be input via the central operation panel 5111 described above.

The display apparatus 5155 displays thereon an image based on an image signal, for which the image processes have been performed by the CCU 5153, under the control of the CCU 5153. In a case where the endoscope 5115 is compatible with high-resolution imaging such as 4K (the number of horizontal pixels 3840×the number of vertical pixels 2160) or 8K (the number of horizontal pixels 7680× the number of vertical pixels 4320), and/or in a case where the endoscope is compatible with 3D display, for example, a display apparatus capable of high-resolution display and/or a display apparatus capable of 3D display can be used as the display apparatus 5155 corresponding to each case. In a case where the endoscope is compatible with high resolution imaging such as 4K or 8K, a further immersive feeling can be obtained by using a display apparatus having a size of 55 inches or more as the display apparatus 5155. Furthermore, a plurality of display apparatuses 5155 having different resolutions and sizes may be provided depending on the application.

The light source apparatus 5157 includes a light source such as, for example, a light emitting diode (LED) and supplies irradiation light upon imaging of a surgical region to the endoscope 5115.

The arm control apparatus 5159 includes, for example, a processor such as a CPU, and operates according to a predetermined program to control driving of the arm portion 5145 of the supporting arm apparatus 5141 according to a predetermined control method.

The inputting apparatus 5161 is an input interface for the endoscopic surgery system 5113. A user can perform inputting of various kinds of information or instruction inputting to the endoscopic surgery system 5113 through the inputting apparatus 5161. For example, the user inputs various types of information regarding surgery, such as physical information of a patient and information related to surgical procedure of the surgery, via the inputting apparatus 5161. Furthermore, for example, the user inputs an instruction to drive the arm portion 5145, an instruction to change image pickup conditions (type, magnification, focal length, and the like of irradiation light) by the endoscope 5115, an instruction to drive the energy device 5135, and the like via the inputting apparatus 5161.

The type of the inputting apparatus 5161 is not limited, and the inputting apparatus 5161 may be various known inputting apparatuses. As the inputting apparatus 5161, for example, a mouse, a keyboard, a touch panel, a switch, a foot switch 5171, a lever, and/or the like can be applied. In a case where a touch panel is used as the inputting apparatus 5161, the touch panel may be provided on the display surface of the display apparatus 5155.

Alternatively, the inputting apparatus 5161 is a device worn by the user, for example, a glasses-type wearable device, a head mounted display (HMD), or the like, and various inputs are performed according to a gesture or a line-of-sight of the user detected by these devices. Furthermore, the inputting apparatus 5161 includes a camera capable of detecting movement of the user, and various inputs are performed according to a gesture or a line-of-sight of the user detected from a video captured by the camera. Moreover, the inputting apparatus 5161 includes a microphone capable of collecting user's voice, and various inputs are performed by voice via the microphone. As described above, the inputting apparatus 5161 is configured to be able to input various types of information in a non-contact manner, and thus, in particular, a user (for example, the operator 5181) belonging to a clean area can operate an apparatus belonging to an unclean area in a non-contact manner. Furthermore, since the user can operate the apparatus without releasing his/her hand from the possessed surgical tool, the convenience of the user is improved.

A treatment tool controlling apparatus 5163 controls driving of the energy device 5135 for cauterization and incision of tissue, sealing of a blood vessel, or the like. A pneumoperitoneum apparatus 5165 feeds gas into a body cavity of the patient 5185 through the pneumoperitoneum tube 5133 to inflate the body cavity in order to secure the field of view of the endoscope 5115 and secure the working space for the operator. A recorder 5167 is an apparatus capable of recording various kinds of information relating to surgery. A printer 5169 is an apparatus capable of printing various kinds of information relating to surgery in various forms such as a text, an image or a graph.

Hereinafter, a particularly characteristic configuration of the endoscopic surgery system 5113 will be described in more detail.

(Supporting Arm Apparatus) The supporting arm apparatus 5141 includes the base portion 5143 which is a base, and the arm portion 5145 extending from the base portion 5143. In the illustrated example, the arm portion 5145 includes the plurality of joint portions 5147*a*, 5147*b*, and 5147*c* and the plurality of links 5149*a* and 5149*b* connected by the joint portion 5147*b*, but in FIG. 35, the configuration of the arm portion 5145 is illustrated in a simplified manner for the sake of simplicity. In practice, the shapes, the number, and the arrangement of the joint portions 5147*a* to 5147*c* and the links 5149*a* and 5149*b*, the directions of the rotation axes of the joint portions 5147*a* to 5147*c*, and the like can be appropriately set so that the arm portion 5145 has a desired degree of freedom. For example, the arm portion 5145 can be suitably configured to have six degrees of freedom or more. Therefore, since the endoscope 5115 can be freely moved within the movable range of the arm portion 5145, the lens barrel 5117 of the endoscope 5115 can be inserted into the body cavity of the patient 5185 from a desired direction.

Actuators are provided in the joint portions 5147*a* to 5147*c*, and the joint portions 5147*a* to 5147*c* are configured to be rotatable about a predetermined rotation axis by driving of the actuators. The driving of the actuators is controlled by the arm control apparatus 5159, whereby the rotation angle of each of the joint portions 5147*a* to 5147*c* is controlled, and the driving of the arm portion 5145 is controlled. Therefore, control of the position and posture of the endoscope 5115 can be implemented. At this time, the arm control apparatus 5159 can control the driving of the arm portion 5145 by various known control methods such as force control or position control.

For example, by the operator 5181 appropriately performing an operation input via the inputting apparatus 5161 (including the foot switch 5171), the driving of the arm portion 5145 may be appropriately controlled by the arm control apparatus 5159 according to the operation input, and the position and posture of the endoscope 5115 may be controlled. With this control, the endoscope 5115 at the distal end of the arm portion 5145 can be moved from an arbitrary position to an arbitrary position and then fixedly supported at the position after the movement. Note that the arm portion 5145 may be operated by a so-called master-slave method. In this case, the arm portion 5145 can be remotely operated by the user via the inputting apparatus 5161 installed at a place away from the operating room.

Furthermore, in a case where the force control is applied, the arm control apparatus 5159 may perform so-called power assist control of receiving an external force from the user and driving the actuator of each of the joint portions 5147*a* to 5147*c* so that the arm portion 5145 smoothly moves according to the external force. Therefore, when the user moves the arm portion 5145 while directly touching the arm portion 5145, the arm portion 5145 can be moved with a relatively light force. Therefore, it is possible to more intuitively move the endoscope 5115 with a simpler operation, and the convenience of the user can be improved.

Here, in general, in endoscopic surgery, the endoscope 5115 is supported by a doctor called scopist. On the other hand, by using the supporting arm apparatus 5141, it is possible to more reliably fix the position of the endoscope 5115 without manual operation, so that it is possible to stably obtain an image of the surgical region and smoothly perform the surgery.

Note that the arm control apparatus 5159 is not necessarily provided in the cart 5151. Furthermore, the arm control apparatus 5159 is not necessarily one apparatus. For example, the arm control apparatus 5159 may be provided in each of the joint portions 5147*a* to 5147*c* of the arm portion 5145 of the supporting arm apparatus 5141, and the drive control of the arm portion 5145 may be implemented by the plurality of arm control apparatuses 5159 cooperating with each other.

(Light Source Apparatus) The light source apparatus 5157 supplies irradiation light for imaging a surgical region to the endoscope 5115. The light source apparatus 5157 includes, for example, an LED, a laser light source, or a white light source including a combination thereof. At this time, where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 5157. Furthermore, in this case, by irradiating the observation target with the laser light from each of the RGB laser light sources in a time division manner and controlling the driving of the image pickup element of the camera head 5119 in synchronization with the irradiation timing, it is also possible to capture an image corresponding to each of RGB in a time division manner. According to this method, a color image can be obtained even if color filters are not provided for the image pickup element.

Further, the light source apparatus 5157 may be controlled such that the intensity of light to be outputted is changed for each predetermined time. By controlling driving of the image pickup element of the camera head 5119 in synchronism with the timing of the change of the intensity of light to acquire images time-divisionally and synthesizing the images, an image of a high dynamic range free from underexposed blocked up shadows and overexposed highlights can be created.

Further, the light source apparatus 5157 may be configured to supply light of a predetermined wavelength band ready for special light observation. In special light observation, for example, by utilizing the wavelength dependency of absorption of light in a body tissue to irradiate light of a narrow band in comparison with irradiation light upon ordinary observation (namely, white light), narrow band observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 5157 can be configured to supply such narrow-band light and/or excitation light suitable for special light observation as described above.

Figure 36:
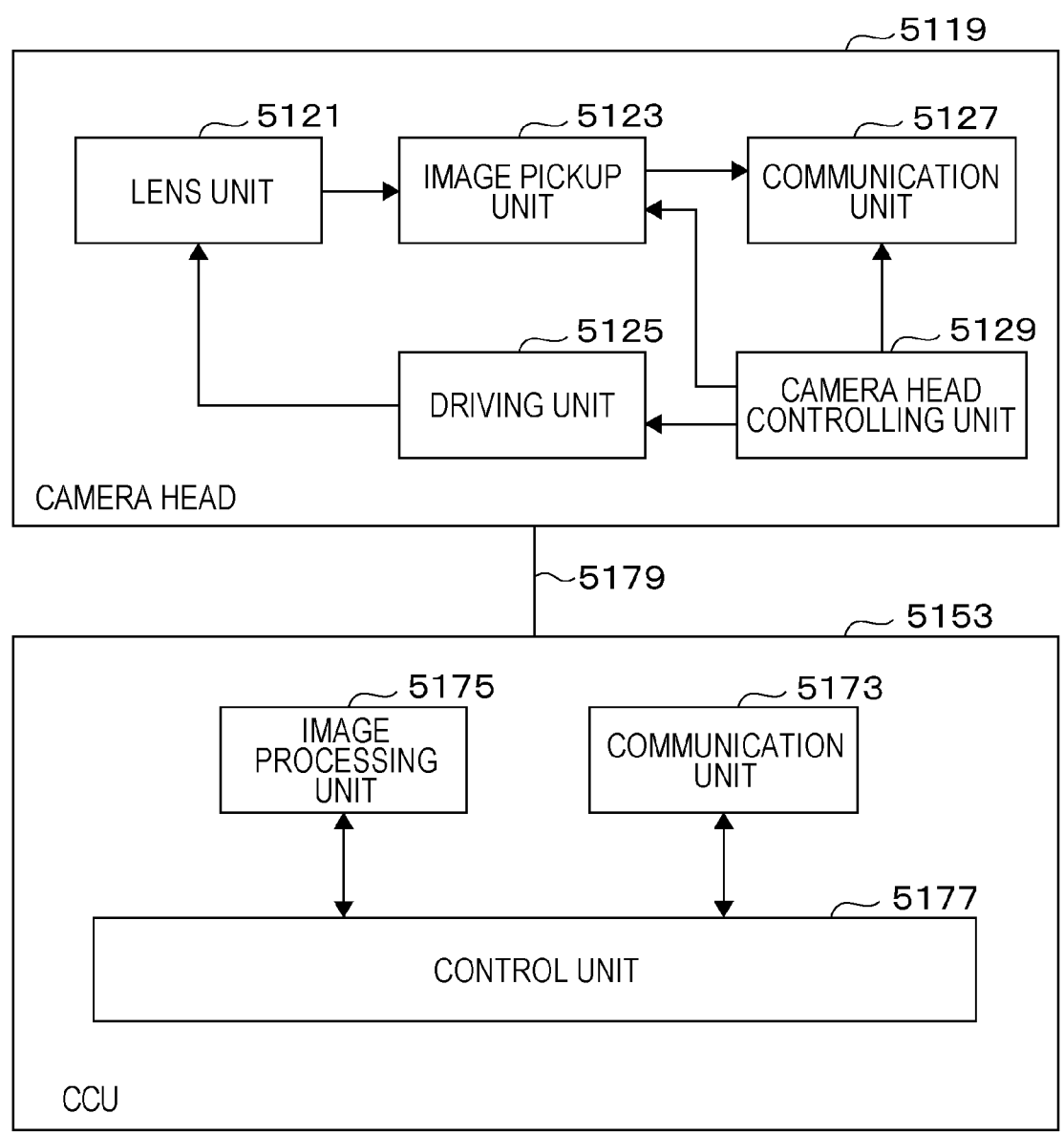
FIG. 36 is a block diagram depicting an example of a functional configuration of a camera head and a CCU depicted in FIG. 35.

(Camera Head and CCU) Functions of the camera head 5119 and the CCU 5153 of the endoscope 5115 will be described in more detail with reference to FIG. 36. FIG. 36 is a block diagram depicting an example of a functional configuration of the camera head 5119 and the CCU 5153 depicted in FIG. 35.

Referring to FIG. 36, the camera head 5119 includes a lens unit 5121, an image pickup unit 5123, a driving unit 5125, a communication unit 5127, and a camera head controlling unit 5129 as functions thereof. Furthermore, the CCU 5153 includes a communication unit 5173, an image processing unit 5175, and a control unit 5177 as its functions. The camera head 5119 and the CCU 5153 are connected to be bidirectionally communicable by a transmission cable 5179.

First, a functional configuration of the camera head 5119 will be described. The lens unit 5121 is an optical system, provided at a connecting location to the lens barrel 5117. Observation light taken in from a distal end of the lens barrel 5117 is guided to the camera head 5119 and introduced into the lens unit 5121. The lens unit 5121 includes a combination of a plurality of lenses including a zoom lens and a focusing lens. The optical characteristics of the lens unit 5121 are adjusted so as to condense the observation light on the light receiving surface of the image pickup element of the image pickup unit 5123. Furthermore, the zoom lens and the focus lens are configured to be movable in position on the optical axis in order to adjust the magnification and the focal point of the picked up image.

The image pickup unit 5123 includes an image pickup element and is arranged at a subsequent stage of the lens unit 5121. The observation light having passed through the lens unit 5121 is condensed on the light receiving surface of the image pickup element, and an image signal corresponding to the observation image is generated by photoelectric conversion. The image signal generated by the image pickup unit 5123 is provided to the communication unit 5127.

As the image pickup element constituting the image pickup unit 5123, for example, a complementary metal oxide semiconductor (CMOS) type image sensor having Bayer arrangement and capable of color capturing is used. Note that, as the image pickup element, for example, an image pickup element that can cope with capturing of a high-resolution image of 4K or more may be used. By obtaining the image of the surgical region with high resolution, the operator 5181 can grasp the state of the surgical region in more detail, and can progress the surgery more smoothly.

Furthermore, the image pickup element constituting the image pickup unit 5123 includes a pair of image pickup elements for acquiring image signals for the right eye and the left eye corresponding to 3D display. If 3D display is performed, then the depth of a living body tissue in a surgical region can be comprehended more accurately by the operator 5181. It is to be noted that, where the image pickup unit 5123 is configured as that of stereoscopic type, a plurality of systems of lens units 5121 is provided corresponding to the individual image pickup elements.

Further, the image pickup unit 5123 may not necessarily be provided on the camera head 5119. For example, the image pickup unit 5123 may be provided immediately behind the objective lens in the inside of the lens barrel 5117.

The driving unit 5125 includes an actuator and moves the zoom lens and the focus lens of the lens unit 5121 by a predetermined distance along an optical axis under the control of the camera head controlling unit 5129. Consequently, the magnification and the focal point of a picked up image by the image pickup unit 5123 can be adjusted suitably.

The communication unit 5127 includes a communication apparatus for transmitting and receiving various kinds of information to and from the CCU 5153. The communication unit 5127 transmits an image signal acquired from the image pickup unit 5123 as RAW data to the CCU 5153 through the transmission cable 5179. At this time, in order to display the picked up image of the surgical region with low latency, the image signal is preferably transmitted by optical communication. This is because, at the time of surgery, the operator 5181 performs surgery while observing the state of the affected part with the picked up image, and thus, for safer and more reliable surgery, it is required to display a moving image of the surgical region in real time as much as possible. In a case where optical communication is performed, the communication unit 5127 is provided with a photoelectric conversion module that converts an electric signal into an optical signal. The image signal is converted into an optical signal by the photoelectric conversion module and then transmitted to the CCU 5153 via the transmission cable 5179.

Furthermore, the communication unit 5127 receives a control signal for controlling driving of the camera head 5119 from the CCU 5153. The control signal includes information relating to image pickup conditions such as, for example, information that a frame rate of a picked up image is designated, information that an exposure value upon image picking up is designated and/or information that a magnification and a focal point of a picked up image are designated. The communication unit 5127 provides the received control signal to the camera head controlling unit 5129. Note that the control signal from the CCU 5153 may also be transmitted by optical communication. In this case, the communication unit 5127 is provided with a photoelectric conversion module that converts an optical signal into an electric signal, and the control signal is converted into an electric signal by the photoelectric conversion module and then provided to the camera head controlling unit 5129.

Note that the image pickup conditions such as the frame rate, the exposure value, the magnification, and the focal point described above are automatically set by the control unit 5177 of the CCU 5153 on the basis of the acquired image signal. That is, the endoscope 5115 has a so-called auto exposure (AE) function, an auto focus (AF) function, and an auto white balance (AWB) function.

The camera head controlling unit 5129 controls driving of the camera head 5119 on the basis of a control signal from the CCU 5153 received through the communication unit 5127. For example, the camera head controlling unit 5129 controls driving of the image pickup element of the image pickup unit 5123 on the basis of the information to designate the frame rate of the picked up image and/or the information to designate the exposure at the time of imaging. Furthermore, for example, the camera head controlling unit 5129 appropriately moves the zoom lens and the focus lens of the lens unit 5121 via the driving unit 5125 on the basis of the information to designate the magnification and the focal point of the picked up image. The camera head controlling unit 5129 may further have a function of storing information for identifying the lens barrel 5117 and the camera head 5119.

Note that by arranging the lens unit 5121, the image pickup unit 5123, and the like in a sealed structure having high airtightness and waterproofness, the camera head 5119 can have resistance to autoclave sterilization processing.

Next, a functional configuration of the CCU 5153 will be described. The communication unit 5173 includes a communication apparatus for transmitting and receiving various kinds of information to and from the camera head 5119. The communication unit 5173 receives an image signal transmitted thereto from the camera head 5119 through the transmission cable 5179. At this time, as described above, the image signal can be suitably transmitted by optical communication. In this case, for optical communication, the communication unit 5173 is provided with a photoelectric conversion module that converts an optical signal into an electrical signal. The communication unit 5173 provides the image signal converted into the electric signal to the image processing unit 5175.

Further, the communication unit 5173 transmits a control signal for controlling driving of the camera head 5119 to the camera head 5119. The control signal may also be transmitted by optical communication.

The image processing unit 5175 performs various image processes for an image signal in the form of RAW data transmitted thereto from the camera head 5119. Examples of the image processes include various known signal processing such as development processing, high image quality processing (band emphasis processing, super-resolution processing, noise reduction (NR) processing, camera shake correction processing, and/or the like), and/or enlargement processing (electronic zoom processing). Furthermore, the image processing unit 5175 performs detection processing on the image signal for performing AE, AF, and AWB.

The image processing unit 5175 includes a processor such as a CPU or a GPU, and the processor operates according to a predetermined program, whereby the above-described image processes and detection processing can be performed. Note that, in a case where the image processing unit 5175 includes a plurality of GPUs, the image processing unit 5175 appropriately divides information related to an image signal, and performs image processes in parallel by the plurality of GPUs.

The control unit 5177 performs various types of control related to imaging of the surgical region by the endoscope 5115 and display of the picked up image. For example, the control unit 5177 creates a control signal for controlling driving of the camera head 5119. At this time, in a case where the image pickup condition is input by the user, the control unit 5177 generates the control signal on the basis of the input by the user. Alternatively, in a case where the AE function, the AF function, and the AWB function are installed on the endoscope 5115, the control unit 5177 appropriately calculates the optimum exposure value, focal length, and white balance according to the result of the detection processing by the image processing unit 5175, and generates a control signal.

Further, the control unit 5177 controls, on the basis of an image signal for which image processes have been performed by the image processing unit 5175, the display apparatus 5155 to display a picked up image of the surgical region. Thereupon, the control unit 5177 recognizes various objects in the surgical region image using various image recognition technologies. For example, the control unit 5177 can recognize a surgical tool such as forceps, a particular living body region, bleeding, mist when the energy device 5135 is used and so forth by detecting the shape, color and so forth of edges of objects included in the surgical region image. The control unit 5177 causes, when it controls the display apparatus 5155 to display a picked up image of the surgical region, various kinds of surgery supporting information to be displayed in an overlapping manner with an image of the surgical region using a result of the recognition. The surgery supporting information is superimposed and displayed, and presented to the operator 5181, so that it is possible to proceed the surgery more safely and reliably.

The transmission cable 5179 which connects the camera head 5119 and the CCU 5153 to each other is an electric signal cable ready for communication of an electric signal, an optical fiber ready for optical communication or a composite cable ready for both of electrical and optical communications.

Here, in the illustrated example, communication is performed by wire using the transmission cable 5179, but communication between the camera head 5119 and the CCU 5153 may be performed wirelessly. In a case where the communication between the two is performed wirelessly, it is not necessary to lay the transmission cable 5179 in the operating room, so that a situation in which the movement of the medical staff in the operating room is hindered by the transmission cable 5179 can be eliminated.

An example of the operating room system 5100 to which the technology according to the present disclosure can be applied has been described above. Note that, here, a case where the medical system to which the operating room system 5100 is applied is the endoscopic surgery system 5113 has been described as an example, but the configuration of the operating room system 5100 is not limited to such an example. For example, the operating room system 5100 may be applied to a flexible endoscope system for examination or a microscopic surgery system instead of the endoscopic surgery system 5113.

The technology according to the present disclosure can be applied to, for example, a display section of an output device capable of visually or aurally providing notification of information among the above-described configurations.

Note that the technology of the present disclosure can also have the following configurations.

[A1] A liquid crystal display element including: a drive substrate having pixel electrodes having light-reflective properties and arranged in a matrix; a counter substrate arranged opposite to the drive substrate; and a liquid crystal material layer sandwiched between the drive substrate and the counter substrate, in which the pixel electrodes are arranged on a display surface side of the drive substrate in a state of being separated from each other with a slit portion interposed therebetween, an entire surface including surfaces on the pixel electrodes is covered with a first dielectric film formed on the pixel electrodes and a second dielectric film formed in the slit portion, and the second dielectric film has a hollow portion extending along the slit portion. [A2] The liquid crystal display element according to [A1], in which the hollow portion has a wall surface spreading toward a drive substrate side. [A3] The liquid crystal display element according to [A1] or [A2], in which at least a part of light incident on the second dielectric film is reflected by a wall surface of the hollow portion and travels toward a pixel electrode side. [A4] The liquid crystal display element according to any one of [A1] to [A3], in which the first dielectric film and the second dielectric film are constituted by a same material. [A5] The liquid crystal display element according to [A4], in which the first dielectric film and the second dielectric film are constituted by silicon oxide. [A6] The liquid crystal display element according to any one of [A1] to [A3], in which the second dielectric film is constituted by a material having a higher refractive index than that of a material constituting the first dielectric film. [A7] The liquid crystal display element according to [A6], in which the first dielectric film is constituted by silicon oxide, and the second dielectric film is constituted by any one of a group including silicon nitride, tantalum oxide, titanium oxide, and niobium oxide. [A8] The liquid crystal display element according to any one of [A1] to [A7], in which the first dielectric film includes a lower layer portion on a pixel electrode side and an upper layer portion laminated on the lower layer portion, and the upper layer portion is constituted by a material having a higher refractive index than that of a material constituting the lower layer portion. [A9] The liquid crystal display element according to [A8], in which the lower layer portion is constituted by silicon oxide, and the upper layer portion is constituted by silicon nitride. [A10] The liquid crystal display element according to any one of [A1] to [A9], in which the first dielectric film and the second dielectric film are covered with a cap layer. [A11] The liquid crystal display element according to [A10], in which the cap layer is constituted by silicon nitride or tantalum oxide.

[B1] A display device including: a liquid crystal display element; and a light source section that irradiates the liquid crystal display element with light, in which the liquid crystal display element includes: a drive substrate having pixel electrodes having light-reflective properties and arranged in a matrix; a counter substrate arranged opposite to the drive substrate; and a liquid crystal material layer sandwiched between the drive substrate and the counter substrate, the pixel electrodes are arranged on a display surface side of the drive substrate in a state of being separated from each other with a slit portion interposed therebetween, an entire surface including surfaces on the pixel electrodes is covered with a first dielectric film formed on the pixel electrodes and a second dielectric film formed in the slit portion, and the second dielectric film has a hollow portion extending along the slit portion. [B2] The display device according to [B1], in which the hollow portion has a wall surface spreading toward a drive substrate side. [B3] The display device according to [B1] or [B2], in which at least a part of light incident on the second dielectric film is reflected by a wall surface of the hollow portion and travels toward a pixel electrode side. [B4] The display device according to any one of [B1] to [B3], in which the first dielectric film and the second dielectric film are constituted by a same material. [B5] The display device according to [B4], in which the first dielectric film and the second dielectric film are constituted by silicon oxide. [B6] The display device according to any one of [B1] to [B3], in which the second dielectric film is constituted by a material having a higher refractive index than that of a material constituting the first dielectric film. [B7] The display device according to [B6], in which the first dielectric film is constituted by silicon oxide, and the second dielectric film is constituted by any one of a group including silicon nitride, tantalum oxide, titanium oxide, and niobium oxide. [B8] The display device according to any one of [B1] to [B7], in which the first dielectric film includes a lower layer portion on a pixel electrode side and an upper layer portion laminated on the lower layer portion, and the upper layer portion is constituted by a material having a higher refractive index than that of a material constituting the lower layer portion. [B9] The display device according to [B8], in which the lower layer portion is constituted by silicon oxide, and the upper layer portion is constituted by silicon nitride. [B10] The display device according to any one of [B1] to [B9], in which the first dielectric film and the second dielectric film are covered with a cap layer. [B11] The display device according to [B10], in which the cap layer is constituted by silicon nitride or tantalum oxide.

[C1] An electronic device including a display device, the display device including: a liquid crystal display element; and a light source section that irradiates the liquid crystal display element with light, in which the liquid crystal display element includes: a drive substrate having pixel electrodes having light-reflective properties and arranged in a matrix; a counter substrate arranged opposite to the drive substrate; and a liquid crystal material layer sandwiched between the drive substrate and the counter substrate, the pixel electrodes are arranged on a display surface side of the drive substrate in a state of being separated from each other with a slit portion interposed therebetween, an entire surface including surfaces on the pixel electrodes is covered with a first dielectric film formed on the pixel electrodes and a second dielectric film formed in the slit portion, and the second dielectric film has a hollow portion extending along the slit portion. [C2] The electronic device according to [C1], in which the hollow portion has a wall surface spreading toward a drive substrate side. [C3] The electronic device according to [C1] or [C2], in which at least a part of light incident on the second dielectric film is reflected by a wall surface of the hollow portion and travels toward a pixel electrode side. [C4] The electronic device according to any one of [C1] to [C3], in which the first dielectric film and the second dielectric film are constituted by a same material. [C5] The electronic device according to [C4], in which the first dielectric film and the second dielectric film are constituted by silicon oxide. [C6] The electronic device according to any one of [C1] to [C3], in which the second dielectric film is constituted by a material having a higher refractive index than that of a material constituting the first dielectric film. [C7] The electronic device according to [C6], in which the first dielectric film is constituted by silicon oxide, and the second dielectric film is constituted by any one of a group including silicon nitride, tantalum oxide, titanium oxide, and niobium oxide. [C8] The electronic device according to any one of [C1] to [C7], in which the first dielectric film includes a lower layer portion on a pixel electrode side and an upper layer portion laminated on the lower layer portion, and the upper layer portion is constituted by a material having a higher refractive index than that of a material constituting the lower layer portion. [C9] The electronic device according to [C8], in which the lower layer portion is constituted by silicon oxide, and the upper layer portion is constituted by silicon nitride. [C10] The electronic device according to any one of [C1] to [C9], in which the first dielectric film and the second dielectric film are covered with a cap layer. [C11] The electronic device according to [C10], in which the cap layer is constituted by silicon nitride or tantalum oxide.

[D1] A drive substrate including pixel electrodes having light-reflective properties and arranged in a matrix, in which the pixel electrodes are arranged on a display surface side of the drive substrate in a state of being separated from each other with a slit portion interposed therebetween, an entire surface including surfaces on the pixel electrodes is covered with a first dielectric film formed on the pixel electrodes and a second dielectric film formed in the slit portion, and the second dielectric film has a hollow portion extending along the slit portion. [D2] The drive substrate according to [D1], in which the hollow portion has a wall surface spreading toward a drive substrate side. [D3] The drive substrate according to [D1] or [D2], in which at least a part of light incident on the second dielectric film is reflected by a wall surface of the hollow portion and travels toward a pixel electrode side. [D4] The drive substrate according to any one of [D1] to [D3], in which the first dielectric film and the second dielectric film are constituted by a same material. [D5] The drive substrate according to [D4], in which the first dielectric film and the second dielectric film are constituted by silicon oxide. [D6] The drive substrate according to any one of [D1] to [D3], in which the second dielectric film is constituted by a material having a higher refractive index than that of a material constituting the first dielectric film. [D7] The drive substrate according to [D6], in which the first dielectric film is constituted by silicon oxide, and the second dielectric film is constituted by any one of a group including silicon nitride, tantalum oxide, titanium oxide, and niobium oxide. [D8] The drive substrate according to any one of [D1] to [D7], in which the first dielectric film includes a lower layer portion on a pixel electrode side and an upper layer portion laminated on the lower layer portion, and the upper layer portion is constituted by a material having a higher refractive index than that of a material constituting the lower layer portion. [D9] The drive substrate according to [D8], in which the lower layer portion is constituted by silicon oxide, and the upper layer portion is constituted by silicon nitride. [D10] The drive substrate according to any one of [D1] to [D9], in which the first dielectric film and the second dielectric film are covered with a cap layer. [D11] The drive substrate according to [D10], in which the cap layer is constituted by silicon nitride or tantalum oxide.

[E1] A method for manufacturing a drive substrate having pixel electrodes having light-reflective properties and arranged in a matrix, the method including: a step of forming a conductive material layer constituting the pixel electrodes on a display surface side of the drive substrate; a step of forming a dielectric film constituting a first dielectric film on the conductive material layer; a step of patterning the dielectric film and the conductive material layer to form a slit portion that separates the pixel electrodes; a step of forming a dielectric material layer having a hollow portion extending along the slit portion on an entire surface including an inside of the slit portion by conformal film formation; and a step of forming a second dielectric film formed in the slit portion by performing flattening processing on the dielectric material layer. [E2] The method for manufacturing the drive substrate according to [E1], in which the hollow portion having a wall surface spreading toward a drive substrate side is formed. [E3] The method for manufacturing the drive substrate according to [E1] or [E2], in which the first dielectric film and the second dielectric film are formed using a same material. [E4] The method for manufacturing the drive substrate according to [E3], in which the first dielectric film and the second dielectric film are formed using silicon oxide. [E5] The method for manufacturing the drive substrate according to any one of [E1] to [E4], in which the second dielectric film is formed using a material having a refractive index higher than that of a material constituting the first dielectric film. [E6] The method for manufacturing the drive substrate according to [E5], in which the first dielectric film is formed using silicon oxide, and the second dielectric film is formed using any one of a group including silicon nitride, tantalum oxide, titanium oxide, and niobium oxide. [E7] The method for manufacturing the drive substrate according to any one of [E1] to [E6], in which the first dielectric film includes a lower layer portion on a pixel electrode side and an upper layer portion laminated on the lower layer portion, and the upper layer portion is formed using a material having a refractive index higher than that of a material constituting the lower layer portion. [E8] The method for manufacturing the drive substrate according to [E7], in which the lower layer portion is formed using silicon oxide, and the upper layer portion is formed using silicon nitride. [E9] The method for manufacturing the drive substrate according to any one of [E1] to [E8], further including a step of covering the first dielectric film and the second dielectric film with a cap layer. [E11] The method for manufacturing the drive substrate according to [E10], in which the cap layer is formed using silicon nitride or tantalum oxide.

REFERENCE SIGNS LIST 1, 2, 2A Liquid crystal display element
11 Horizontal drive circuit
12 Vertical drive circuit
100 Drive substrate
110 Support substrate
111 Transistor
120 Wiring layer
121 Insulating layer
123, 123A Interlayer insulating layer
124 Via
125 First relay electrode
126 Via
131 Light-reflective pixel electrode
131L Island-shaped protrusion
132 First dielectric film
133 Second dielectric film
133A Dielectric material layer
134 Hollow portion
135 Alignment film
140 Liquid crystal material layer
141 Liquid crystal molecules
150 Counter substrate
151 Rectangular base material
152 Counter electrode
153 Alignment film
154 Polarizer
160 Seal portion
232 Second dielectric film
232A Lower layer portion of second dielectric film
232B Upper layer portion of second dielectric film
236 Cap layer
SL Slit portion
W1, W2, W3 Distance between pixel electrodes
400 Display device
410 Light source section
420 Light optical system 430 Image control circuit
440 Projection optical system
450 Screen
511 Camera main body portion
512 Imaging lens unit
513 Grip portion
514 Monitor
515 Viewfinder
611 Eyeglass-shaped display section
612 Ear hooking portion
700 Glasses (eyewear)
711 See-through head mounted display
712 Main body portion
713 Arm
714 Lens barrel

The invention claimed is:

1. A liquid crystal display element, comprising:
a drive substrate comprising a plurality of pixel electrodes having light-reflective properties, wherein the plurality of pixel electrodes is in a matrix;
a counter substrate opposite to the drive substrate; and
a liquid crystal material layer sandwiched between the drive substrate and the counter substrate, wherein
the plurality of pixel electrodes is on a display surface side of the drive substrate,
the plurality of pixel electrodes is separated from each other with a slit portion interposed therebetween,
an entire surface that includes surfaces on the plurality of pixel electrodes is covered with a first dielectric film,
the first dielectric film includes:
a lower layer portion on a side of the plurality of pixel electrodes; and
an upper layer portion laminated on the lower layer portion, wherein
the upper layer portion includes a first material that has a higher refractive index than that of a second material of the lower layer portion,
a second dielectric film is in the slit portion, and
the second dielectric film has a hollow portion that extends along the slit portion.

2. The liquid crystal display element according to claim 1, wherein
the hollow portion has a wall surface toward a side of the drive substrate.

3. The liquid crystal display element according to claim 1, wherein
at least a part of light incident on the second dielectric film is reflected by a wall surface of the hollow portion and travels toward the side of the plurality of pixel electrodes.

4. The liquid crystal display element according to claim 1, wherein the first dielectric film and the second dielectric film are of a same material.

5. The liquid crystal display element according to claim 4, wherein the first dielectric film and the second dielectric film are of silicon oxide.

6. The liquid crystal display element according to claim 1, wherein the second dielectric film includes a third material having a higher refractive index than that of a fourth material of the first dielectric film.

7. The liquid crystal display element according to claim 6, wherein
the first dielectric film includes silicon oxide, and
the second dielectric film includes one of silicon nitride, tantalum oxide, titanium oxide, or niobium oxide.

8. The liquid crystal display element according to claim 1, wherein
the lower layer portion includes silicon oxide, and
the upper layer portion includes silicon nitride.

9. The liquid crystal display element according to claim 1, wherein
the first dielectric film and the second dielectric film are covered with a cap layer.

10. The liquid crystal display element according to claim 9, wherein
the cap layer includes one of silicon nitride or tantalum oxide.

11. A display device, comprising:
a liquid crystal display element; and
a light source section configured to irradiate the liquid crystal display element with light, wherein the liquid crystal display element includes:
a drive substrate comprising a plurality of pixel electrodes having light-reflective properties, wherein the plurality of pixel electrodes is in a matrix;
a counter substrate opposite to the drive substrate; and
a liquid crystal material layer sandwiched between the drive substrate and the counter substrate, wherein
the plurality of pixel electrodes is on a display surface side of the drive substrate,
the plurality of pixel electrodes is separated from each other with a slit portion interposed therebetween,
an entire surface that includes surfaces on the plurality of pixel electrodes is covered with a first dielectric film,
the first dielectric film includes:
a lower layer portion on a side of the plurality of pixel electrodes; and
an upper layer portion laminated on the lower layer portion, wherein
the upper layer portion includes a first material that has a higher refractive index than that of a second material of the lower layer portion,
a second dielectric film is in the slit portion, and
the second dielectric film has a hollow portion that extends along the slit portion.

12. An electronic device, comprising
a display device, wherein the display device comprises:
a liquid crystal display element; and
a light source section configured to irradiate the liquid crystal display element with light, wherein the liquid crystal display element includes:
a drive substrate comprising a plurality of pixel electrodes having light-reflective properties, wherein the plurality of pixel electrodes is in a matrix;
a counter substrate opposite to the drive substrate; and
a liquid crystal material layer sandwiched between the drive substrate and the counter substrate, wherein
the plurality of pixel electrodes is on a display surface side of the drive substrate,
the plurality of pixel electrodes is separated from each other with a slit portion interposed therebetween,
an entire surface that includes surfaces on the plurality of pixel electrodes is covered with a first dielectric film,
the first dielectric film includes:

a lower layer portion on a side of the plurality of pixel electrodes; and
an upper layer portion laminated on the lower layer portion, wherein
the upper layer portion includes a first material that has a higher refractive index than that of a second material of the lower layer portion,
a second dielectric film is in the slit portion, and
the second dielectric film has a hollow portion that extends along the slit portion.

13. A drive substrate, comprising
a plurality of pixel electrodes having light-reflective properties, wherein
the plurality of pixel electrodes is in a matrix,
the plurality of pixel electrodes is on a display surface side of the drive substrate,
the plurality of pixel electrodes is separated from each other with a slit portion interposed therebetween,
an entire surface that includes surfaces on the plurality of pixel electrodes is covered with a first dielectric film,
the first dielectric film includes:
a lower layer portion on a side of the plurality of pixel electrodes; and
an upper layer portion laminated on the lower layer portion, wherein
the upper layer portion includes a first material that has a higher refractive index than that of a second material of the lower layer portion,
a second dielectric film is in the slit portion, and
the second dielectric film has a hollow portion that extends along the slit portion.

14. A method for manufacturing a drive substrate, the method comprising:
forming a conductive material layer constituting a plurality of pixel electrodes on a display surface side of the drive substrate, wherein
the plurality of pixel electrodes has light-reflective properties, and
the plurality of pixel electrodes is in a matrix;
forming a dielectric film on the conductive material layer, wherein the dielectric film comprises a first dielectric film;
patterning the dielectric film and the conductive material layer to form a slit portion that separates the plurality of pixel electrodes;
forming a dielectric material layer on an entire surface including an inside of the slit portion, wherein
the dielectric material layer is formed by conformal film formation, and
the dielectric material layer has a hollow portion extending along the slit portion; and
forming a second dielectric film in the slit portion by performing flattening processing on the dielectric material layer.

* * * * *